(12) United States Patent
Burkett et al.

(10) Patent No.: US 8,919,494 B2
(45) Date of Patent: Dec. 30, 2014

(54) ELECTRIC HEATER FOR INTEGRATION INTO AN AIRCRAFT ACOUSTIC PANEL

(75) Inventors: Brian Bobby Burkett, Akron, OH (US); Galdemir Cezar Botura, San Diego, CA (US); Claude Marc Hubert, Riverside, CA (US); David Bert Sweet, NW Canal Fulton, OH (US); Joseph Christopher Zecca, San Diego, CA (US); Timothy Robert Olson, La Jolla, CA (US)

(73) Assignees: Rohr, Inc., Chula Vista, CA (US); Goodrich Corporation, Charlotte, NC (US)

( * ) Notice: Subject to any disclaimer, the term of this patent is extended or adjusted under 35 U.S.C. 154(b) by 107 days.

(21) Appl. No.: 13/585,533

(22) Filed: Aug. 14, 2012

(65) Prior Publication Data

US 2014/0034414 A1   Feb. 6, 2014

Related U.S. Application Data

(60) Provisional application No. 61/677,975, filed on Jul. 31, 2012.

(51) Int. Cl.
*E04B 1/86* (2006.01)

(52) U.S. Cl.
USPC .......................................... 181/290; 181/284

(58) Field of Classification Search
CPC ....................................................... E04B 1/86
USPC ....................................................... 181/290
See application file for complete search history.

(56) References Cited

U.S. PATENT DOCUMENTS

| | | | |
|---|---|---|---|
| 4,001,473 A | * | 1/1977 | Cook ............................ 428/116 |
| 4,035,535 A | | 7/1977 | Taylor |
| 4,291,079 A | | 9/1981 | Hom |
| 4,421,811 A | | 12/1983 | Rose et al. |
| 4,441,578 A | | 4/1984 | Rose |
| 4,743,740 A | | 5/1988 | Adee |
| 4,850,093 A | | 7/1989 | Parente |
| 5,041,323 A | | 8/1991 | Rose et al. |
| 5,782,082 A | | 7/1998 | Hogeboom et al. |
| 5,923,003 A | | 7/1999 | Arcas et al. |
| 6,094,907 A | | 8/2000 | Blackner |
| 6,135,238 A | | 10/2000 | Arcas et al. |
| 6,209,679 B1 | | 4/2001 | Hogeboom et al. |
| 6,371,242 B1 | | 4/2002 | Wilson et al. |
| 6,454,219 B1 | | 9/2002 | Moe |
| 7,257,894 B2 | | 8/2007 | Buge et al. |
| 7,291,815 B2 | | 11/2007 | Hubert et al. |
| 7,469,862 B2 | | 12/2008 | Layland et al. |
| 7,513,458 B2 | | 4/2009 | Layland et al. |
| 7,588,212 B2 | | 9/2009 | Moe et al. |
| 7,631,838 B2 | | 12/2009 | Layland et al. |
| 7,661,510 B2 | | 2/2010 | Müller |
| 7,681,838 B2 | | 3/2010 | Layland et al. |
| 7,780,117 B2 | | 8/2010 | Botura et al. |

(Continued)

*Primary Examiner* — Forrest M Phillips
(74) *Attorney, Agent, or Firm* — Cantor Colburn LLP

(57) ABSTRACT

An electric heater (40) for integration into an acoustic panel (20) having sound-penetrating pores (30) communicating with a sound-canceling medium. The heater (40) includes an electrically conductive layer (53) with resistance-setting apertures (63) filled with sealant (73). Openings (83), which contribute to the sound-penetrating pores (30), extend through the sealant-filled apertures (63). The acoustic panel (20) can be assimilated into an aircraft component, such as a nacelle inlet lip, which requires both noise-reducing and ice-protecting features.

20 Claims, 104 Drawing Sheets

(56) References Cited

U.S. PATENT DOCUMENTS

| | | |
|---|---|---|
| 7,837,150 B2 | 11/2010 | Zecca et al. |
| 7,923,668 B2 | 4/2011 | Layland et al. |
| 7,938,224 B2 | 5/2011 | Frustie et al. |
| 8,092,169 B2 | 1/2012 | Cloft et al. |
| 8,181,900 B2 | 5/2012 | Chene et al. |
| 2002/0096506 A1* | 7/2002 | Moreland et al. ............. 219/202 |
| 2004/0069772 A1* | 4/2004 | Kondo et al. ................. 219/549 |
| 2004/0237502 A1* | 12/2004 | Moe et al. ........................ 60/204 |
| 2005/0189345 A1* | 9/2005 | Brunner et al. ............... 219/548 |
| 2010/0199629 A1 | 8/2010 | Chene et al. |

* cited by examiner

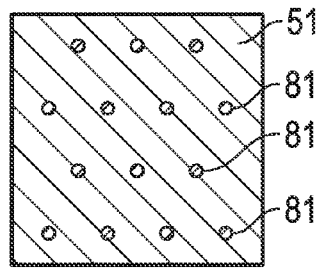
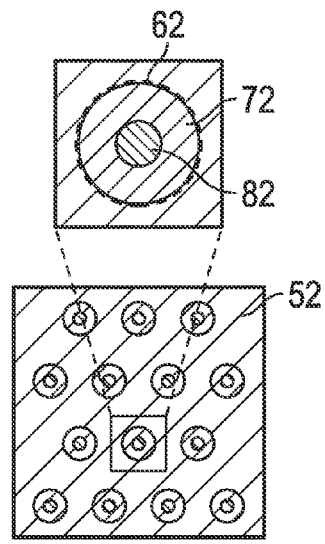
FIG. 4A
FIG. 4B
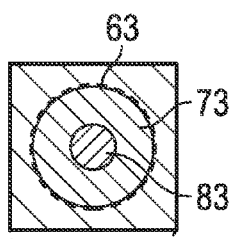
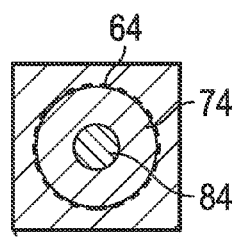
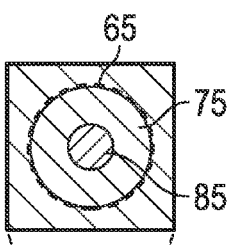
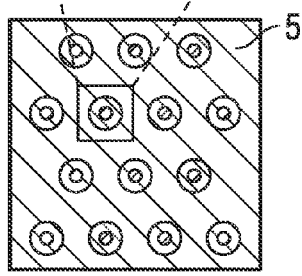
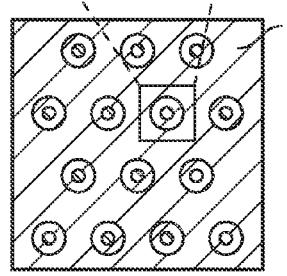
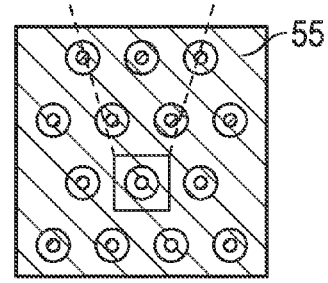
FIG. 4C     FIG. 4D     FIG. 4E
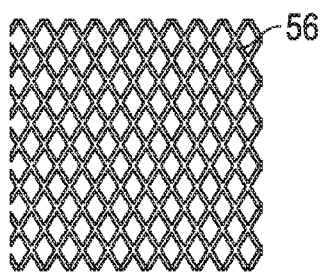
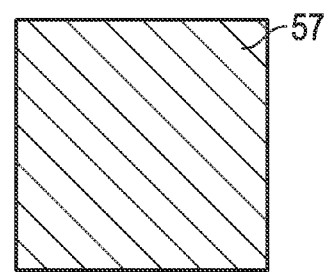
FIG. 4F     FIG. 4G

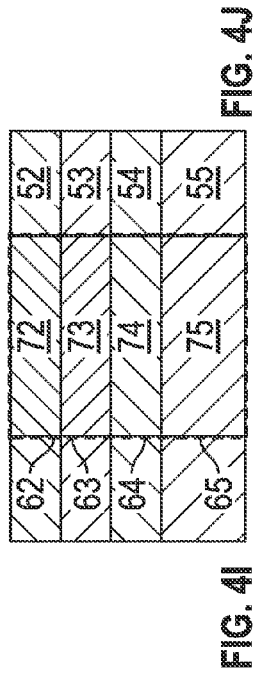
FIG. 4H
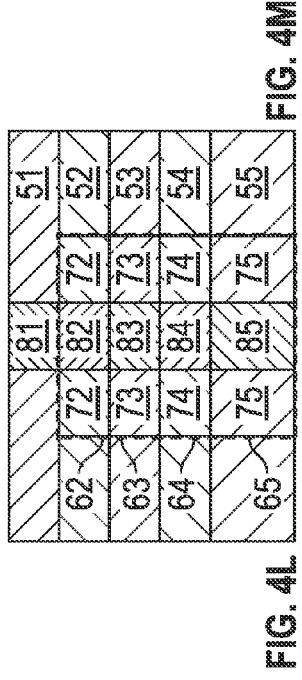
FIG. 4I    FIG. 4J
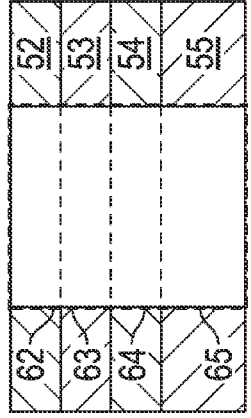
FIG. 4K
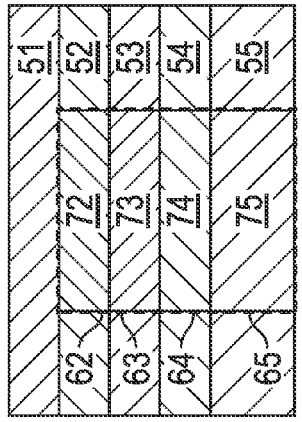
FIG. 4L    FIG. 4M
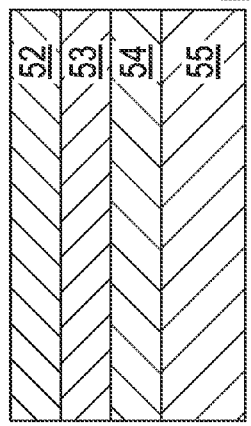
FIG. 4N
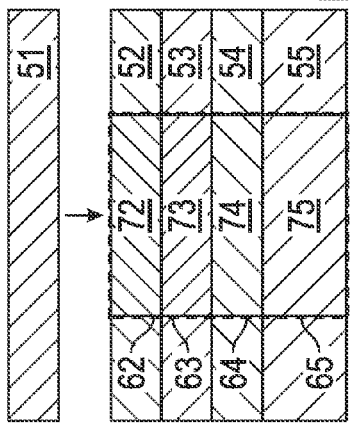
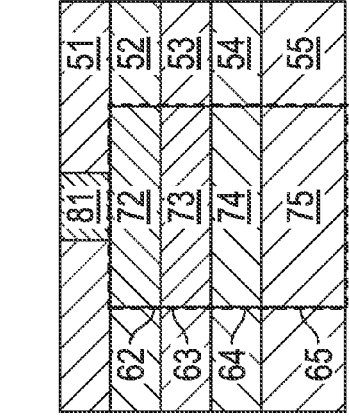
FIG. 4O    FIG. 4P
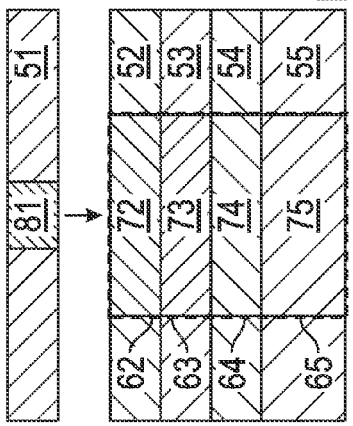

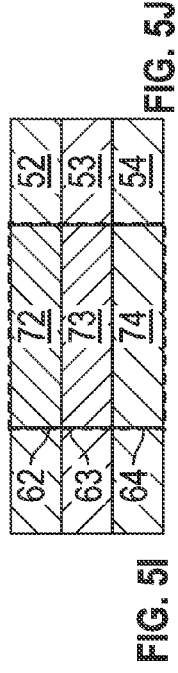
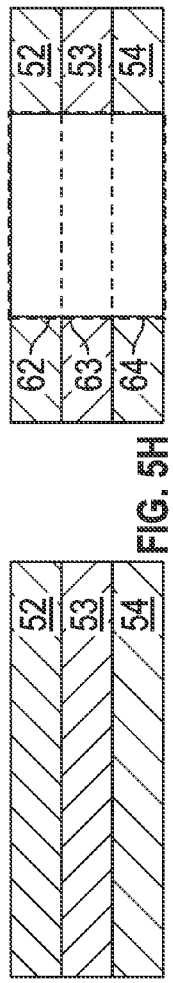
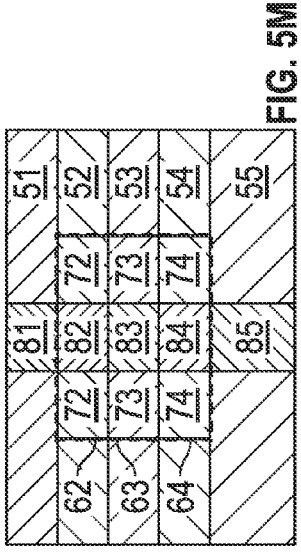
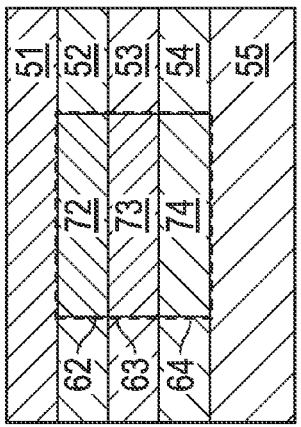
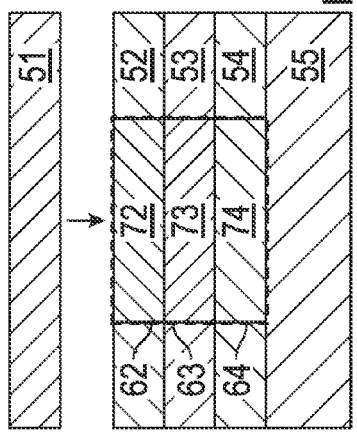
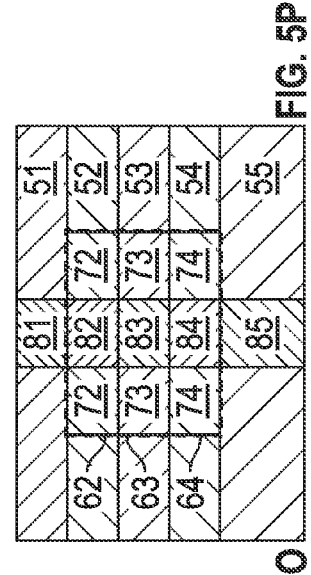
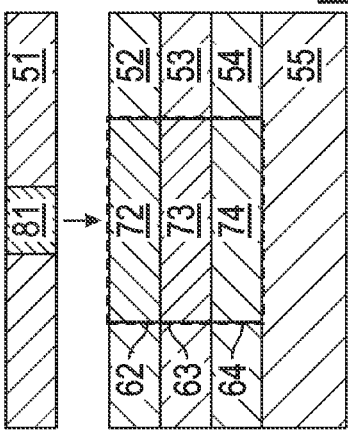

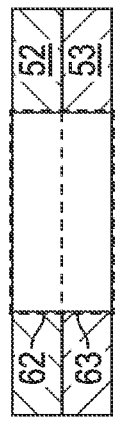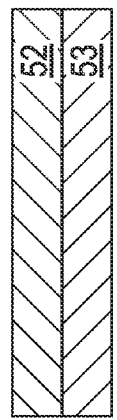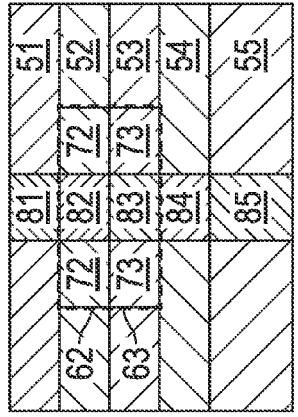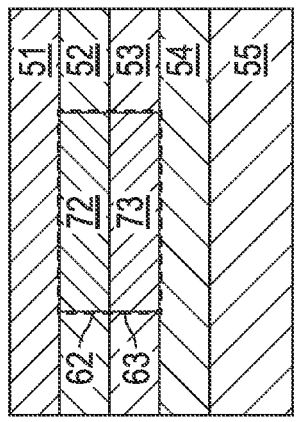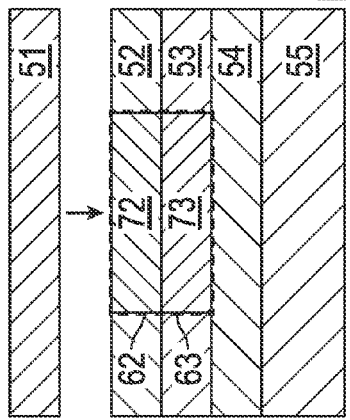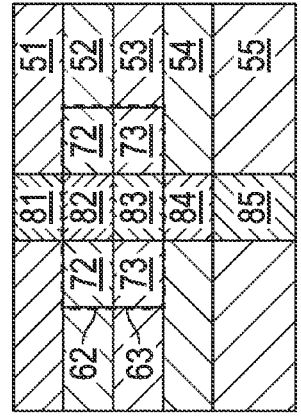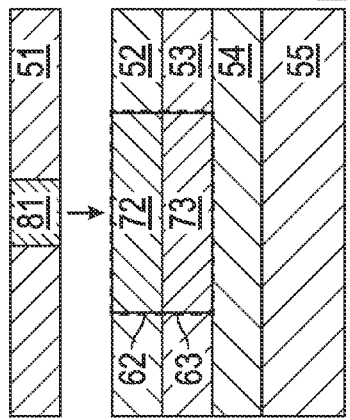

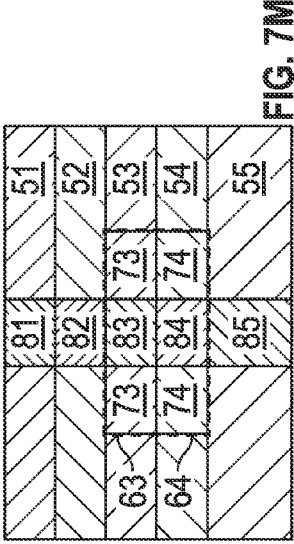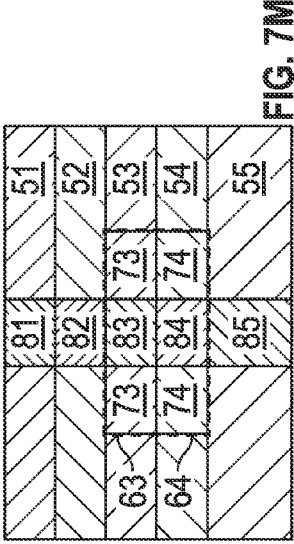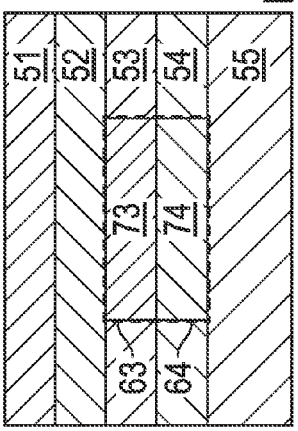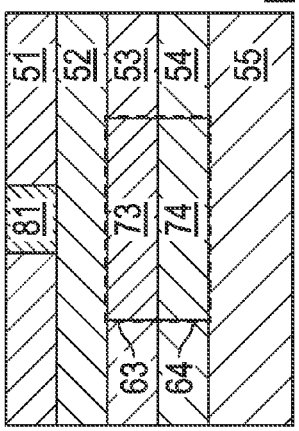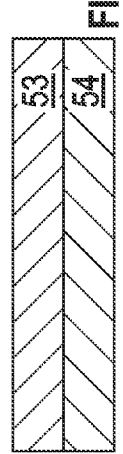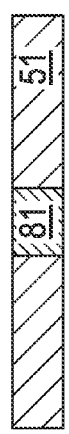

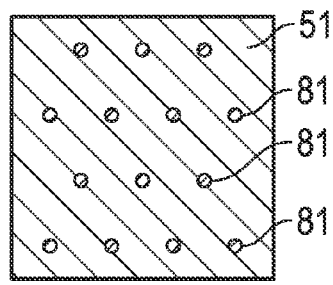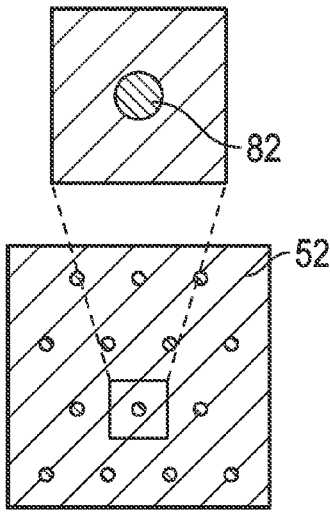
FIG. 8A
FIG. 8B
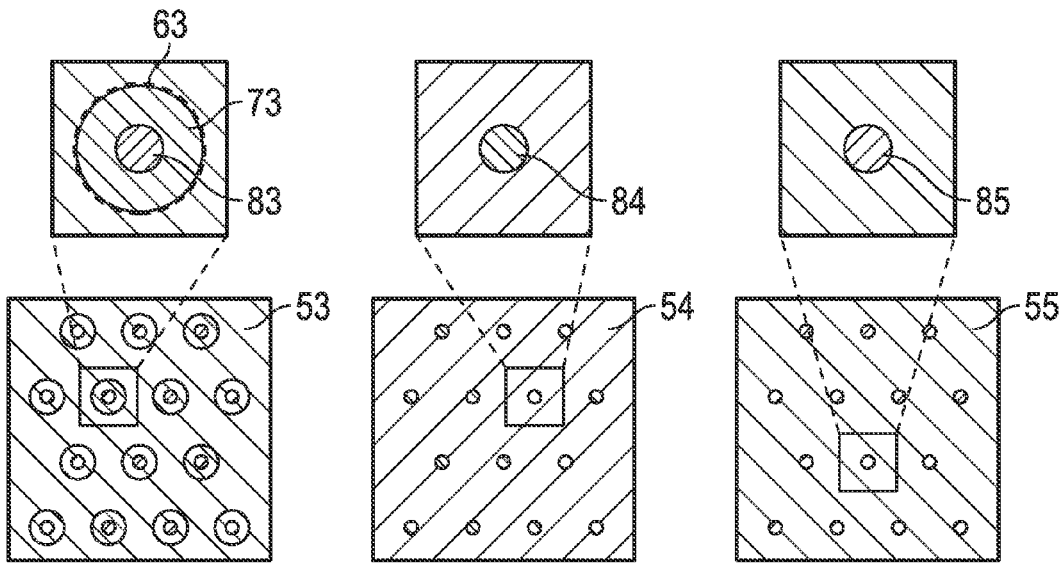
FIG. 8C
FIG. 8D
FIG. 8E
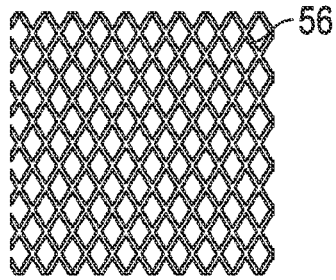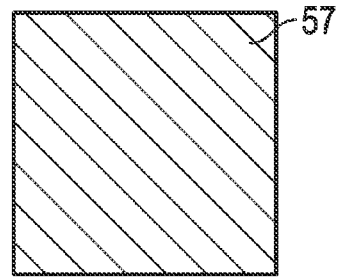
FIG. 8F
FIG. 8G

Figure 9:
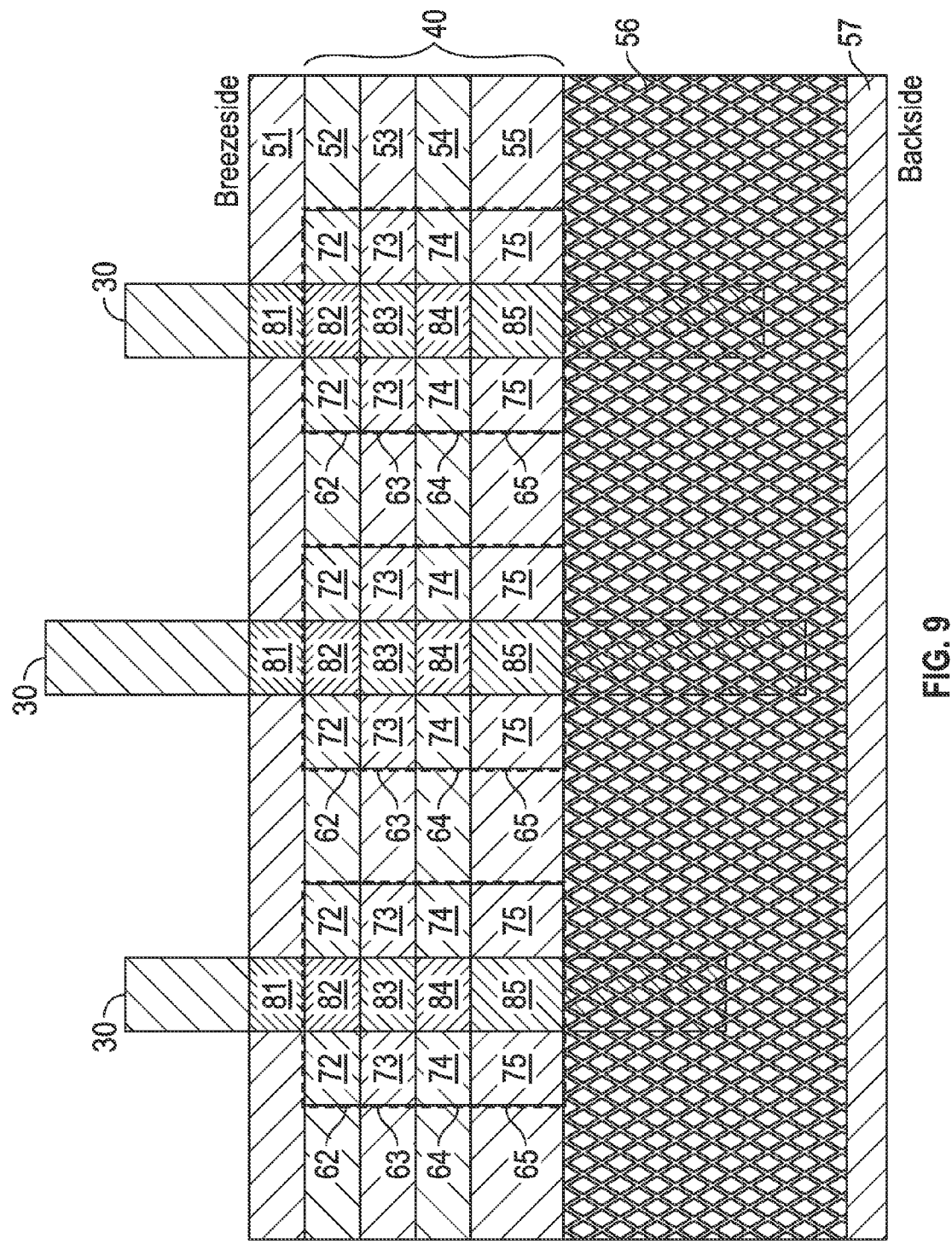
Figure 10:
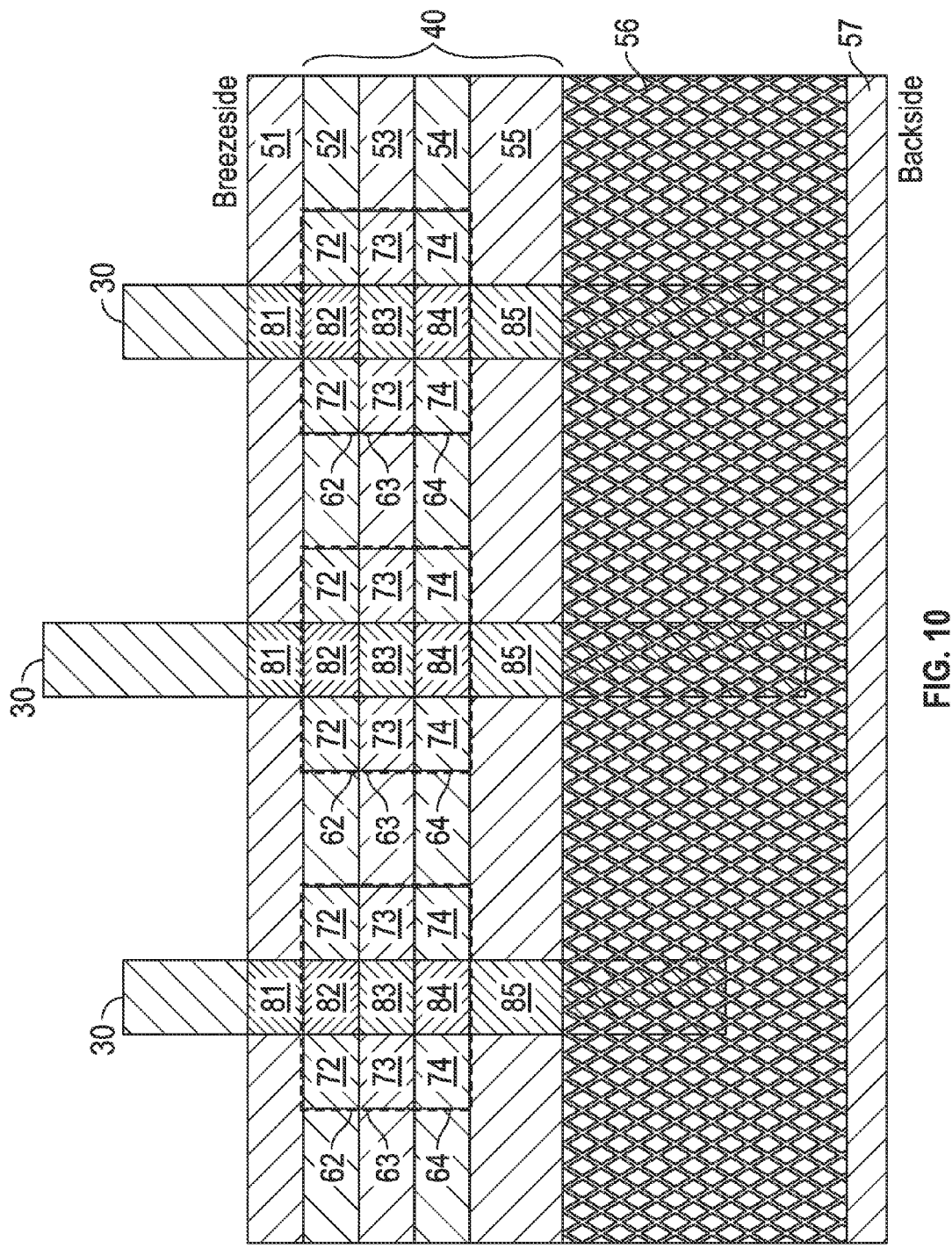
Figure 10A:
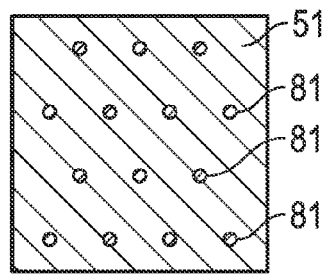
Figure 10B:
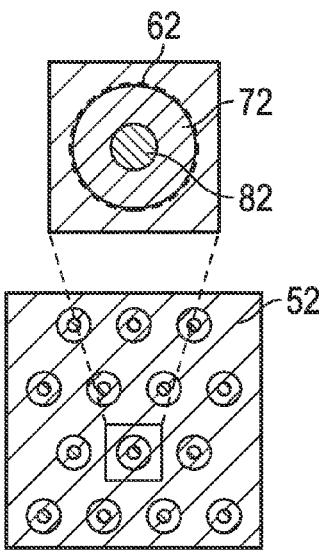
Figure 10C:
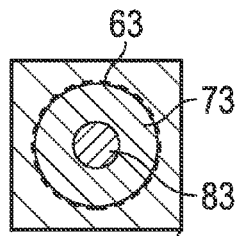
Figure 10C:
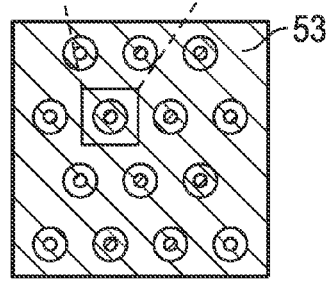
Figure 10D:
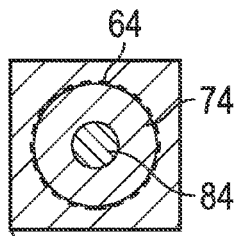
Figure 10D:
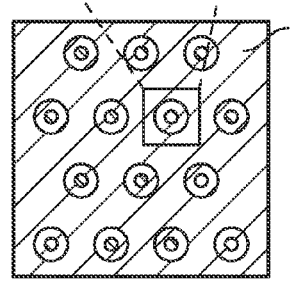
Figure 10E:
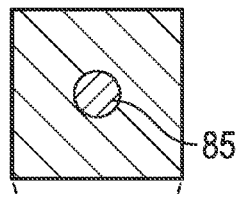
Figure 10E:
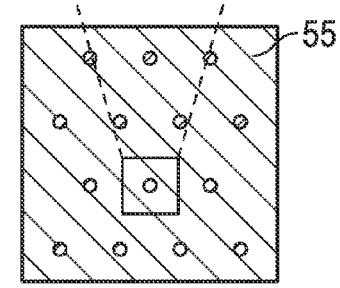
Figure 10F:
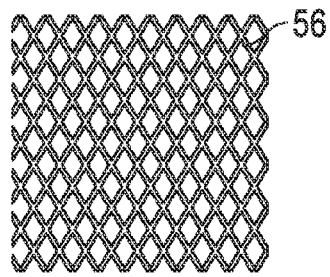
Figure 10G:
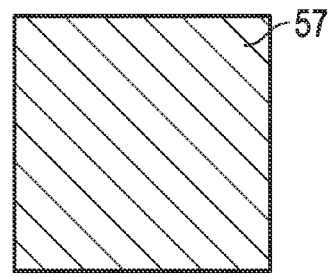
Figure 11:
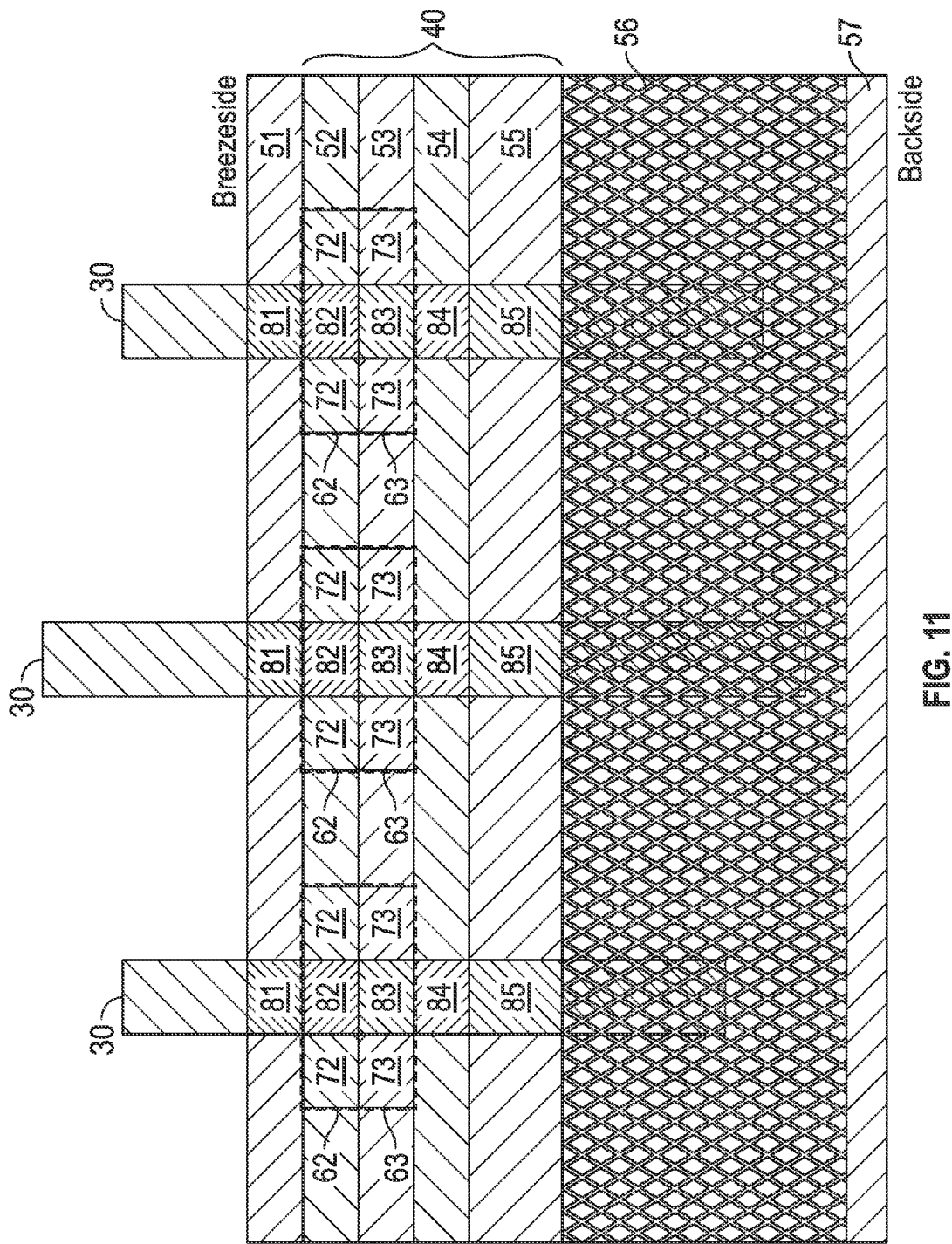
Figure 11A:
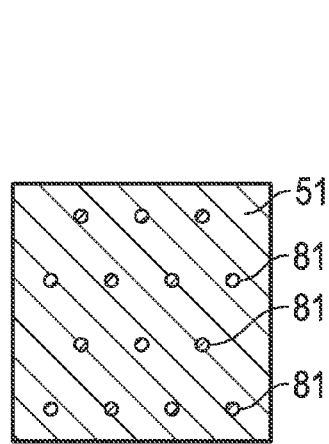
Figure 11B:
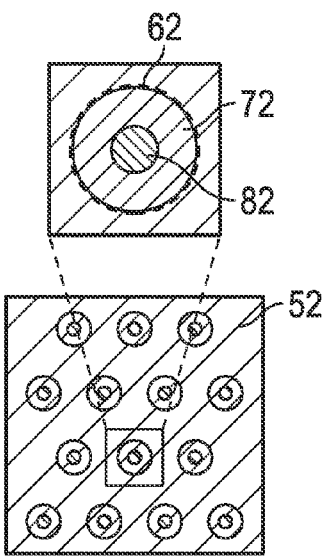
Figure 11C:
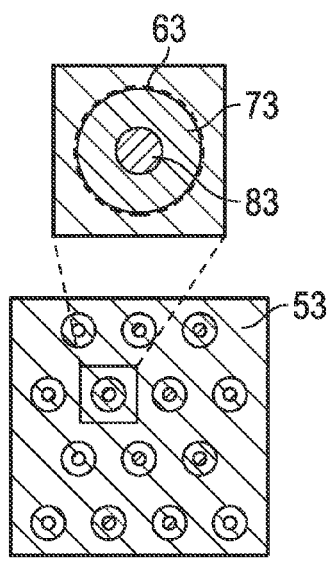
Figure 11D:
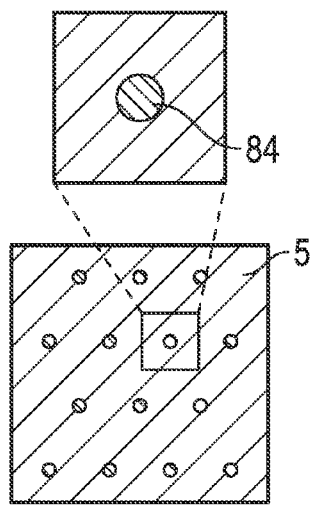
Figure 11E:
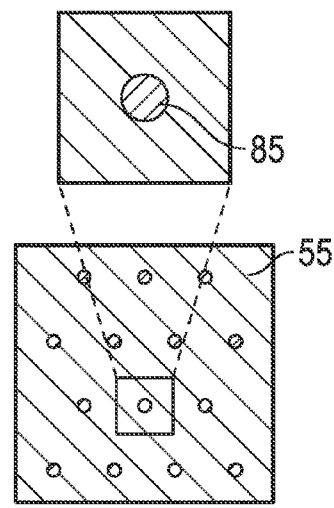
Figure 11F:
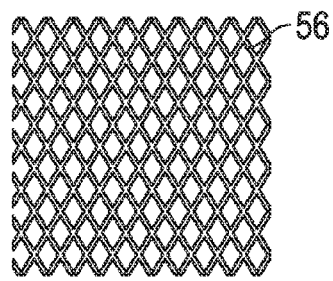
Figure 11G:
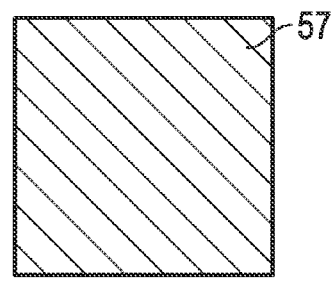
Figure 12:
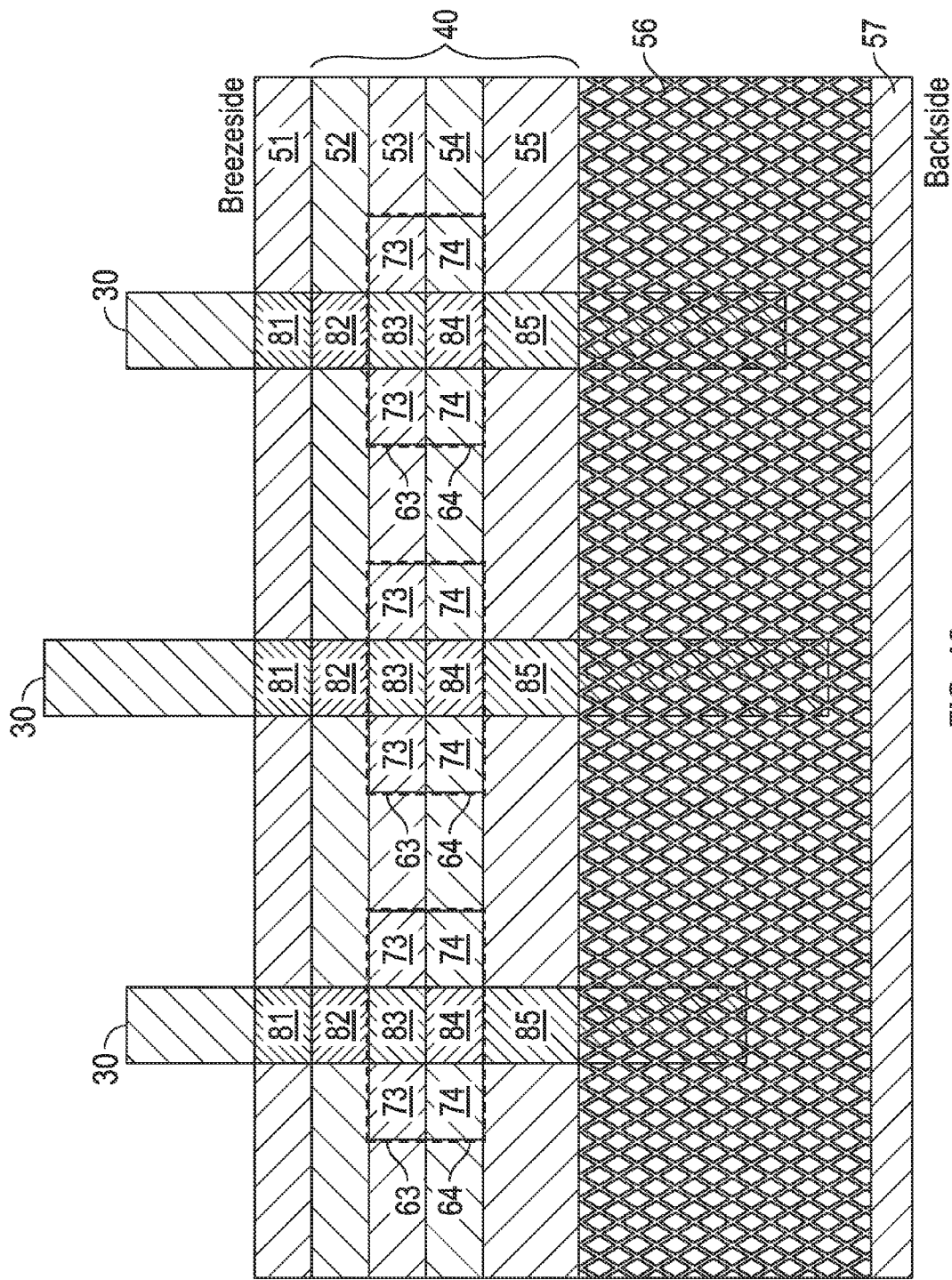
Figure 12A:
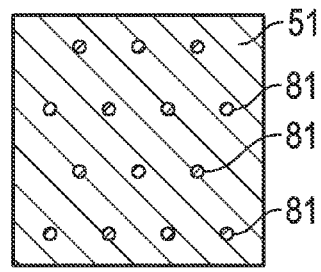
Figure 12B:
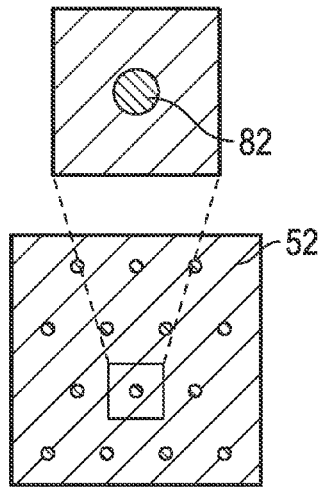
Figure 12C:
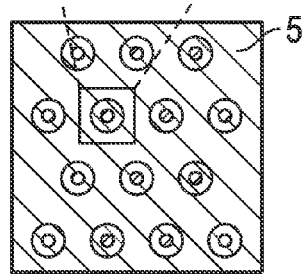
Figure 12D:
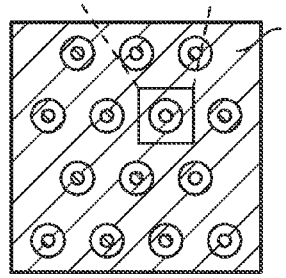
Figure 12E:
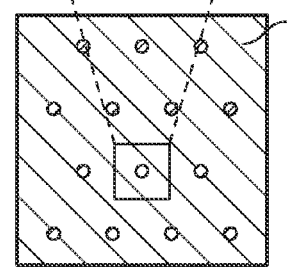
Figure 12F:
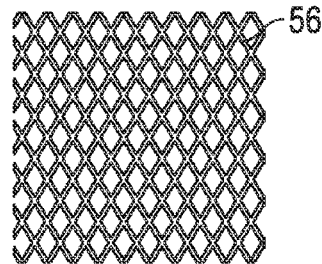
Figure 12G:
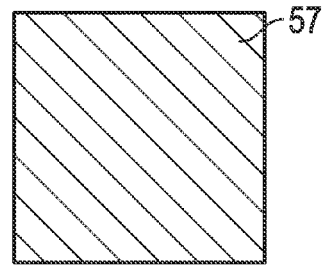

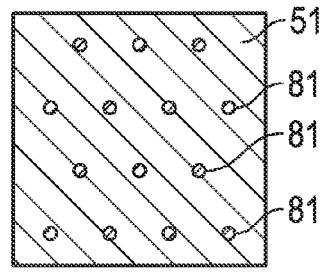
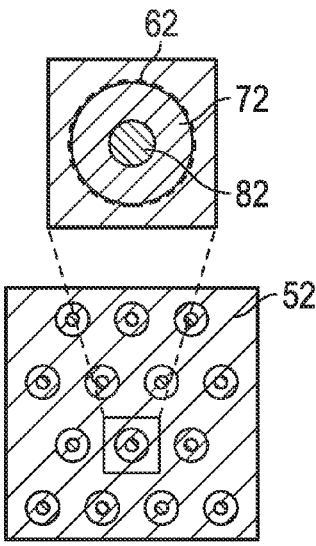
FIG. 9A
FIG. 9B
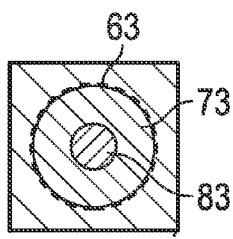
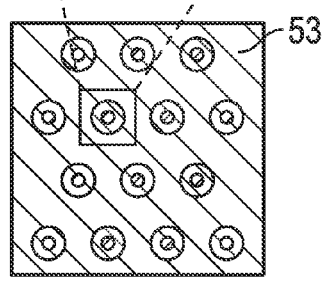
FIG. 9C
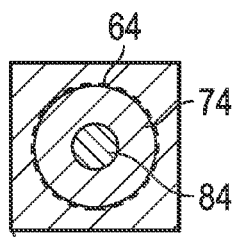
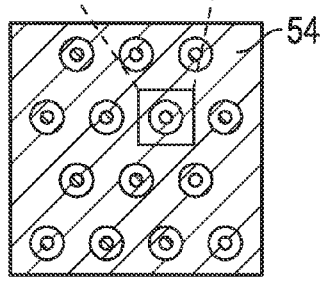
FIG. 9D
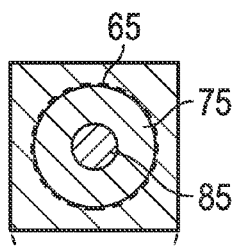
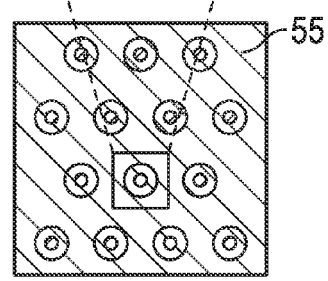
FIG. 9E
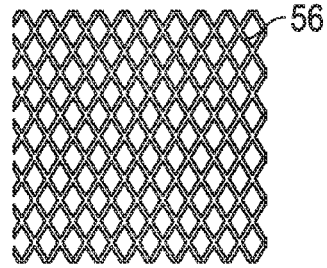
FIG. 9F
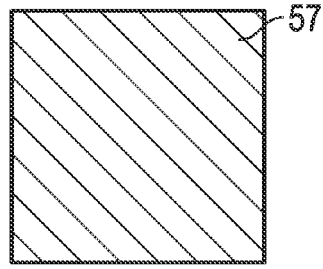
FIG. 9G

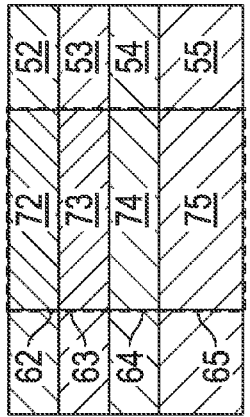
FIG. 9H
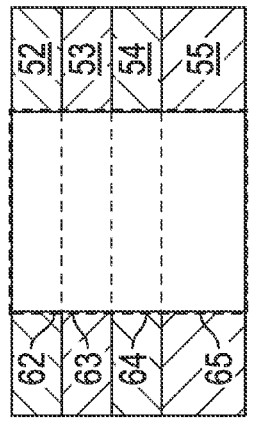
FIG. 9K
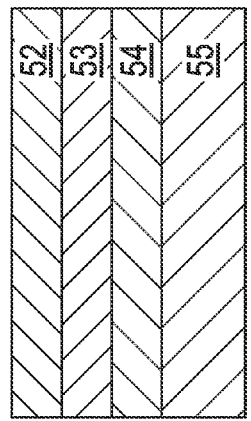
FIG. 9N
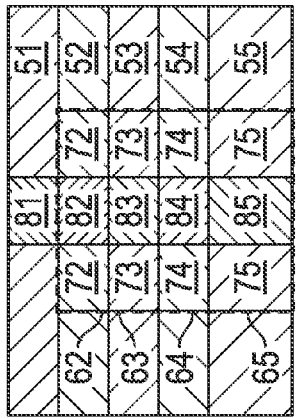
FIG. 9I
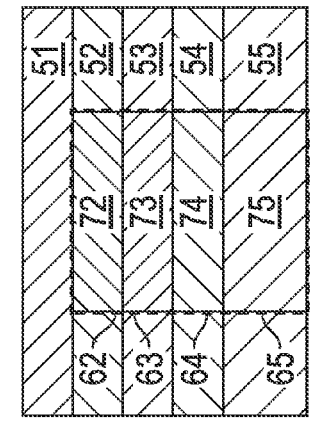
FIG. 9L
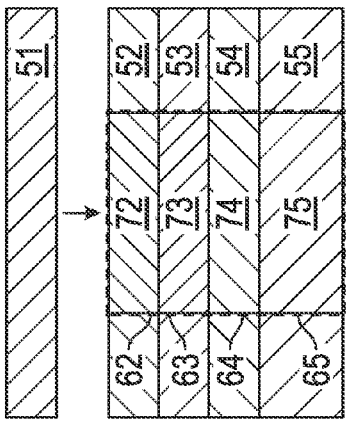
FIG. 9O
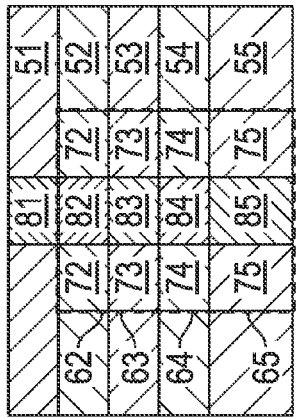
FIG. 9J
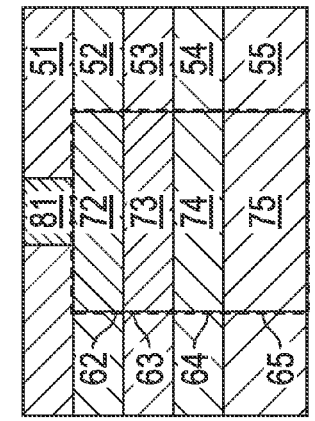
FIG. 9M
FIG. 9P

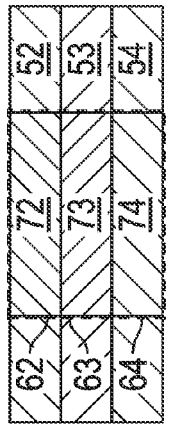
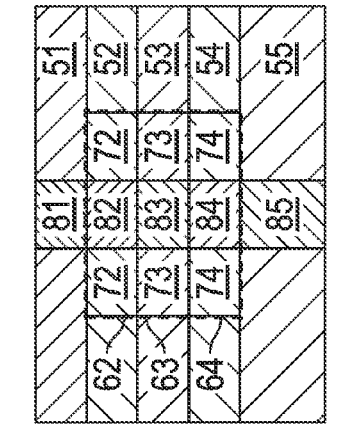
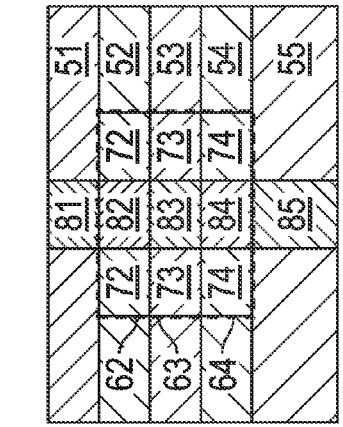
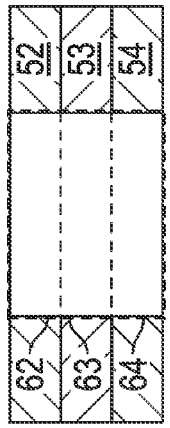
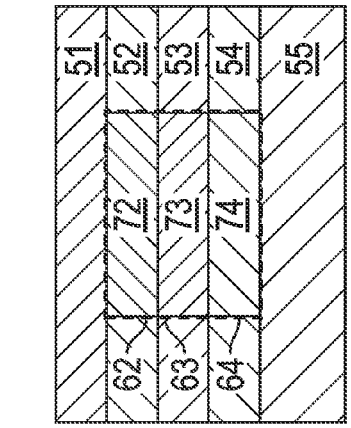
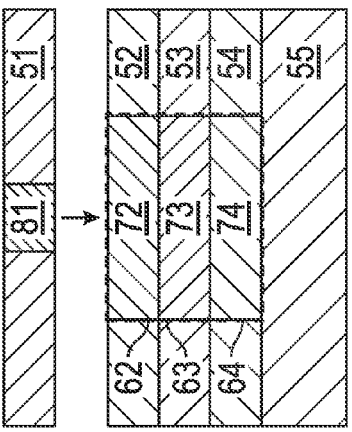
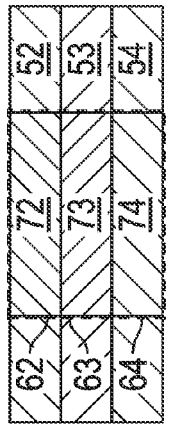
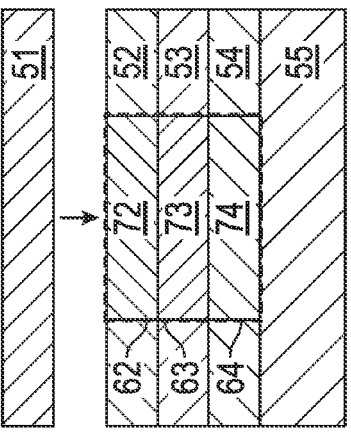
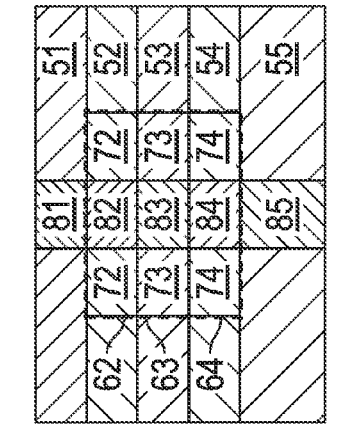

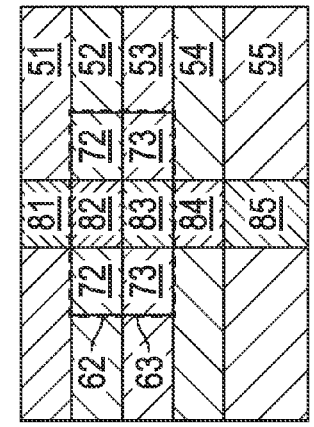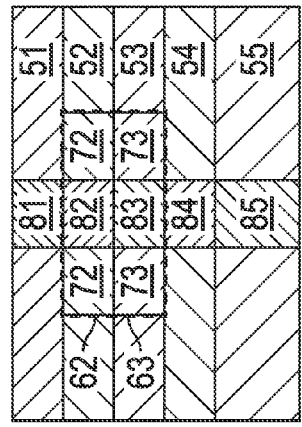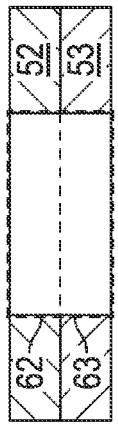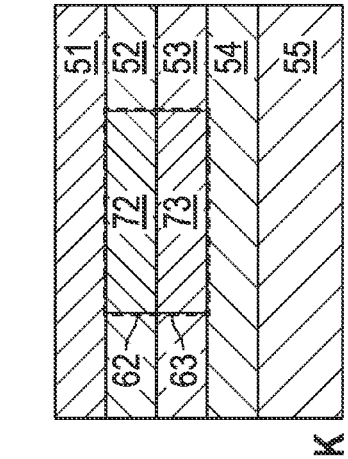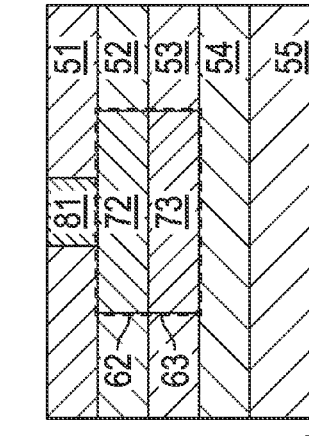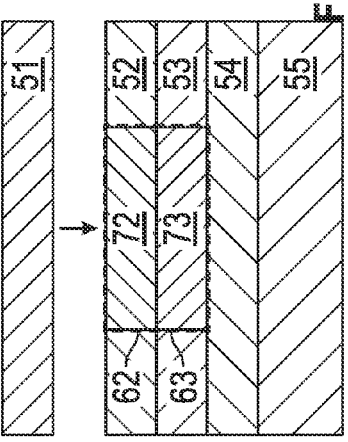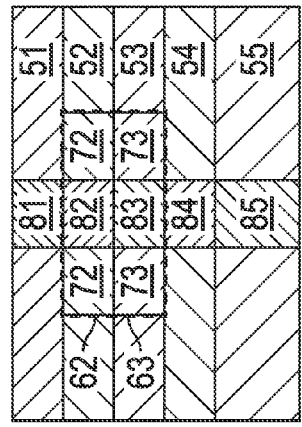

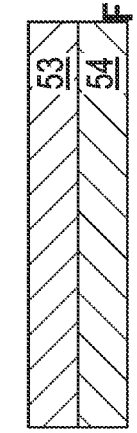
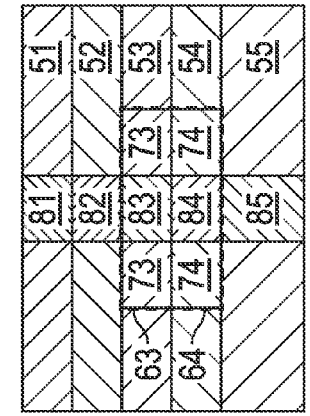
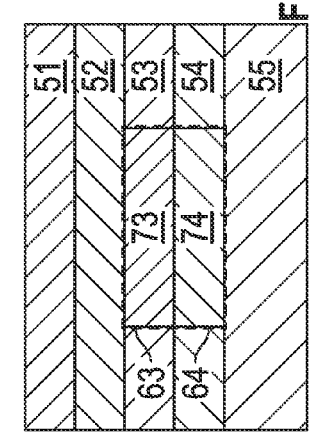
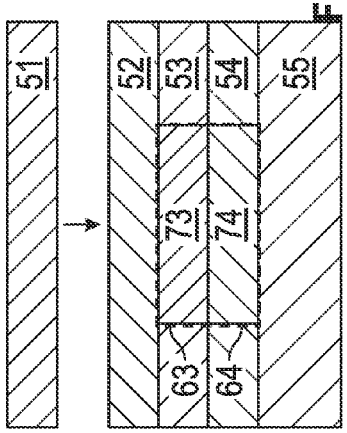
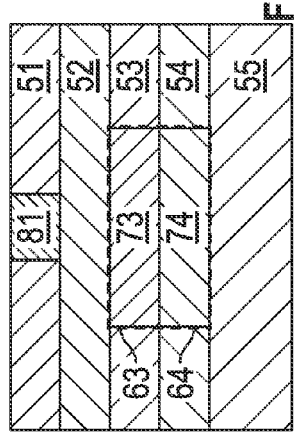

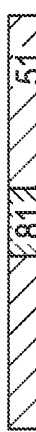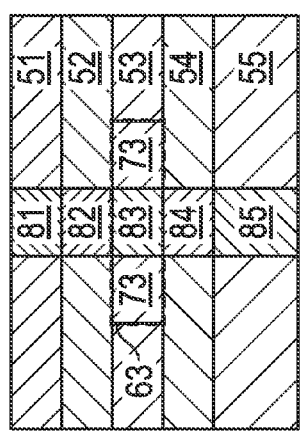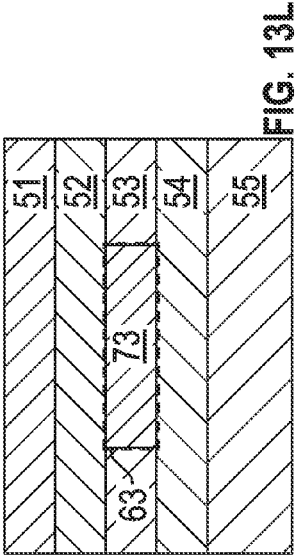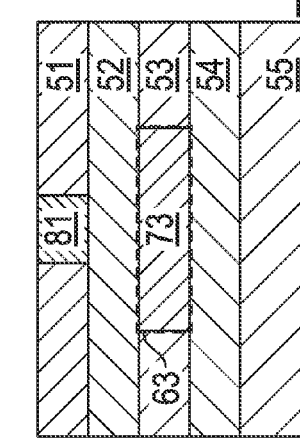

Figure 14:
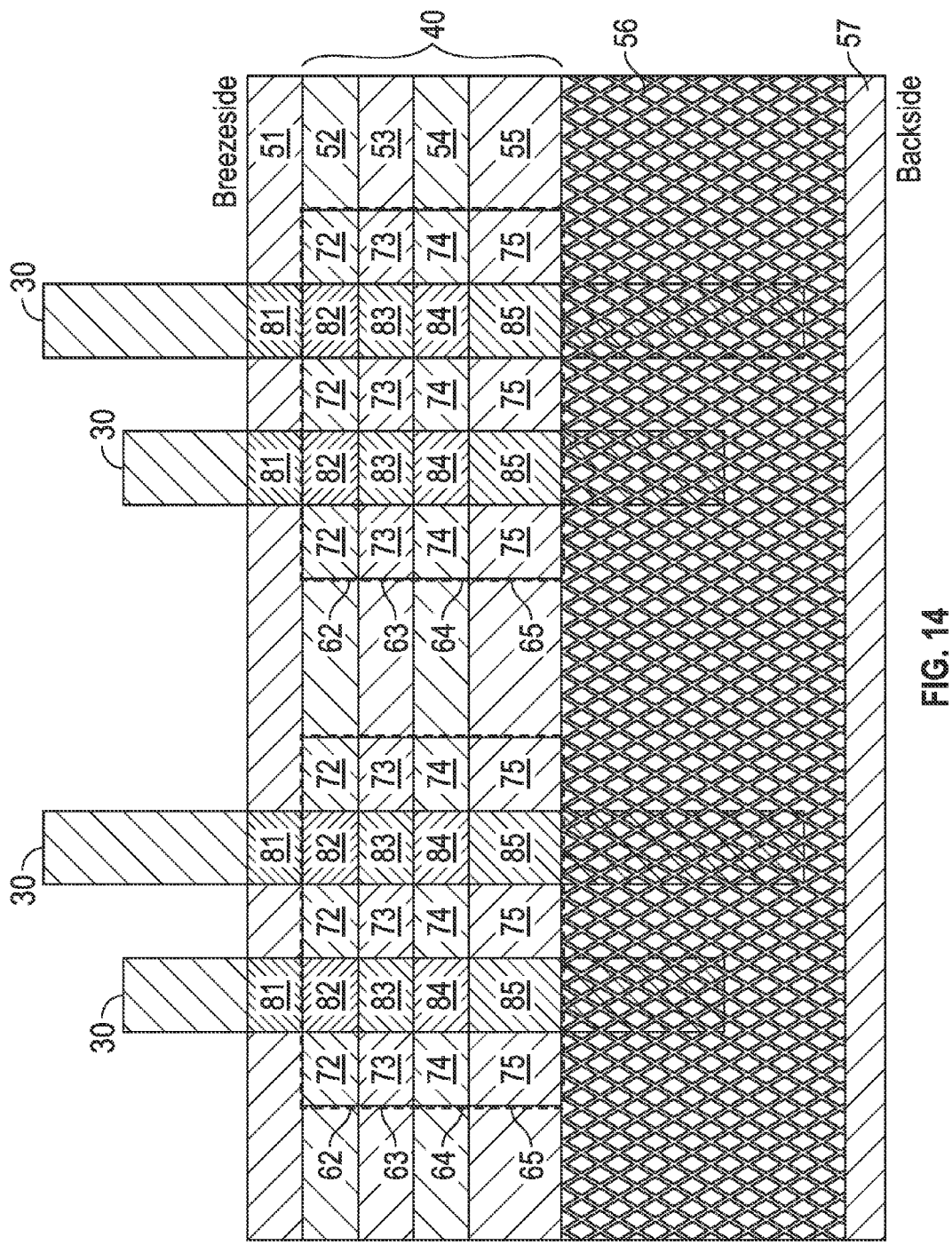
Figure 15:
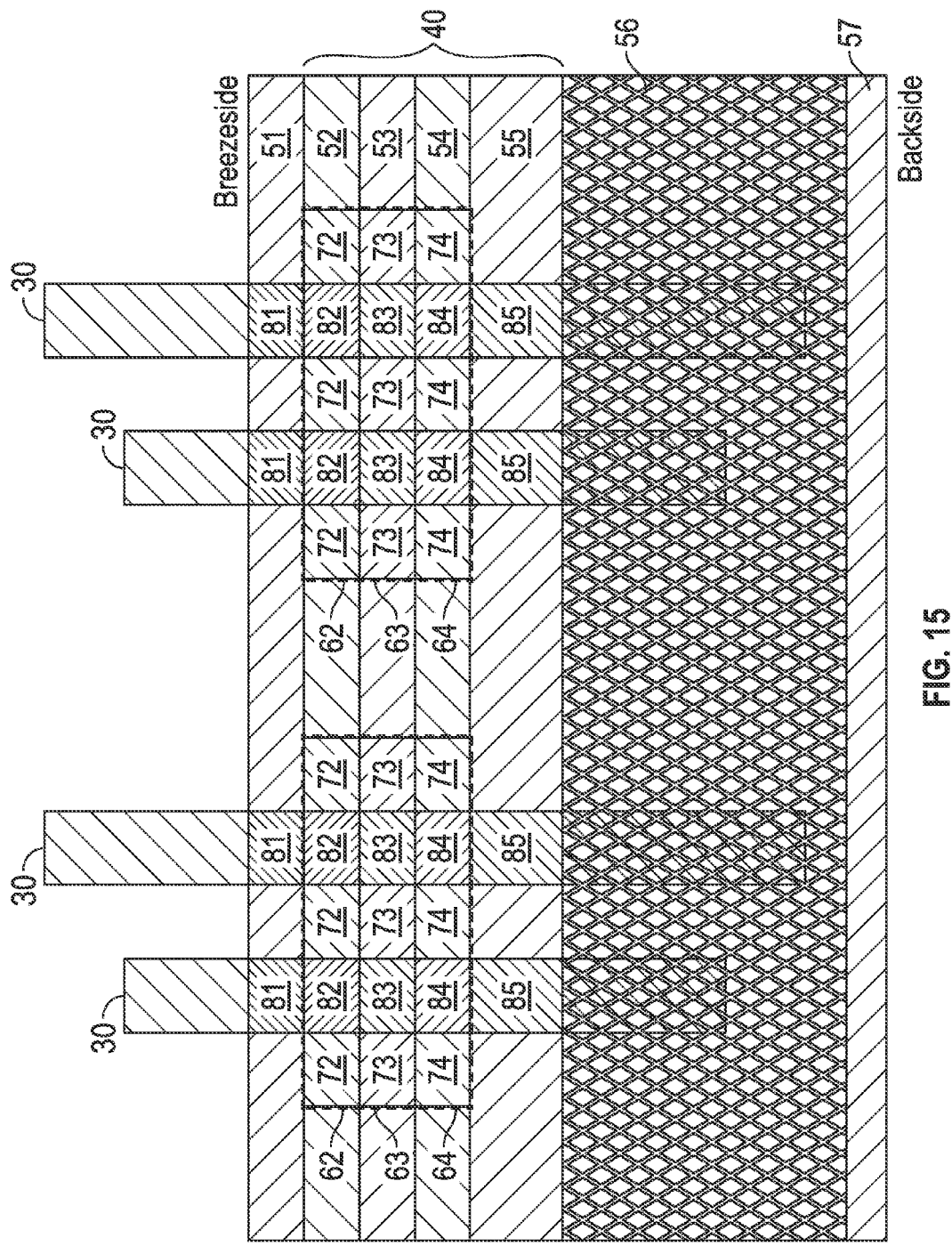
Figure 15A:
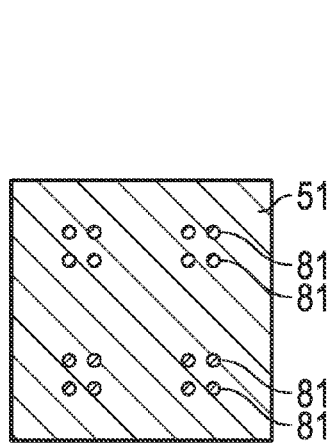
Figure 15B:
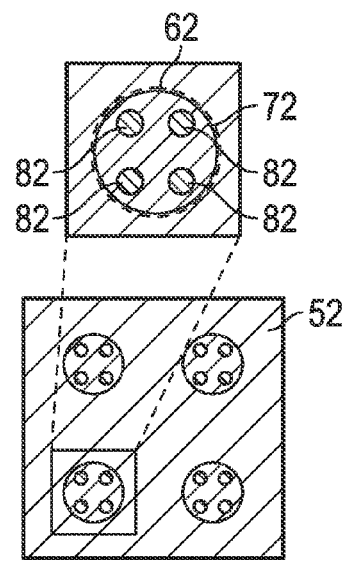
Figure 15C:
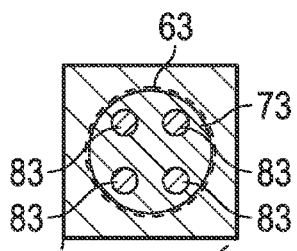
Figure 15D:
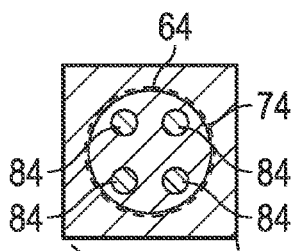
Figure 15E:
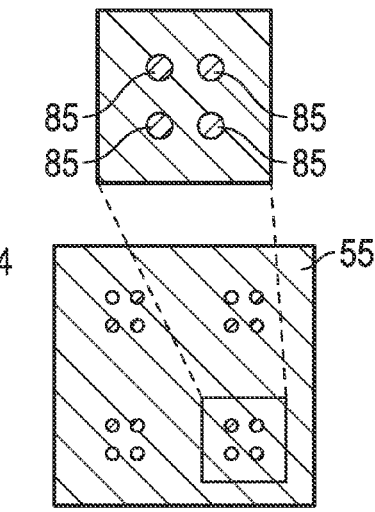
Figure 15F:
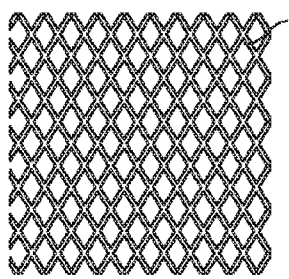
Figure 15G:
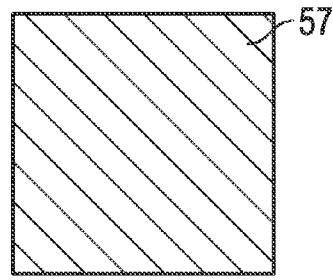

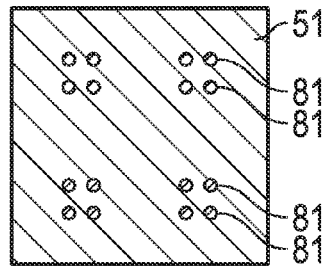
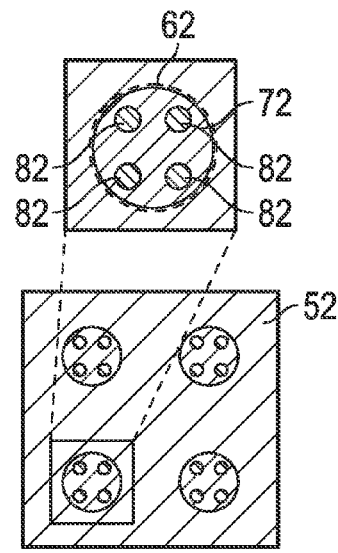
FIG. 14A
FIG. 14B
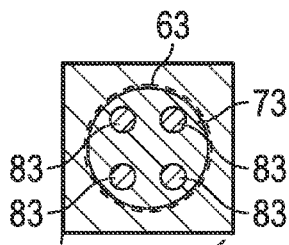
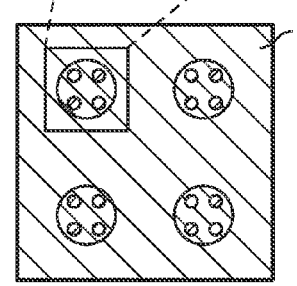
FIG. 14C
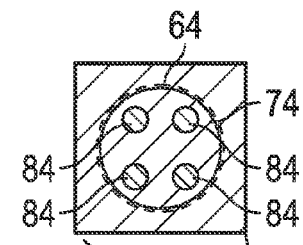
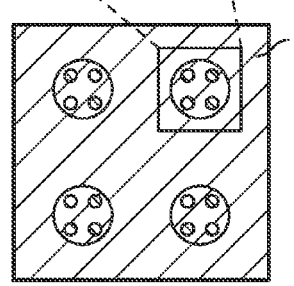
FIG. 14D
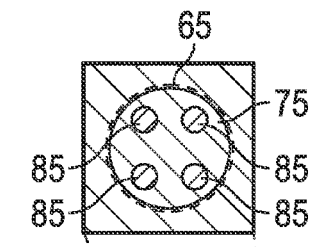
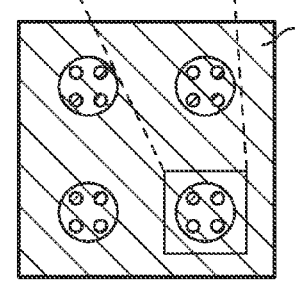
FIG. 14E
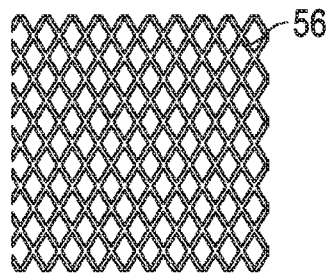
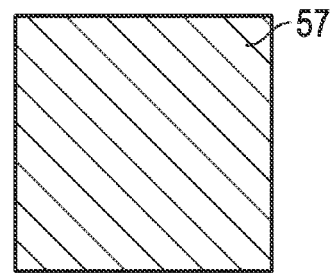
FIG. 14F
FIG. 14G

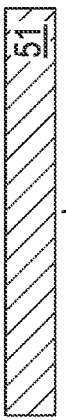

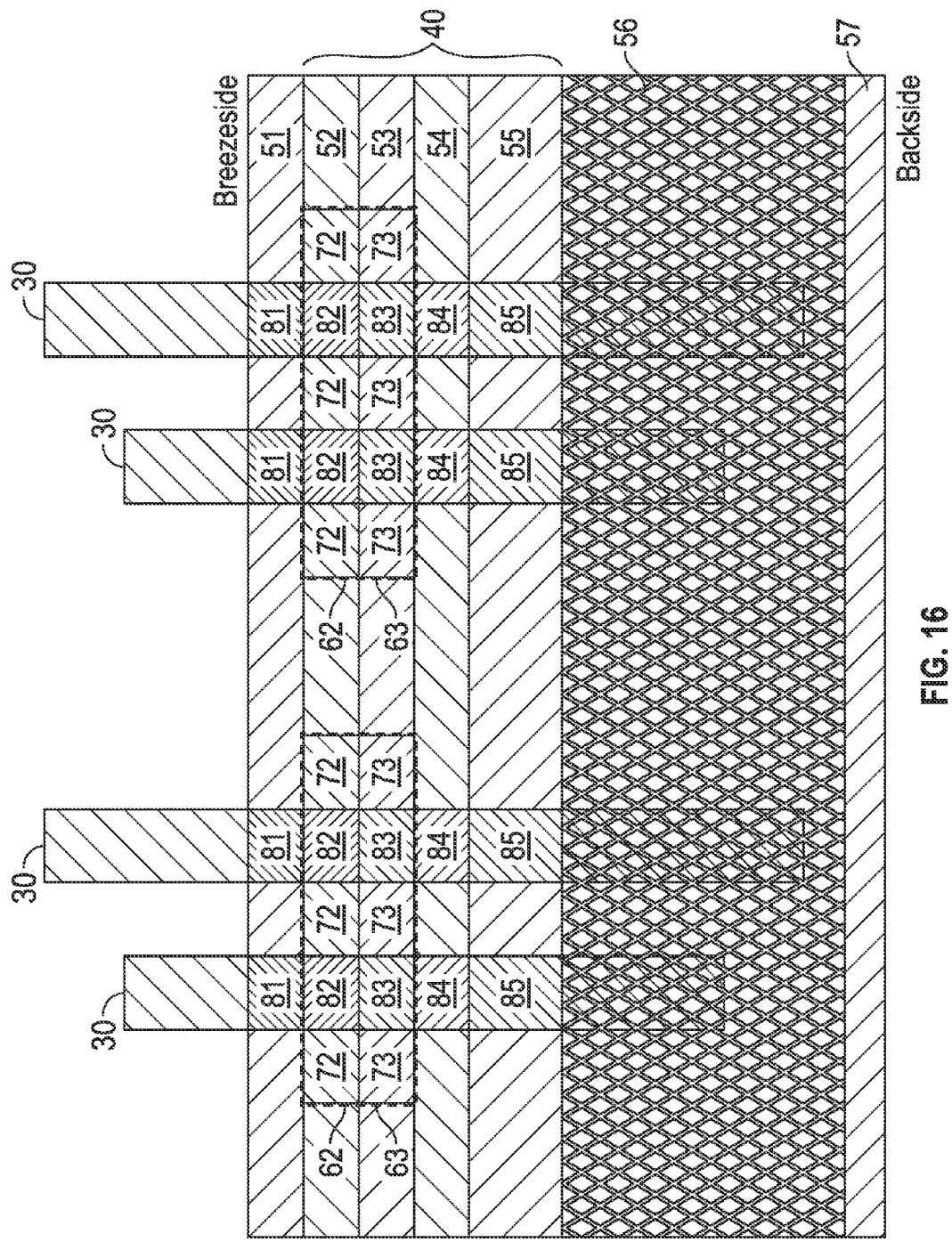

Figure 16A:
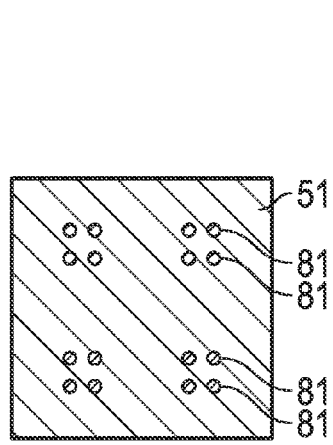
Figure 16B:
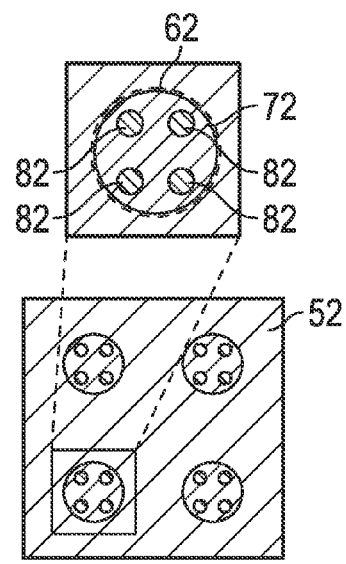
Figure 16C:
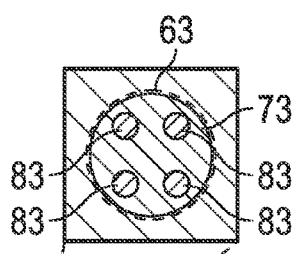
Figure 16D:
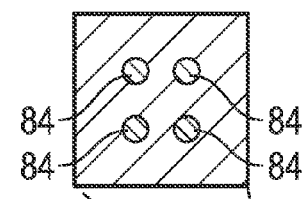
Figure 16E:
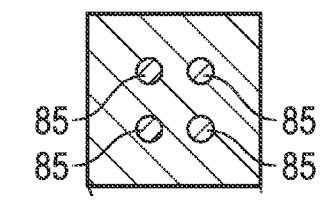
Figure 16F:
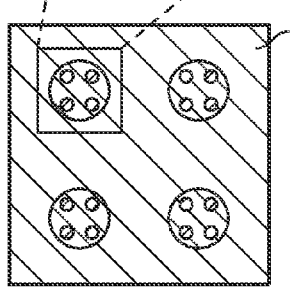
Figure 16F:
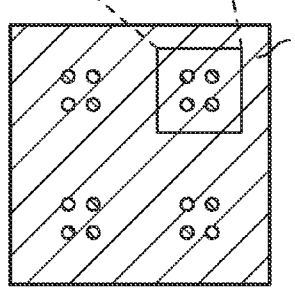
Figure 16F:
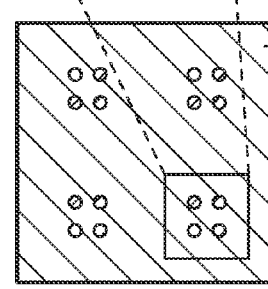
Figure 16F:
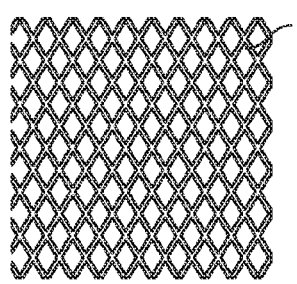
Figure 16G:
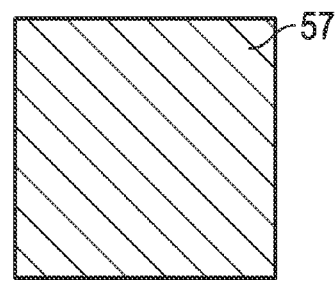
Figure 17A:
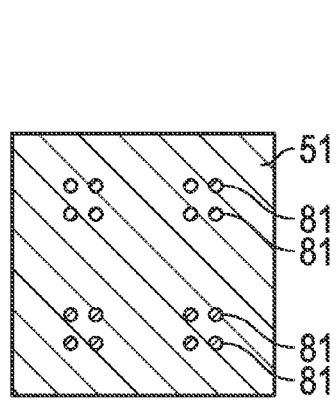
Figure 17B:
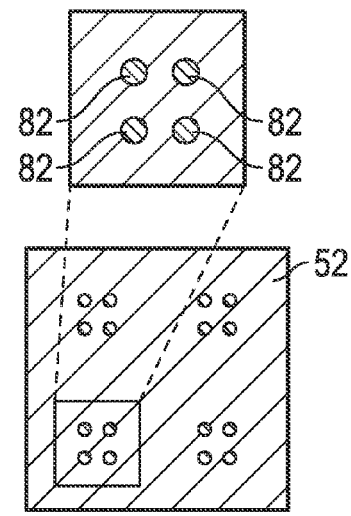
Figure 17C:
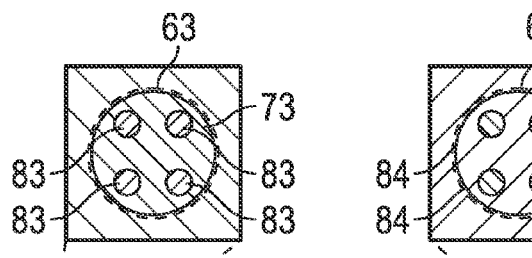
Figure 17D:
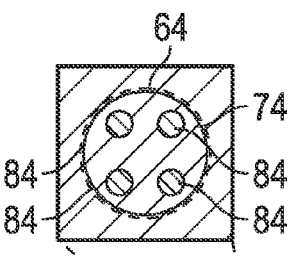
Figure 17E:
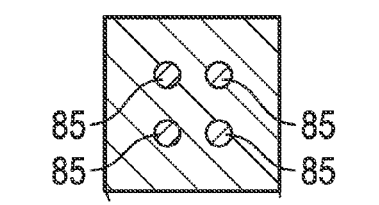
Figure 17F:
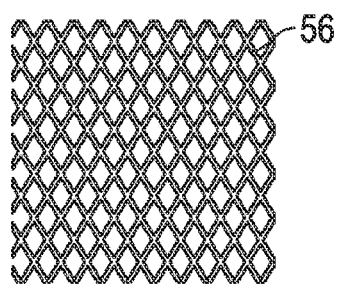
Figure 17G:
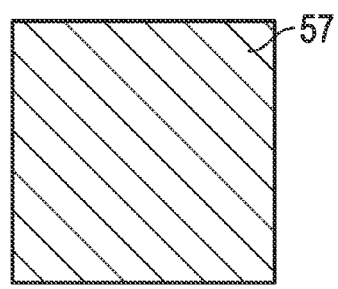

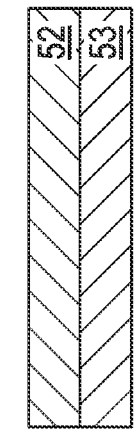
FIG. 16H
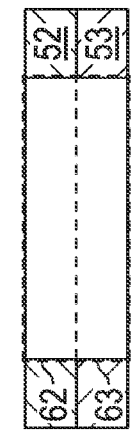
FIG. 16I
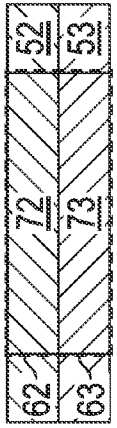
FIG. 16J
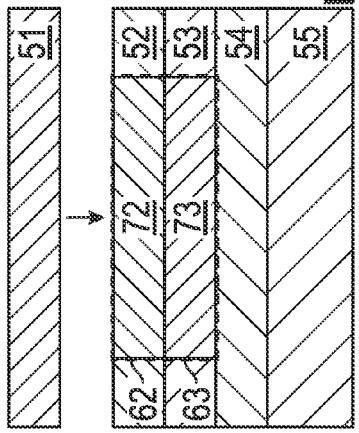
FIG. 16K
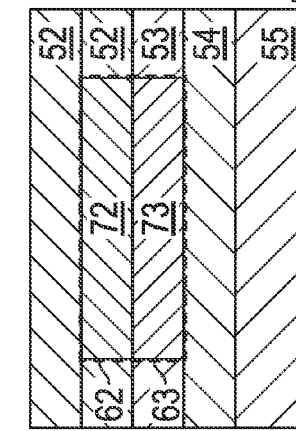
FIG. 16L
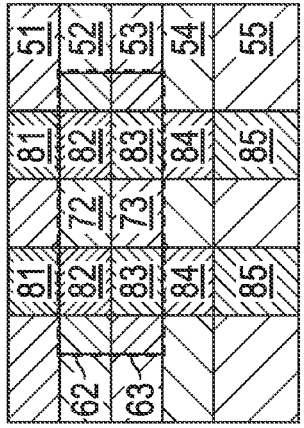
FIG. 16M
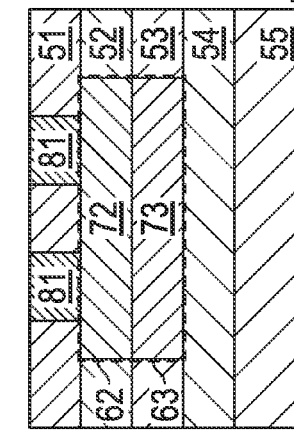
FIG. 16N
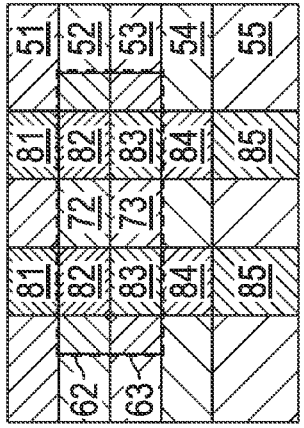
FIG. 16O
FIG. 16P

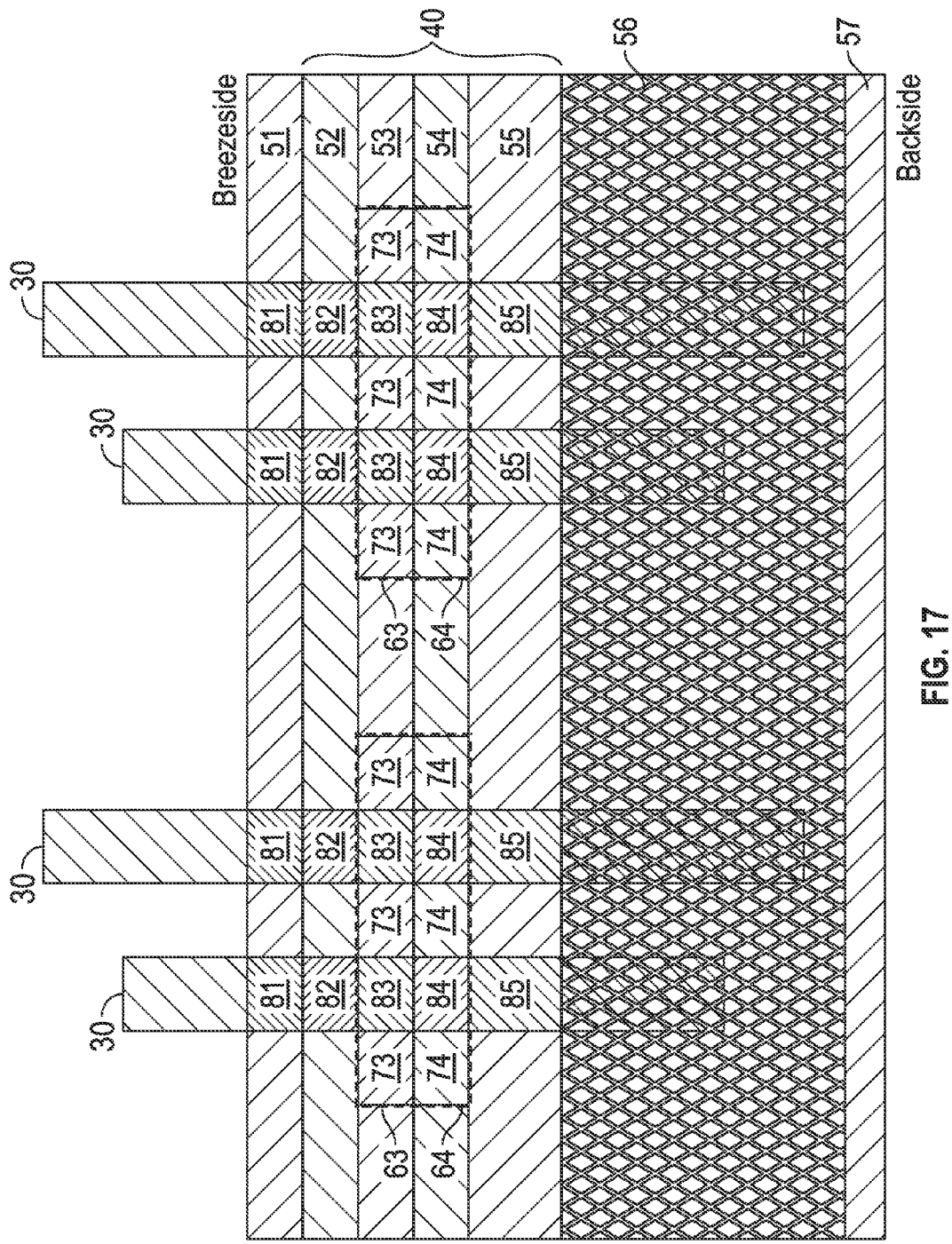

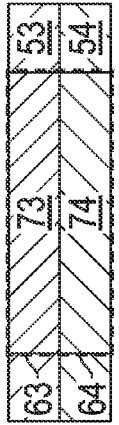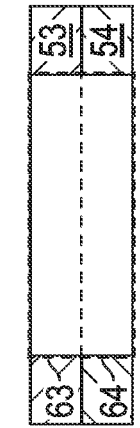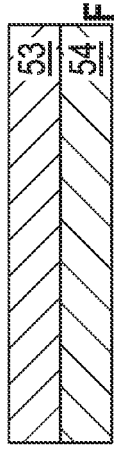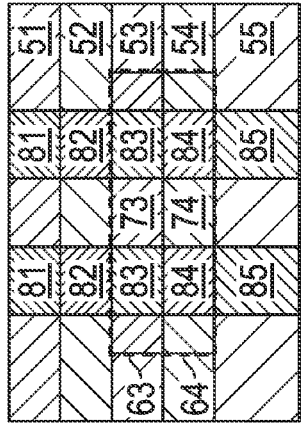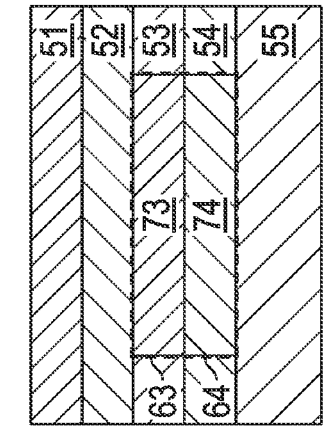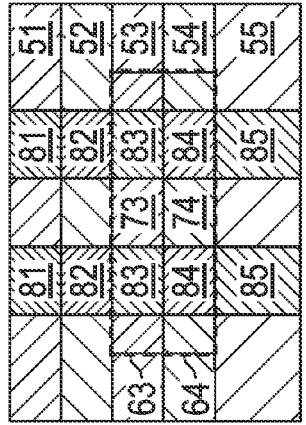
FIG. 17H   FIG. 17I   FIG. 17J
FIG. 17K   FIG. 17L   FIG. 17M
FIG. 17N   FIG. 17O   FIG. 17P

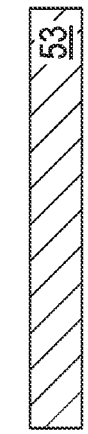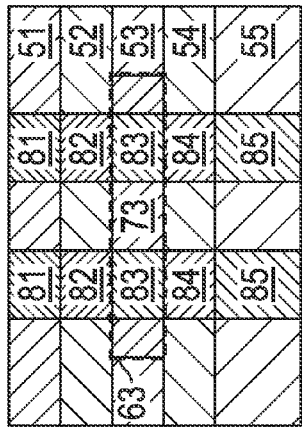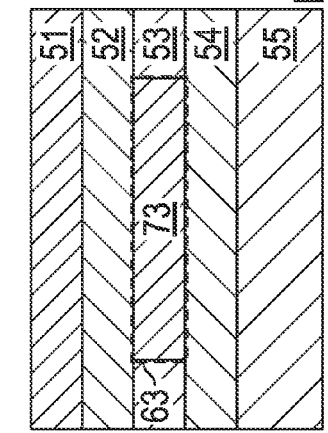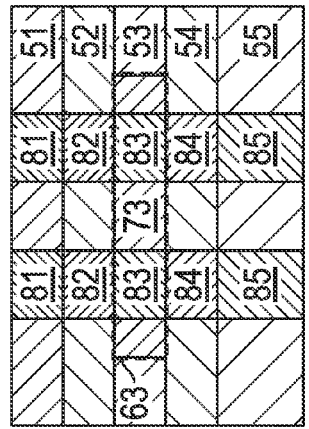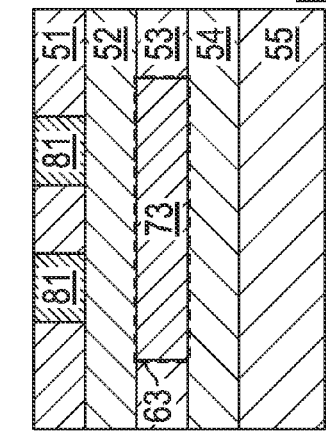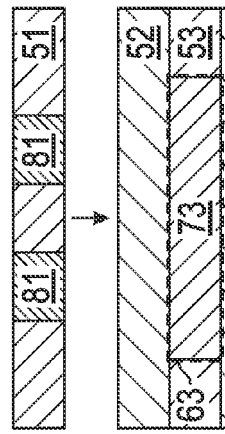

Figure 19:
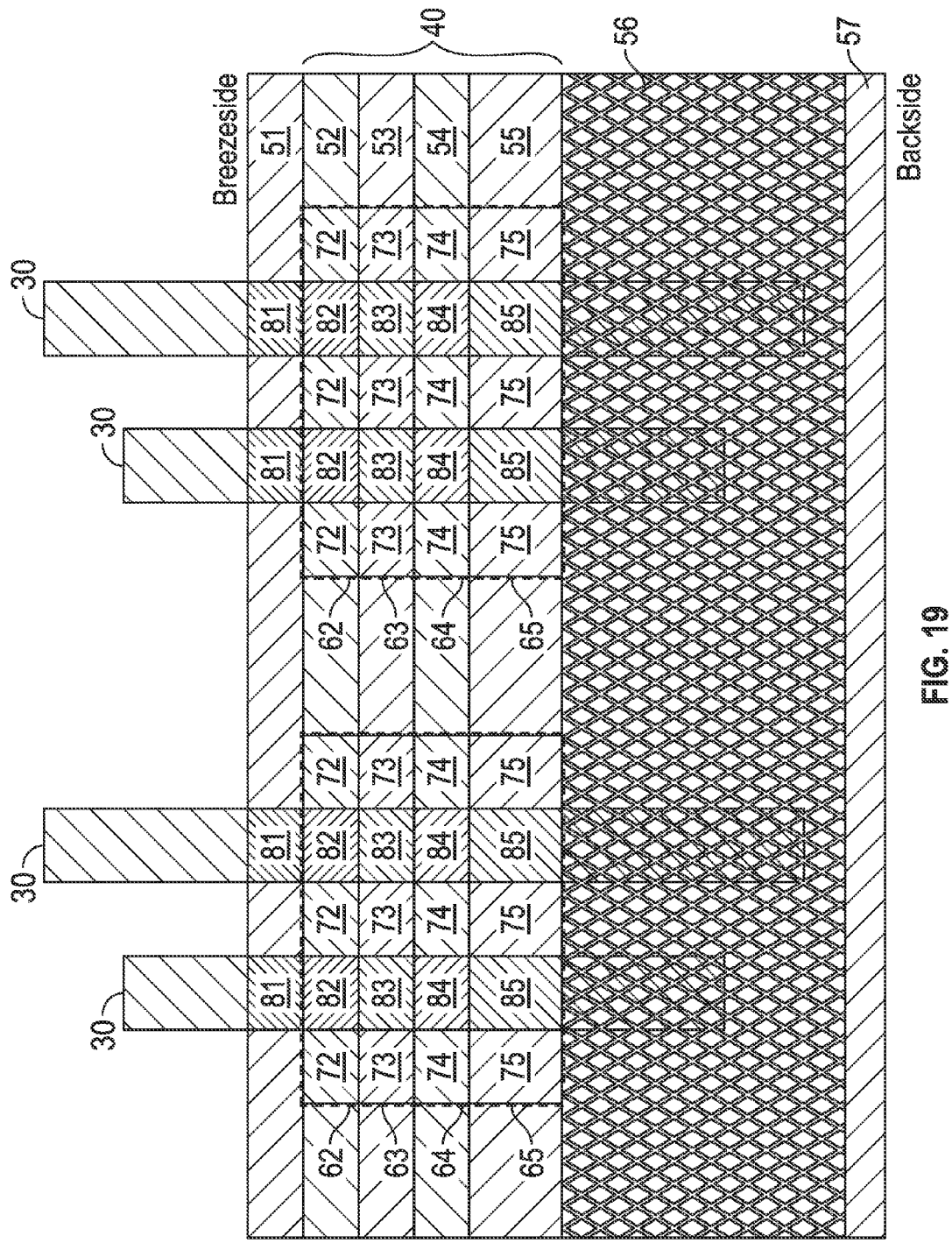

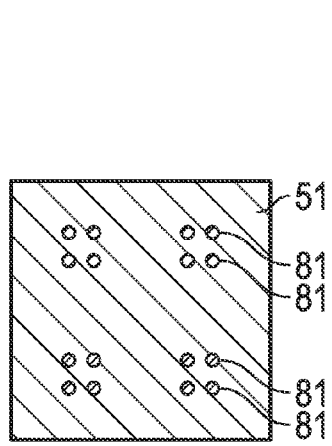
FIG. 19A
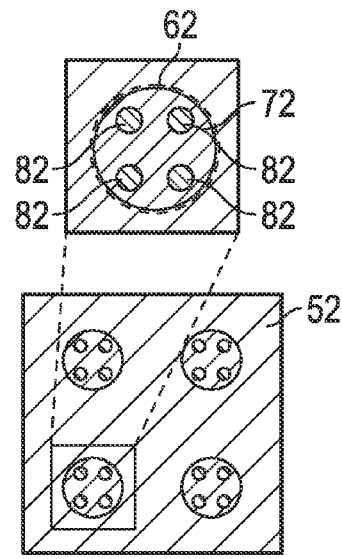
FIG. 19B
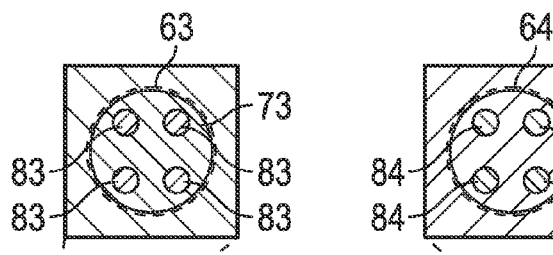
FIG. 19C
FIG. 19D
FIG. 19E
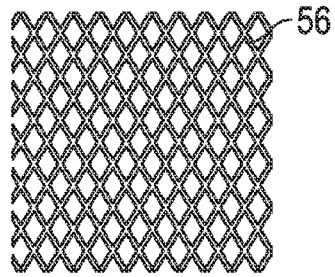
FIG. 19F
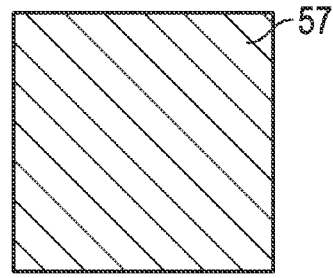
FIG. 19G

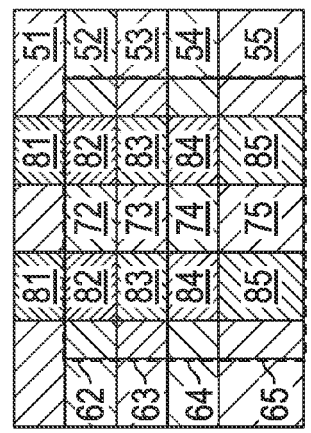
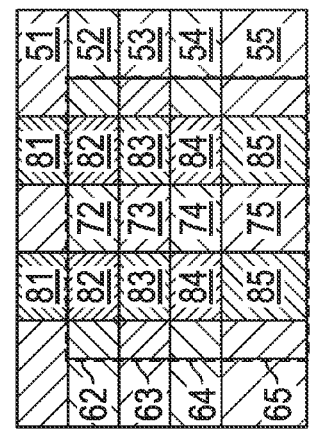
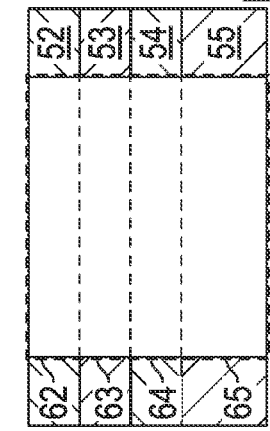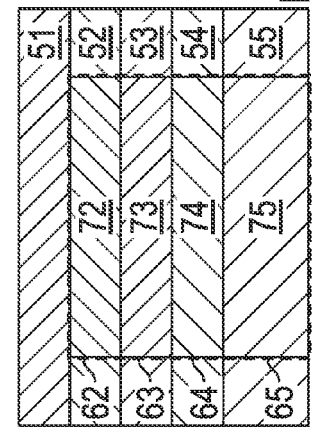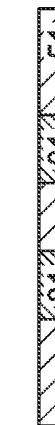
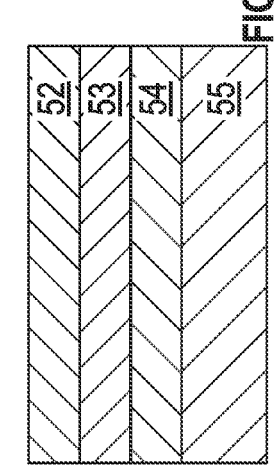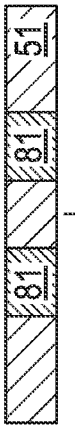

Figure 20:
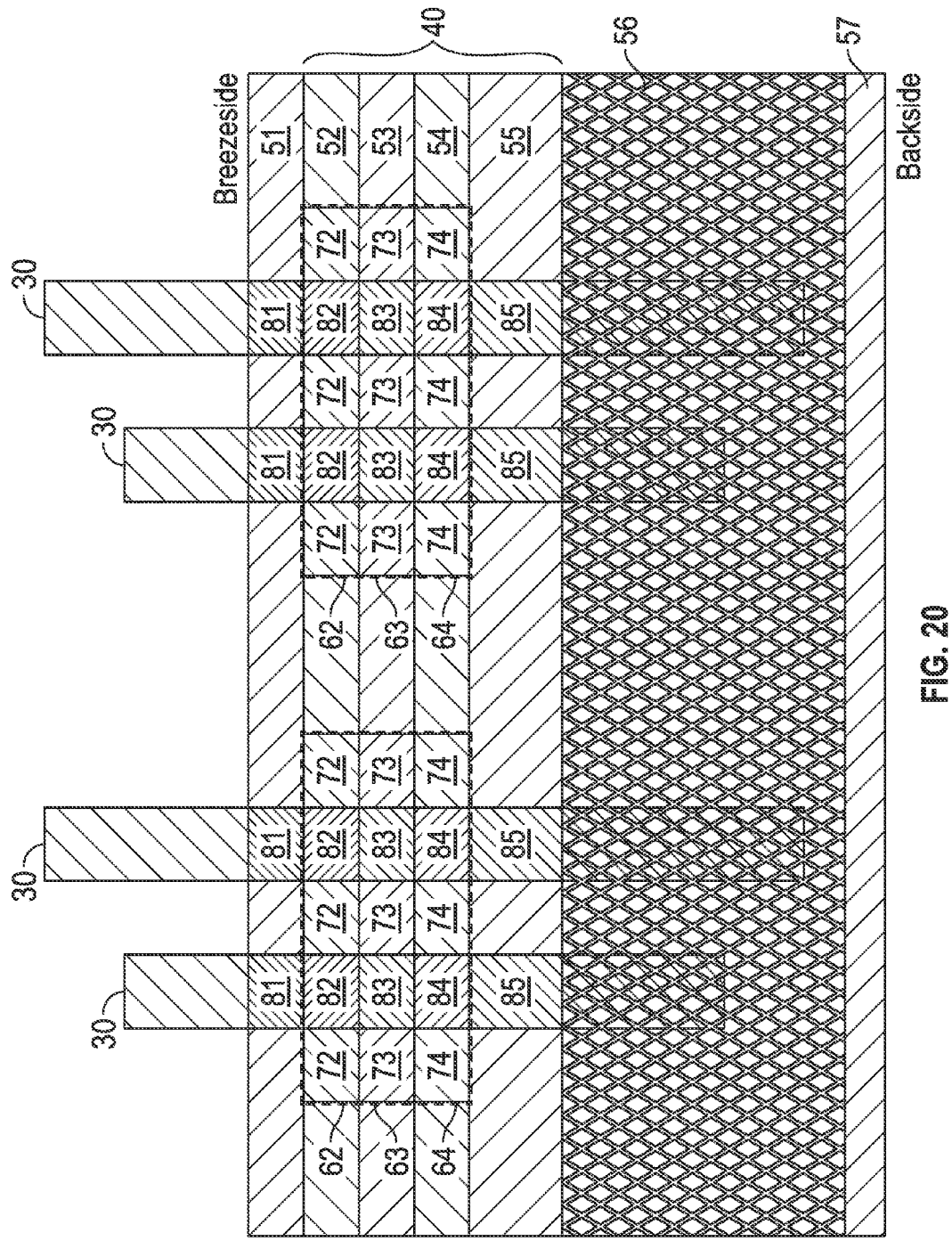
Figure 20A:
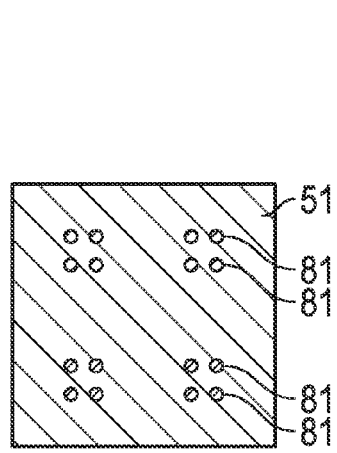
Figure 20B:
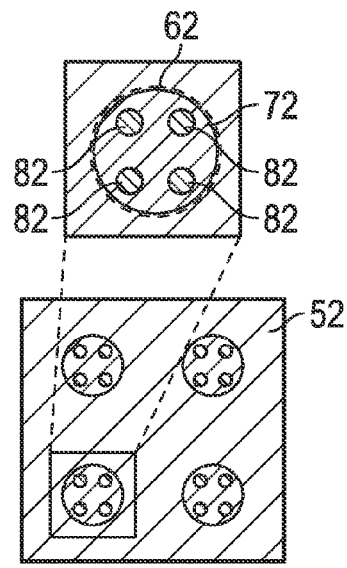
Figure 20C:
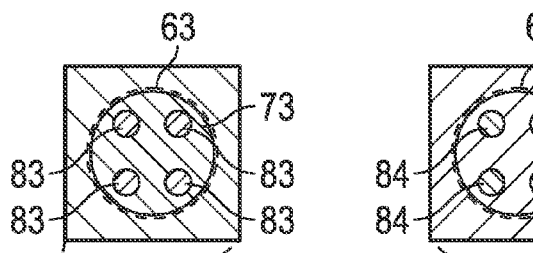
Figure 20D:
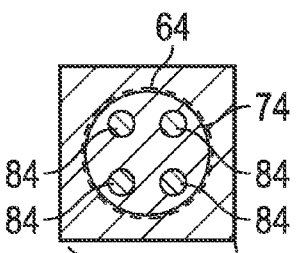
Figure 20E:
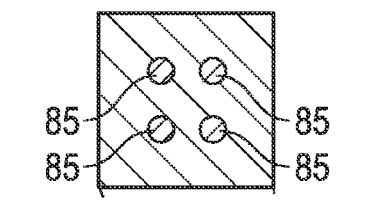
Figure 20F:
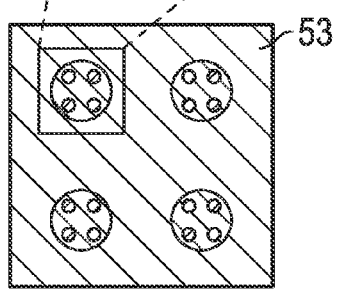
Figure 20F:
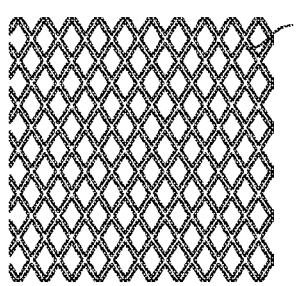
Figure 20G:
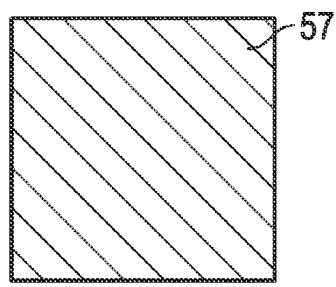

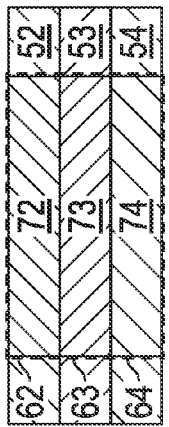
FIG. 20H
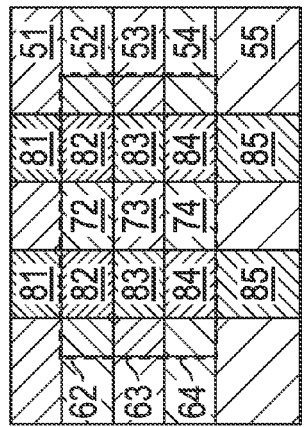
FIG. 20K
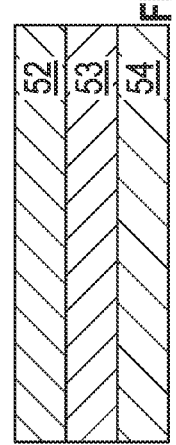
FIG. 20N
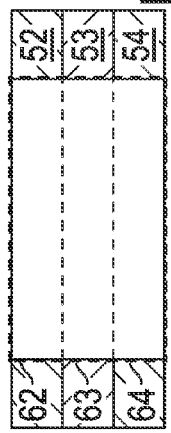
FIG. 20I
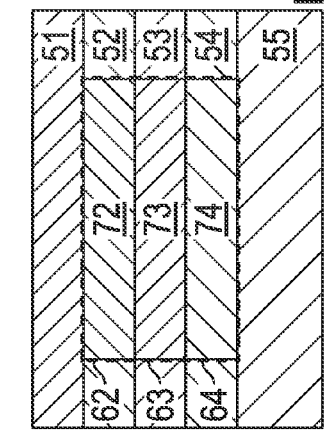
FIG. 20L
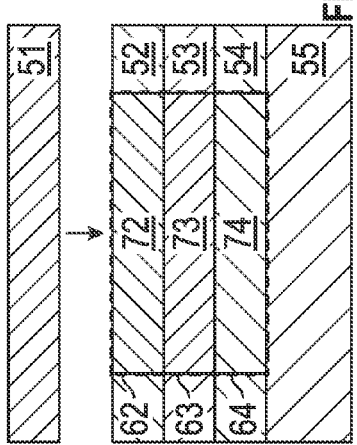
FIG. 20O
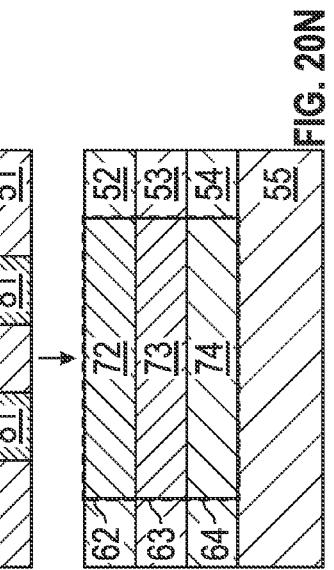
FIG. 20J / FIG. 20M / FIG. 20P

Figure 21:
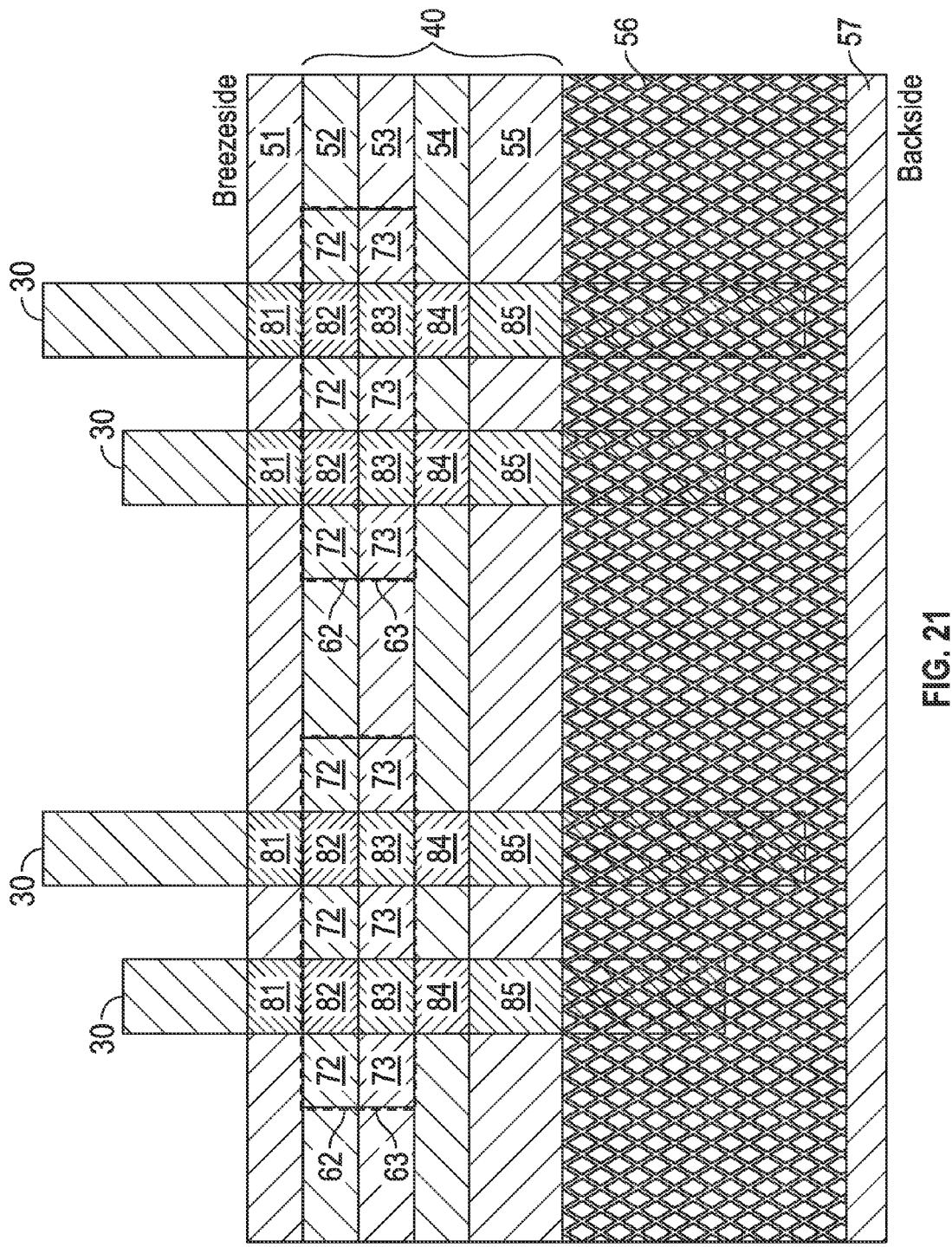
Figure 21A:
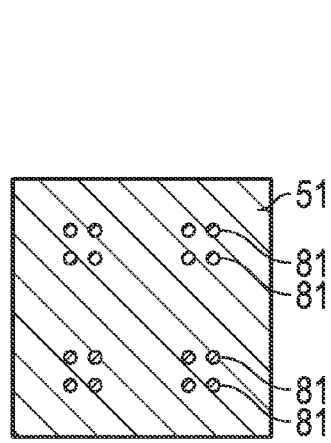
Figure 21B:
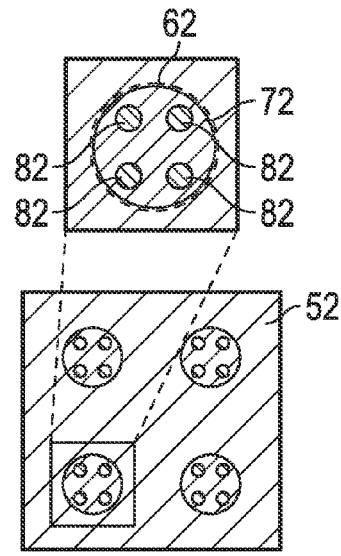
Figure 21C:
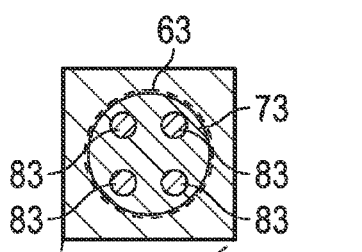
Figure 21D:
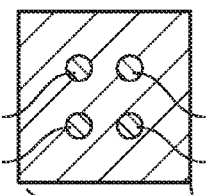
Figure 21E:
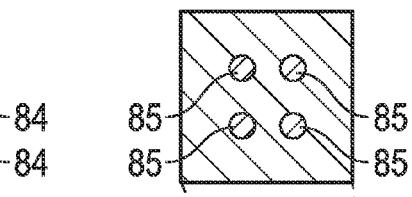
Figure 21F:
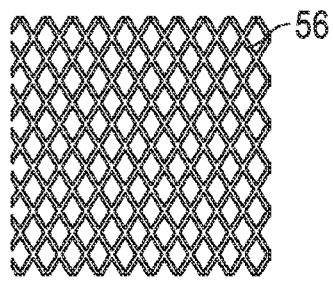
Figure 21G:
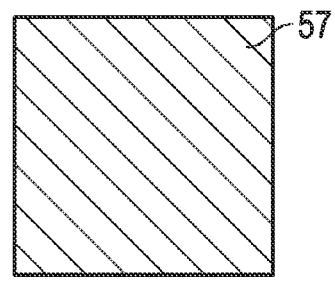
Figure 22A:
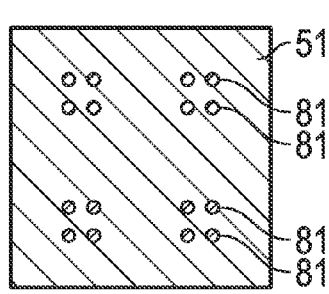
Figure 22B:
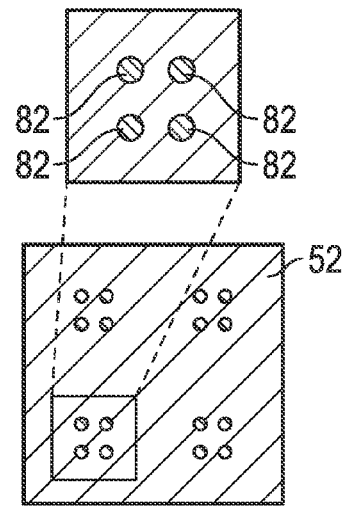
Figure 22C:
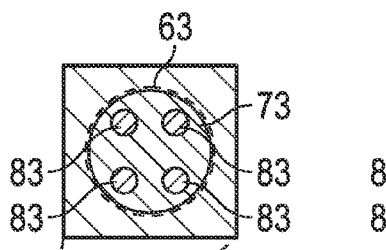
Figure 22C:
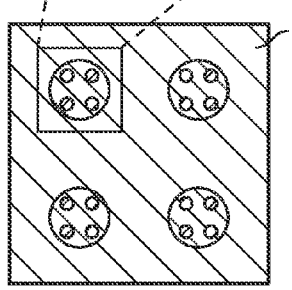
Figure 22D:
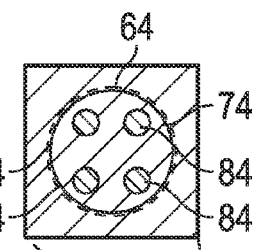
Figure 22D:
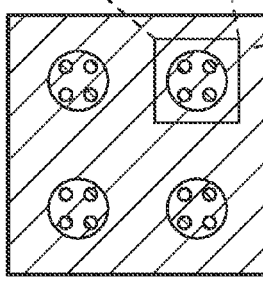
Figure 22E:
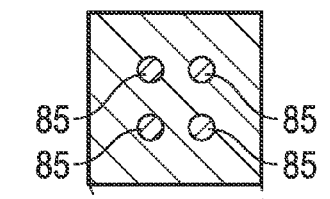
Figure 22E:
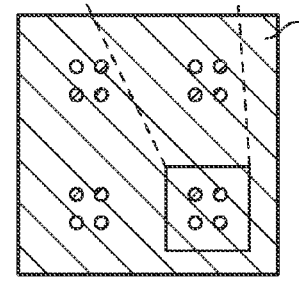
Figure 22F:
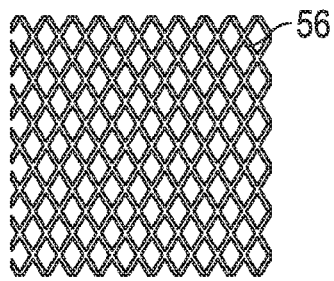
Figure 22G:
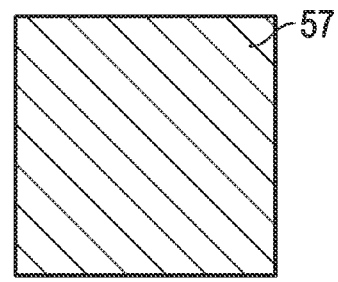

FIG. 21J
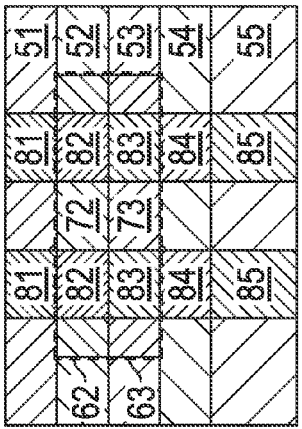
FIG. 21M
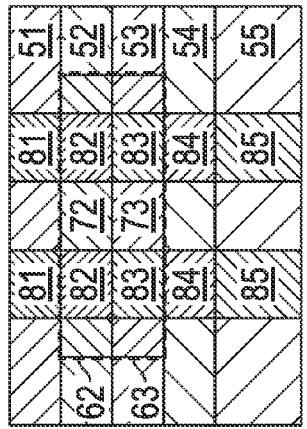
FIG. 21P
FIG. 21I
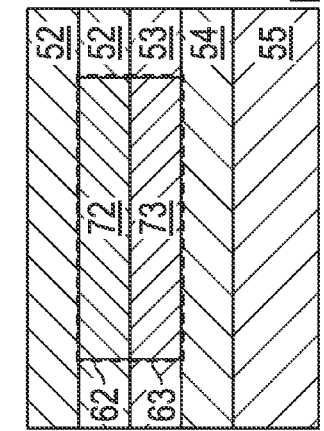
FIG. 21L
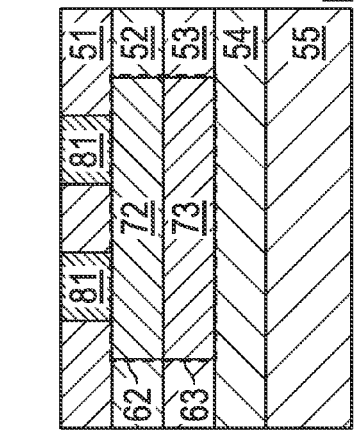
FIG. 21O
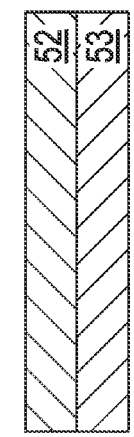
FIG. 21H
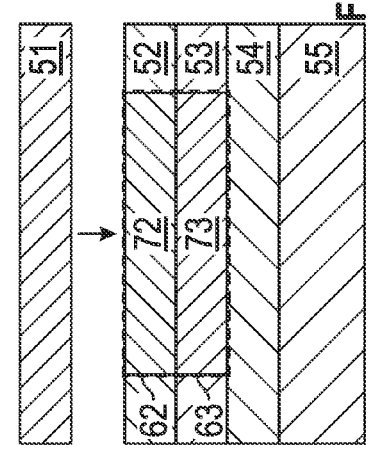
FIG. 21K / FIG. 21N

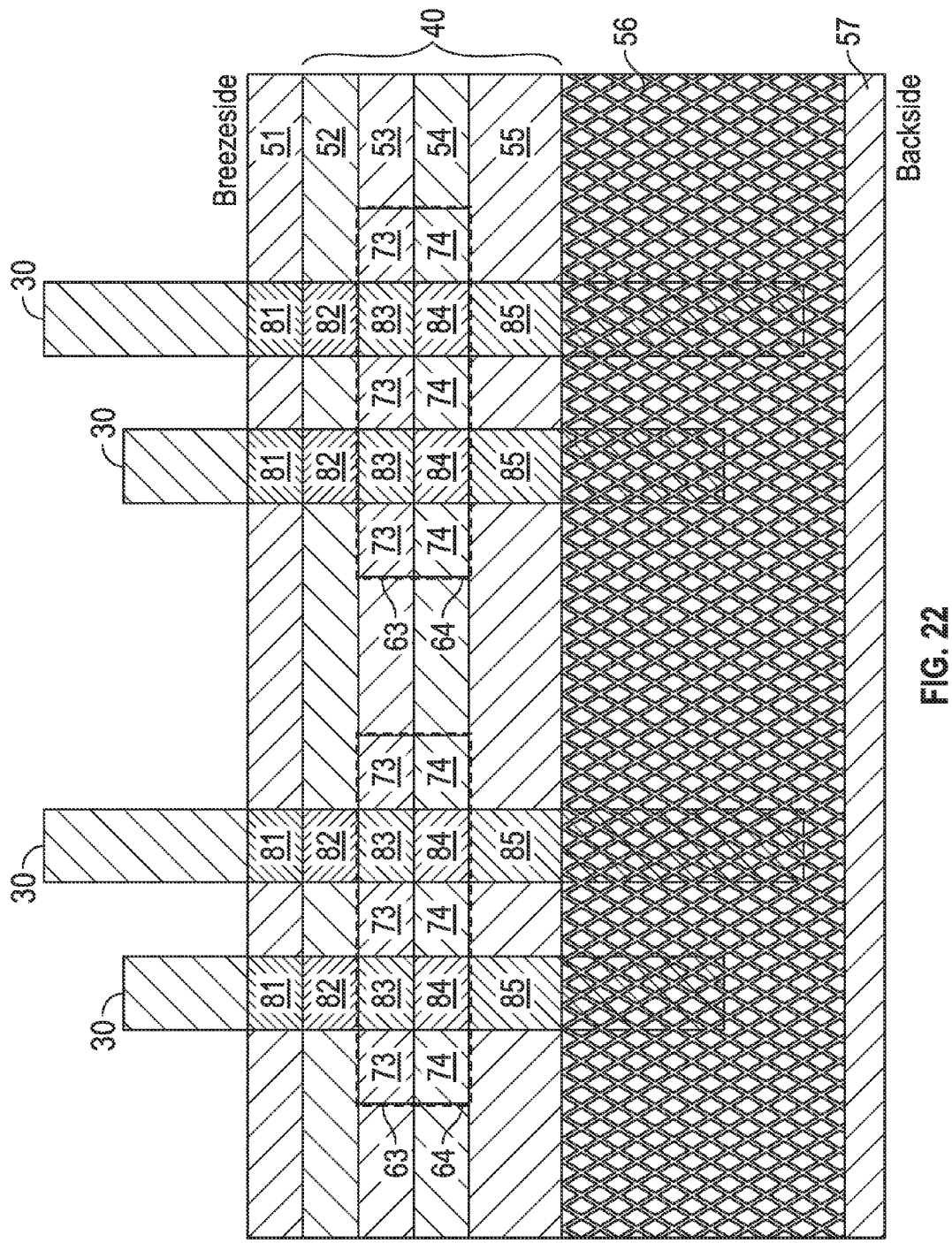

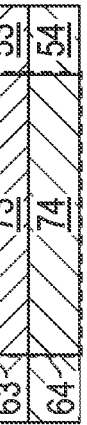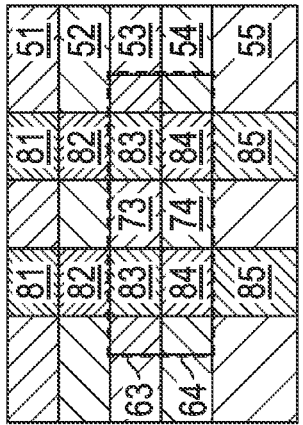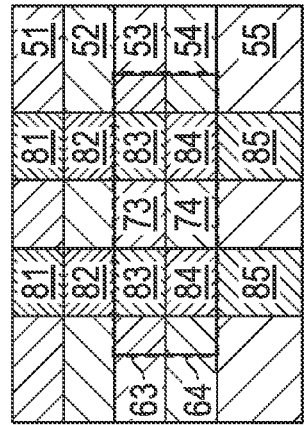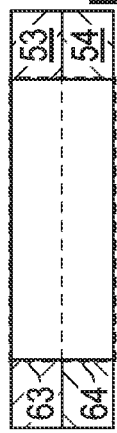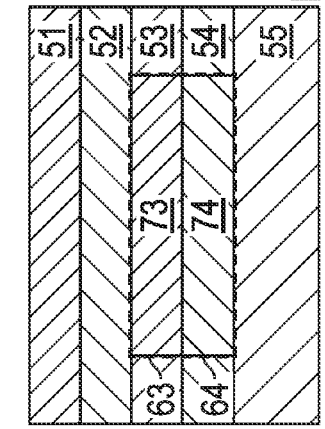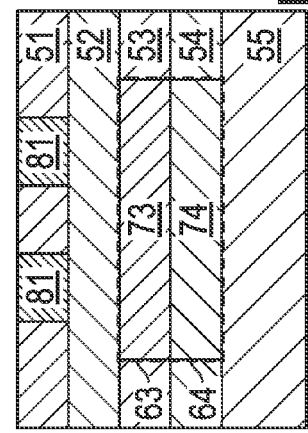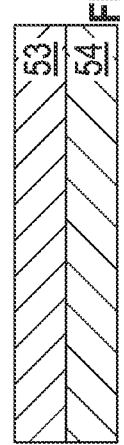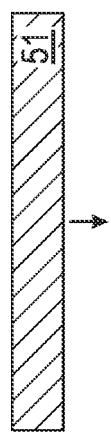

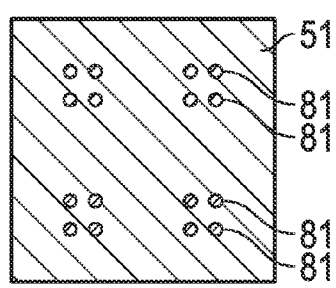
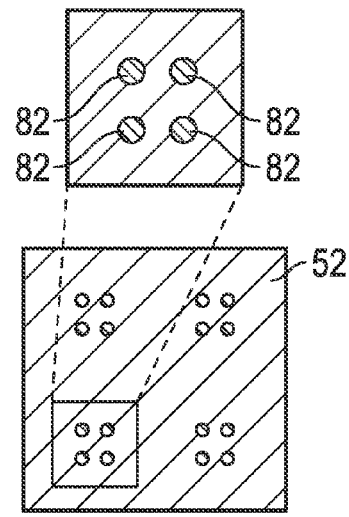
FIG. 23A
FIG. 23B
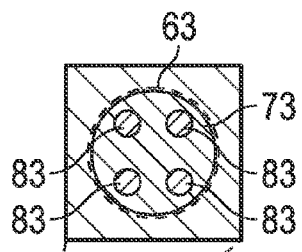
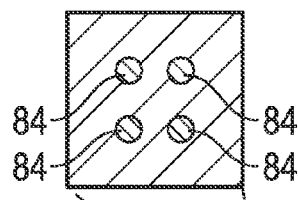
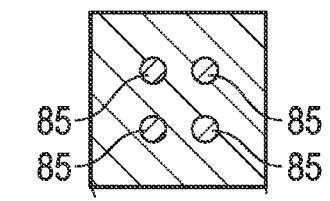
FIG. 23C
FIG. 23D
FIG. 23E
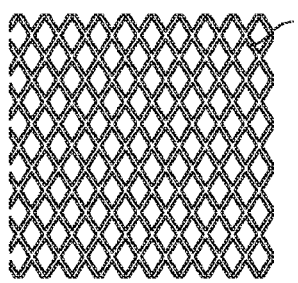
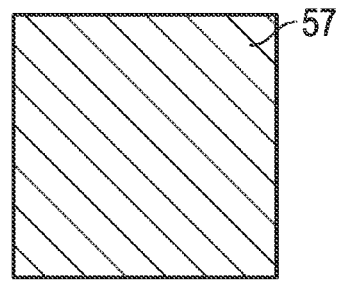
FIG. 23F
FIG. 23G

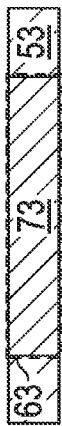
FIG. 23H
FIG. 23I
FIG. 23J
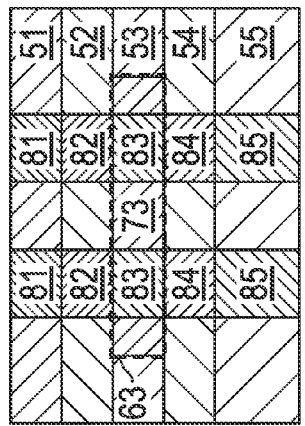
FIG. 23K
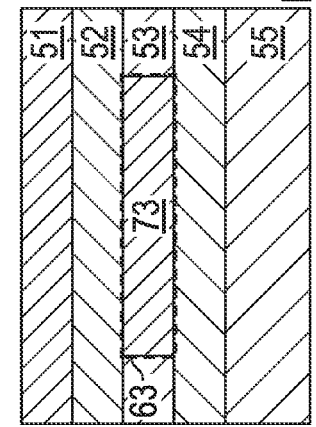
FIG. 23L
FIG. 23M
FIG. 23N
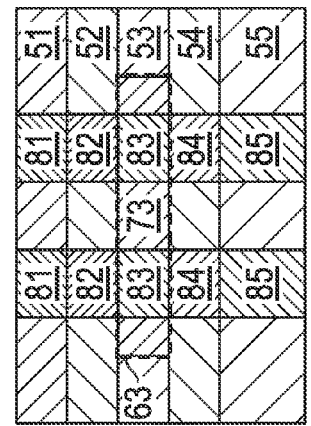
FIG. 23O
FIG. 23P
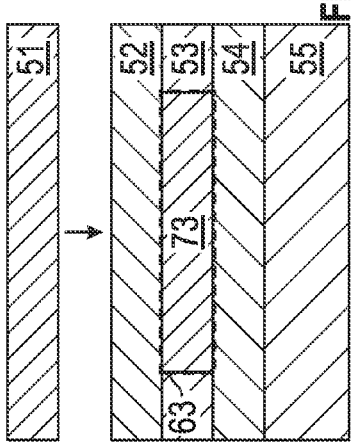
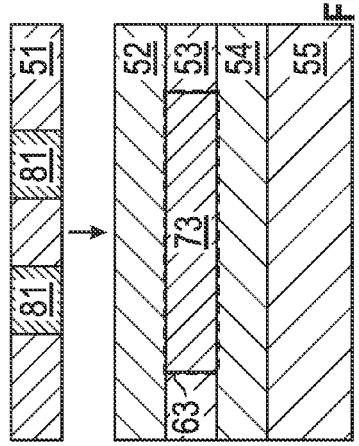
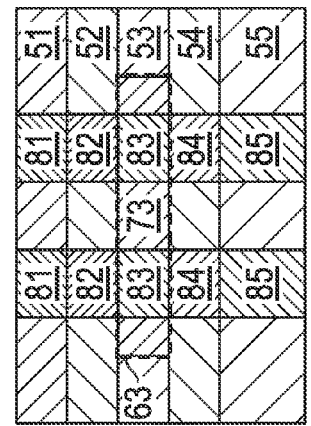

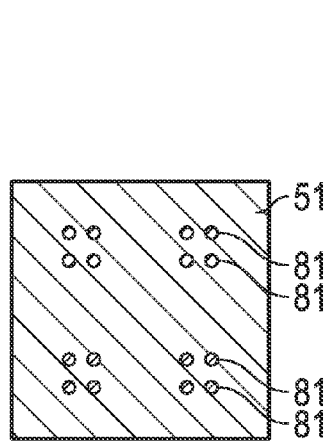
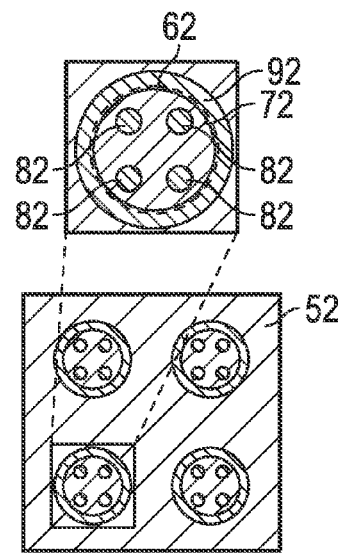
FIG. 24A
FIG. 24B
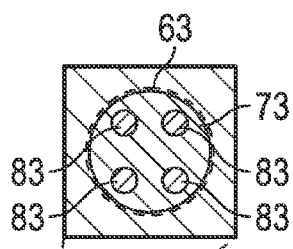
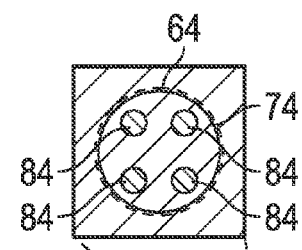
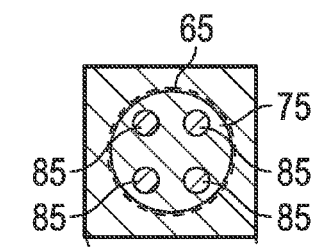
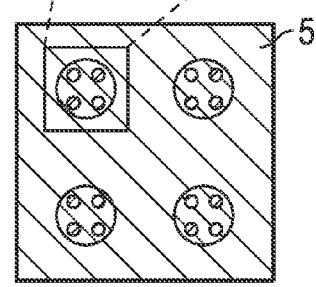
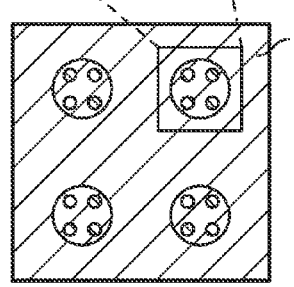
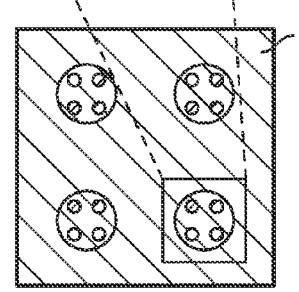
FIG. 24C  FIG. 24D  FIG. 24E
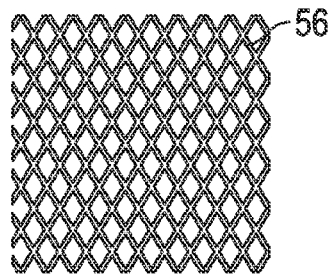
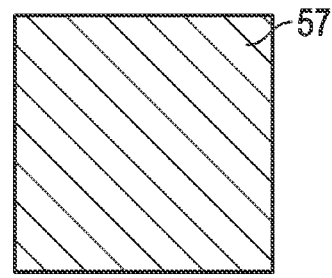
FIG. 24F  FIG. 24G

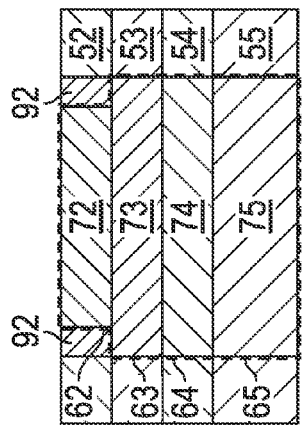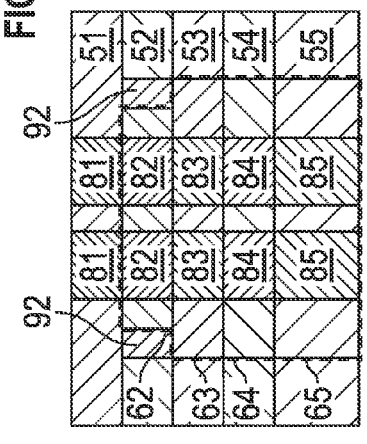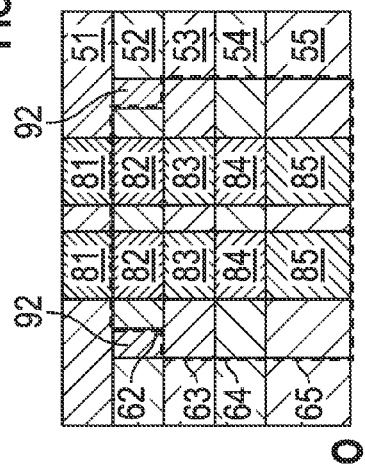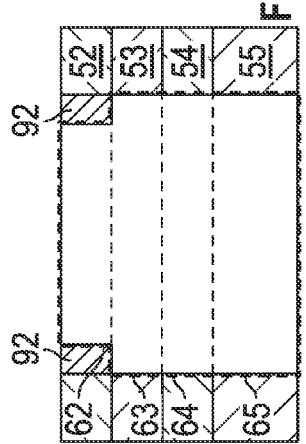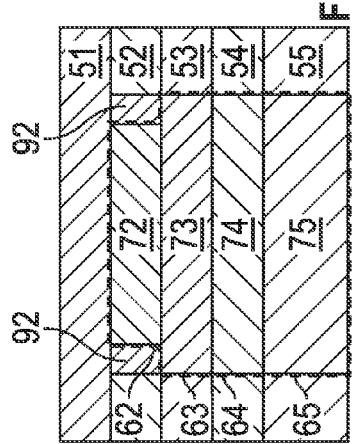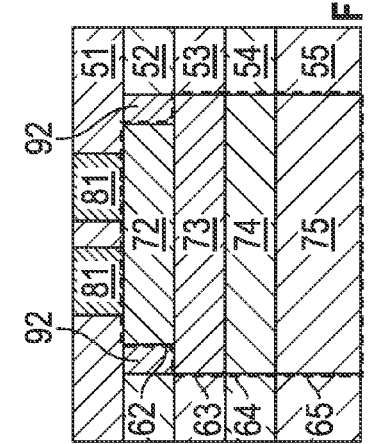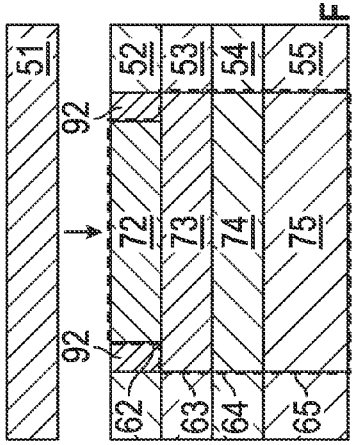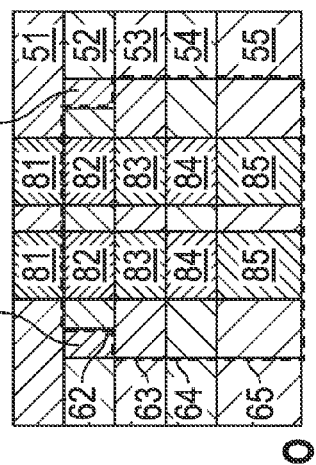

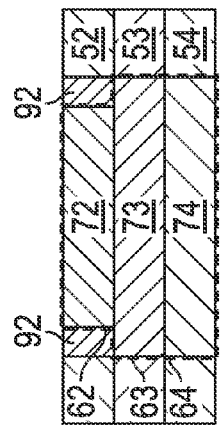
FIG. 25H
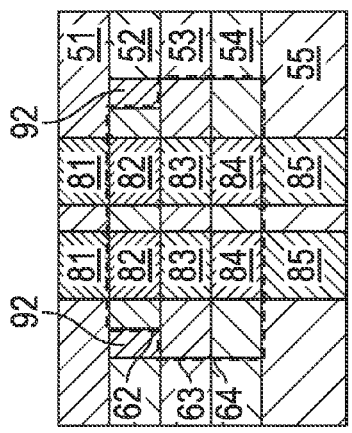
FIG. 25J
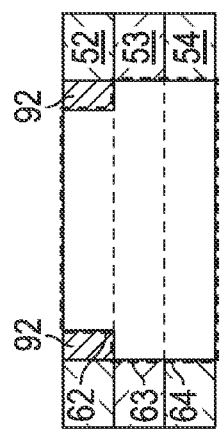
FIG. 25I
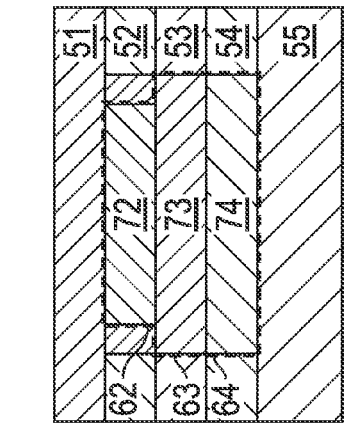
FIG. 25K
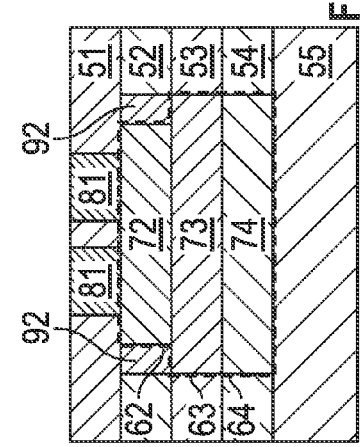
FIG. 25L
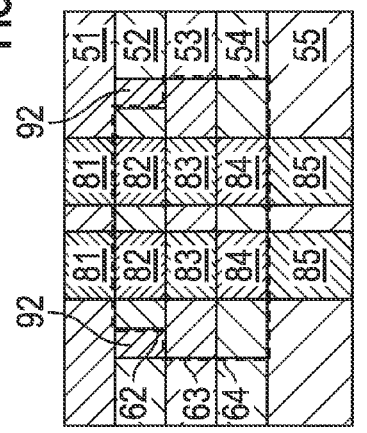
FIG. 25M
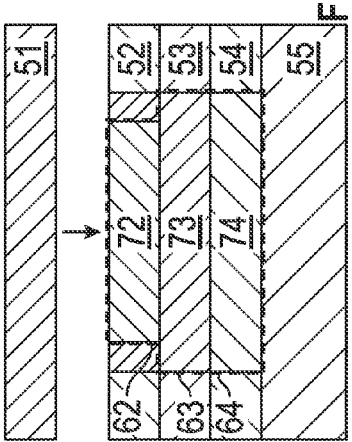
FIG. 25N
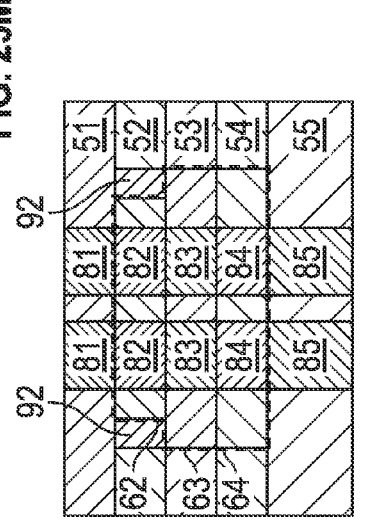
FIG. 25O
FIG. 25P

FIG. 26H
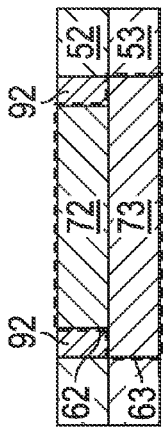
FIG. 26I
FIG. 26J
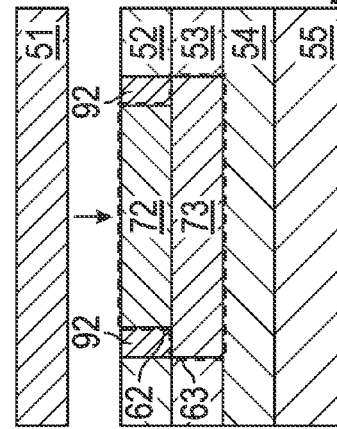
FIG. 26K
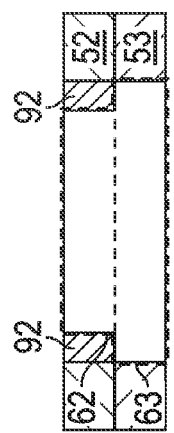
FIG. 26L
FIG. 26M
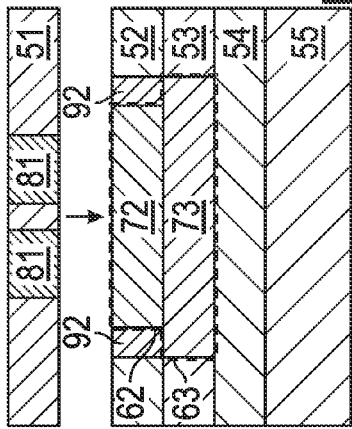
FIG. 26N
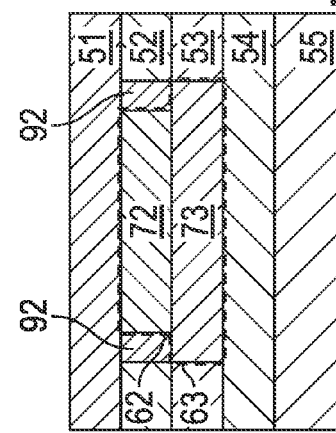
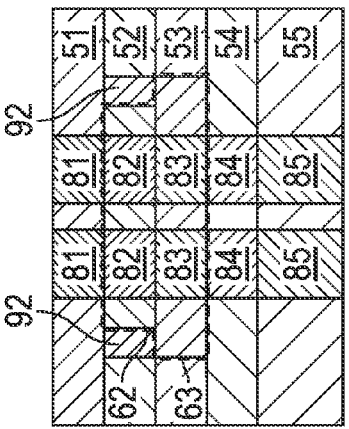
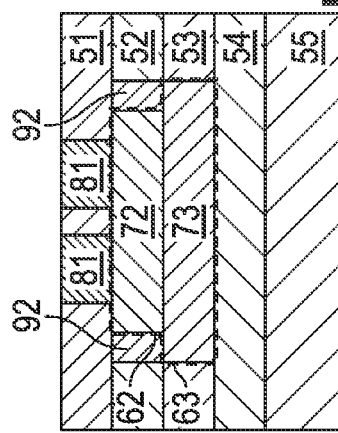
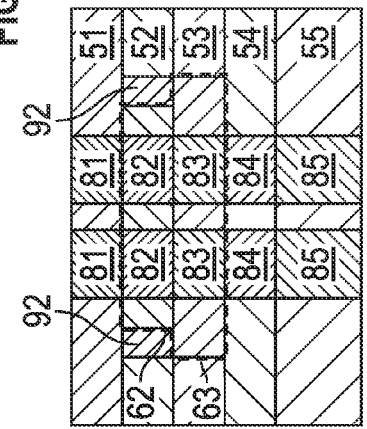
FIG. 26O
FIG. 26P

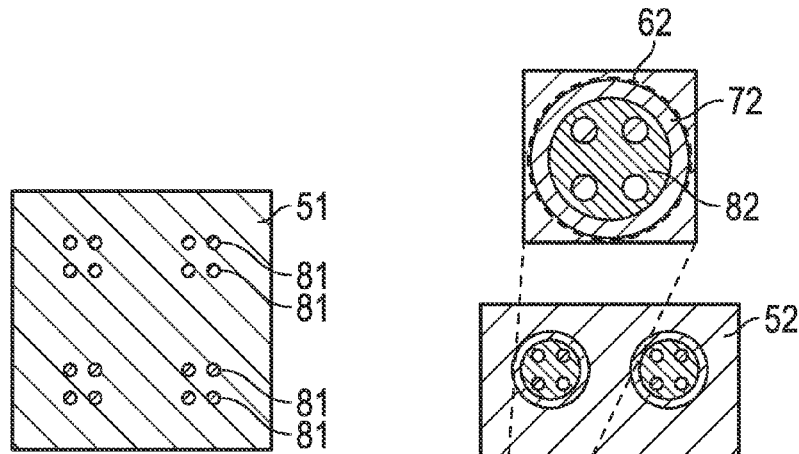
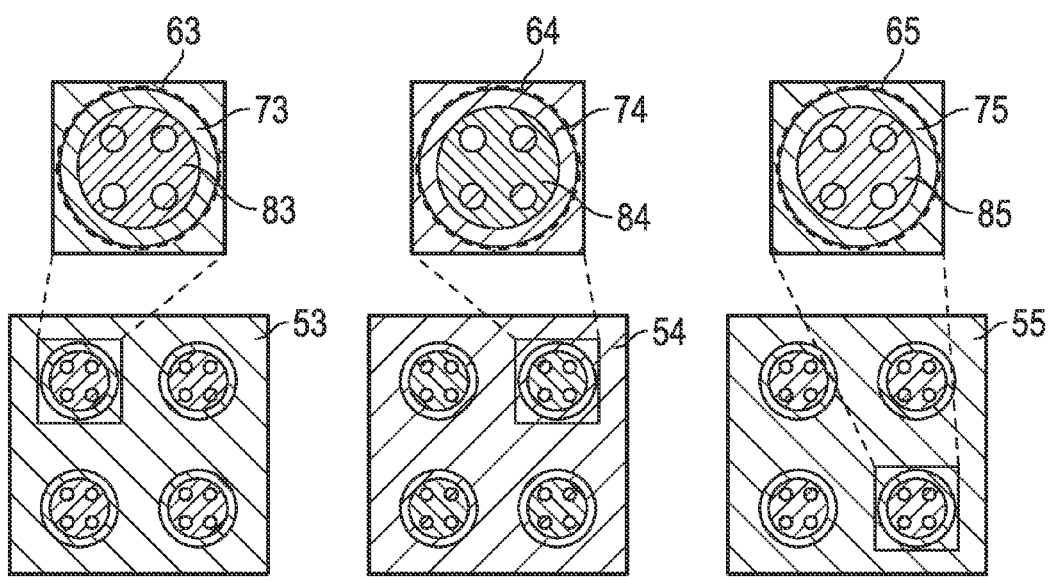
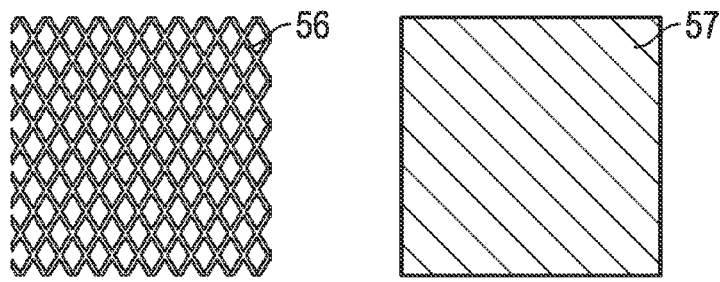
FIG. 29A FIG. 29B FIG. 29C FIG. 29D FIG. 29E FIG. 29F FIG. 29G

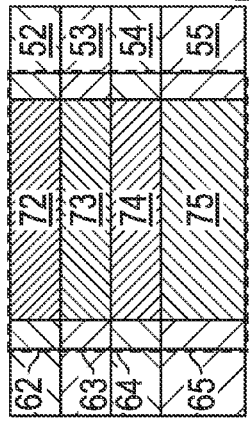
FIG. 29H
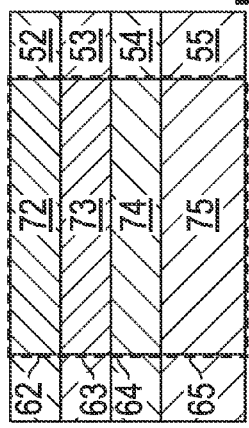
FIG. 29I
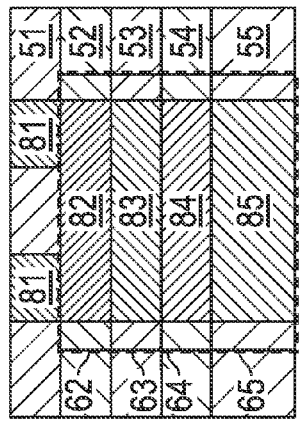
FIG. 29J
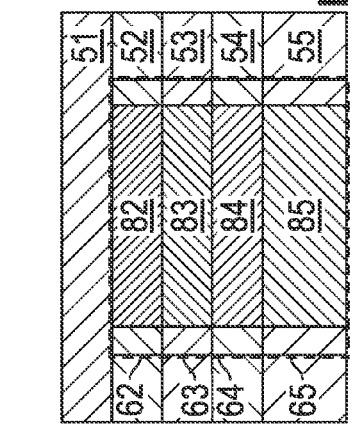
FIG. 29K
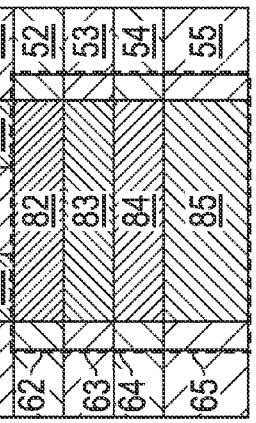
FIG. 29L
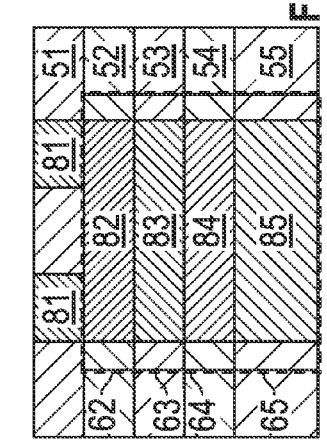
FIG. 29N
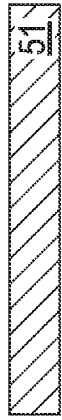
FIG. 29M
FIG. 29O

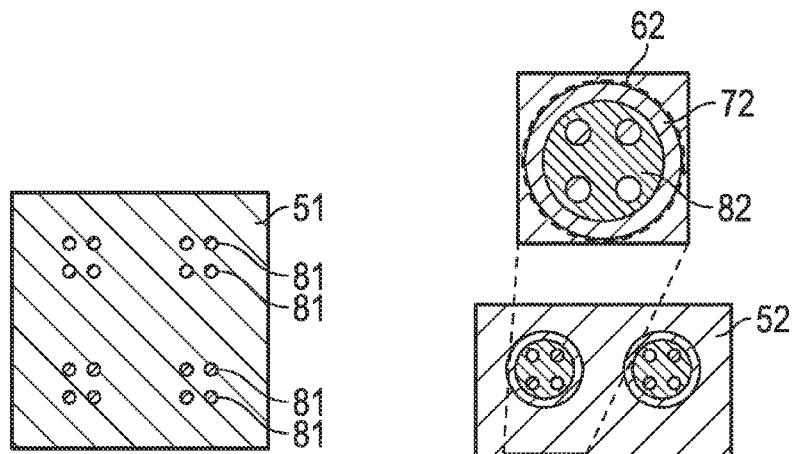
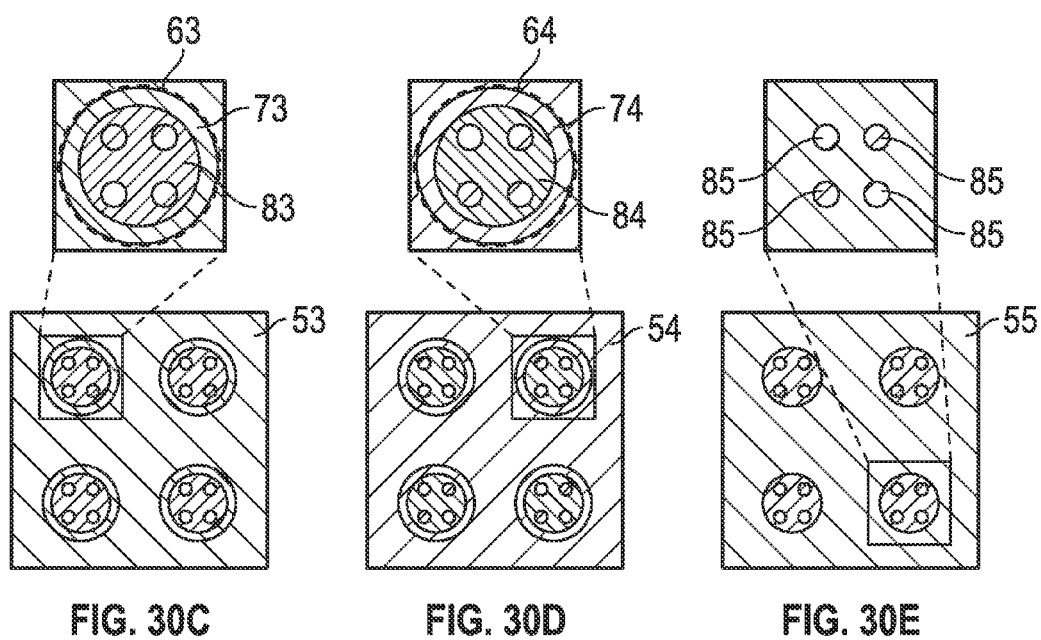
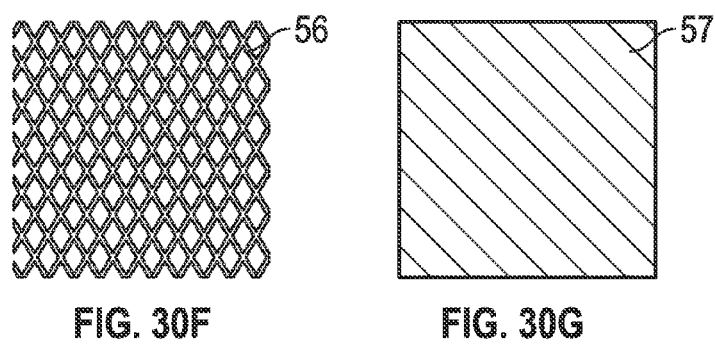
FIG. 30A  FIG. 30B  FIG. 30C  FIG. 30D  FIG. 30E  FIG. 30F  FIG. 30G

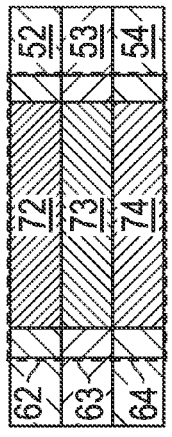
FIG. 30H
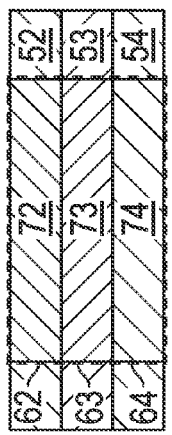
FIG. 30I
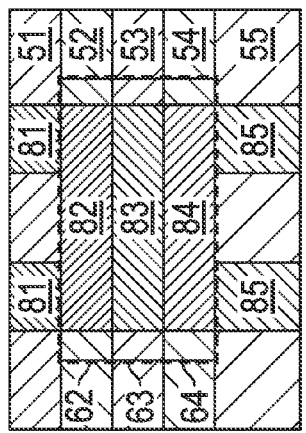
FIG. 30K
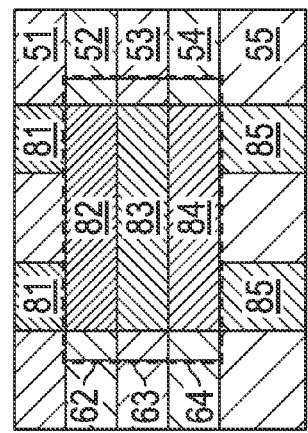
FIG. 30L
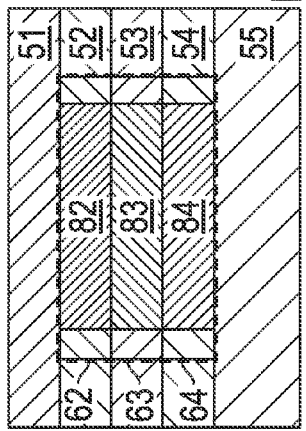
FIG. 30J
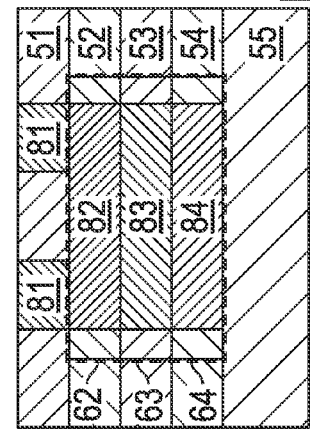
FIG. 30N
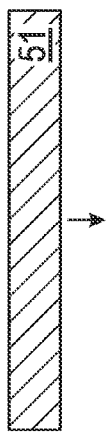
FIG. 30M
FIG. 30O

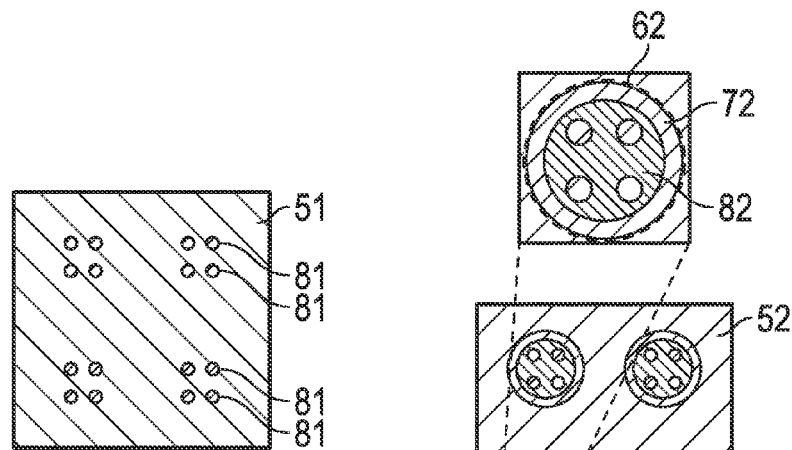
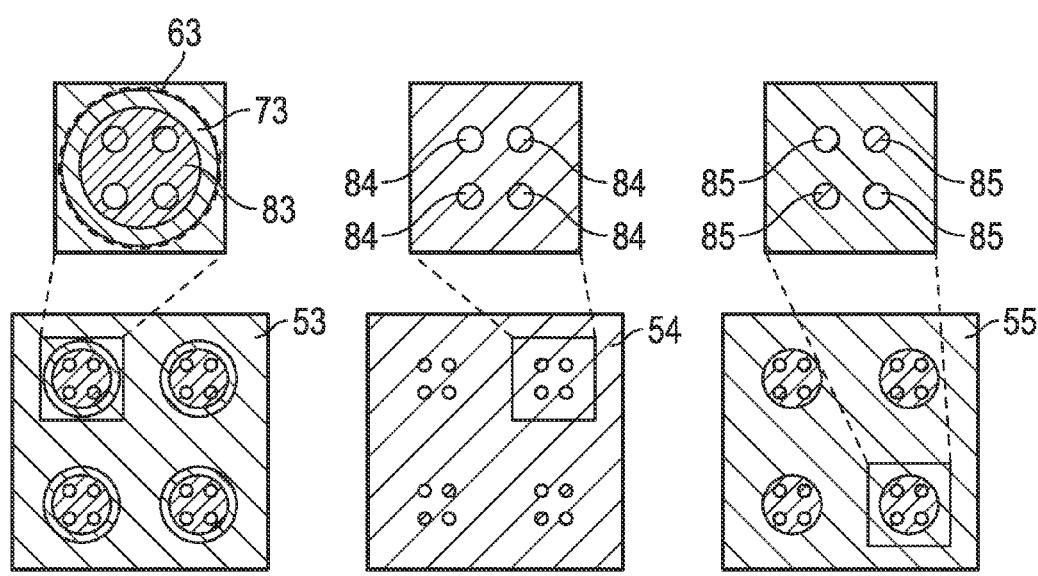
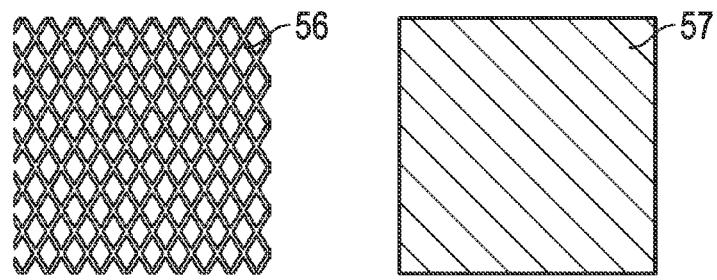
FIG. 31A  FIG. 31B  FIG. 31C  FIG. 31D  FIG. 31E  FIG. 31F  FIG. 31G

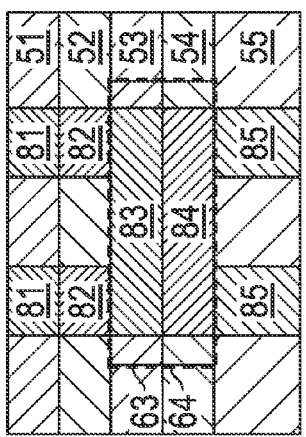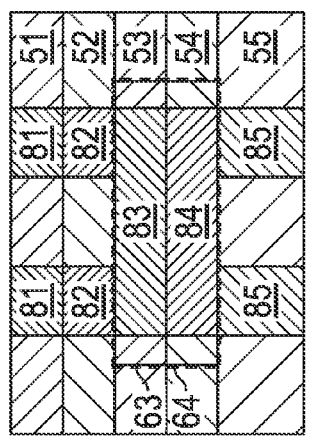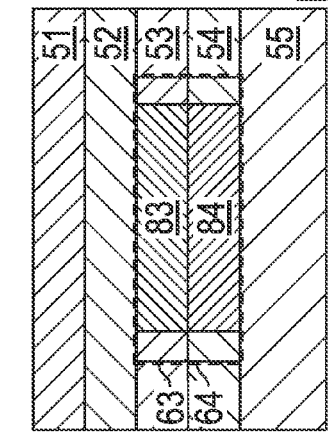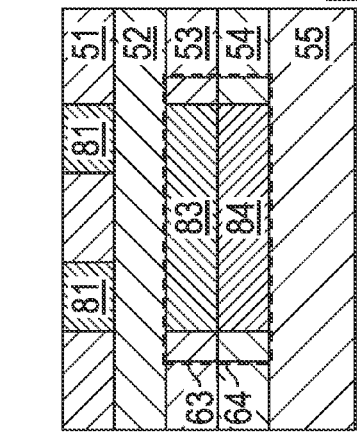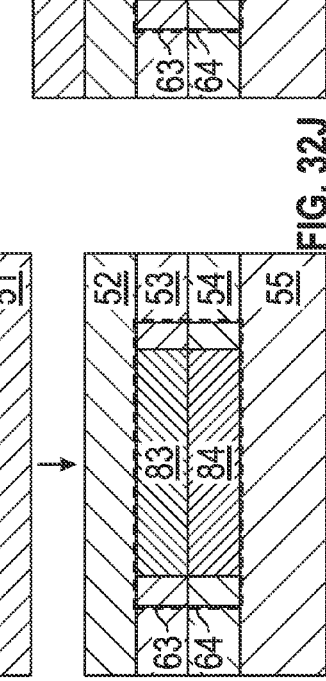

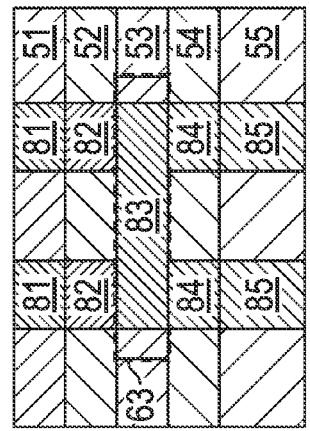
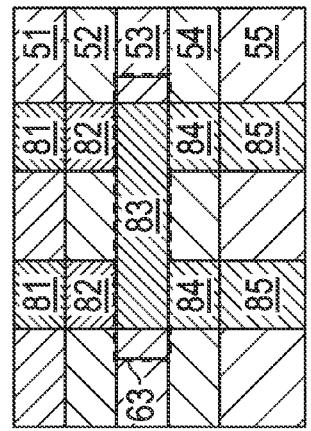
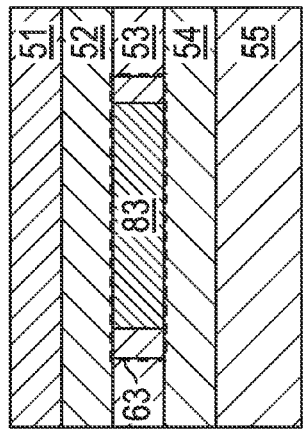
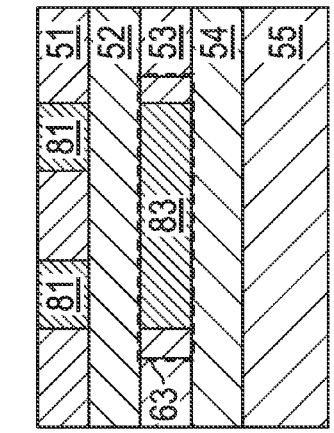
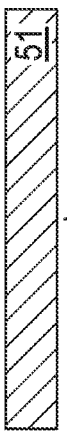
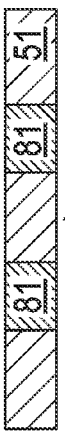

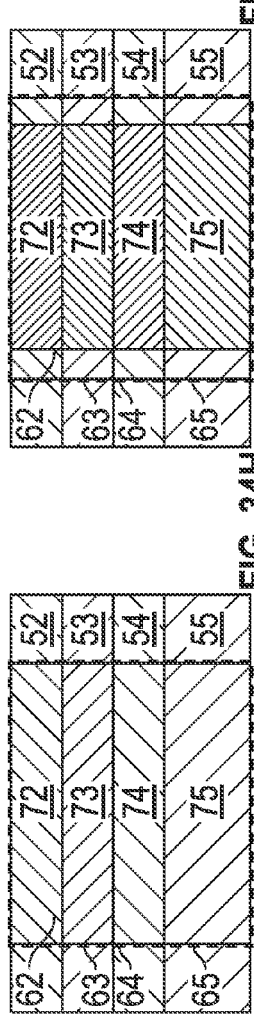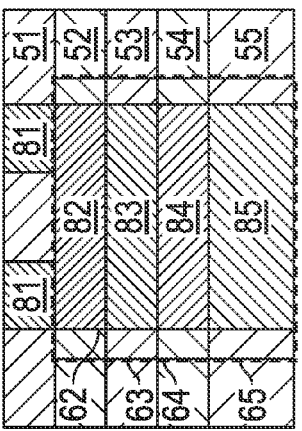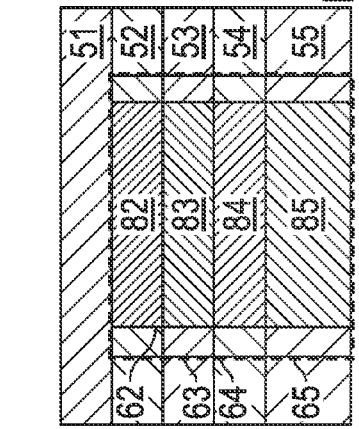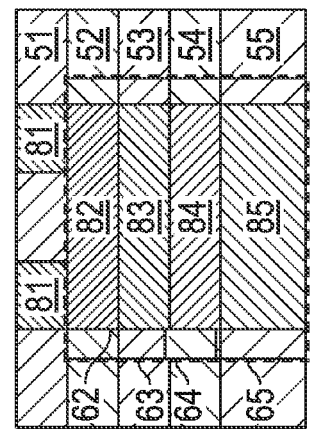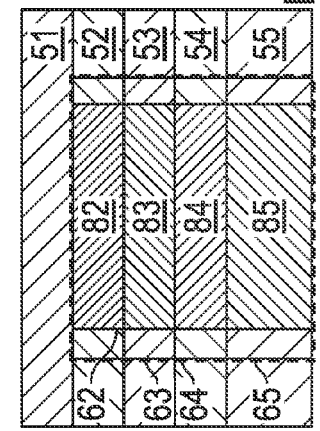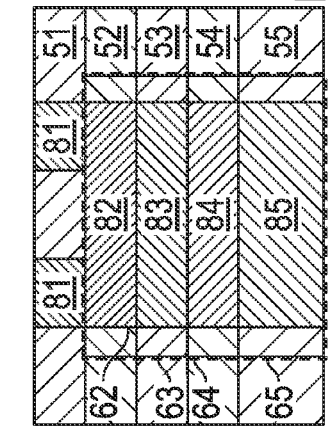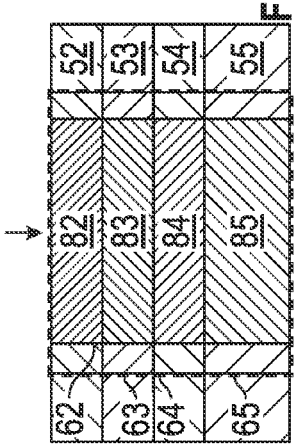

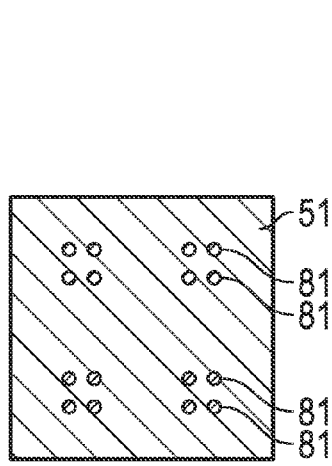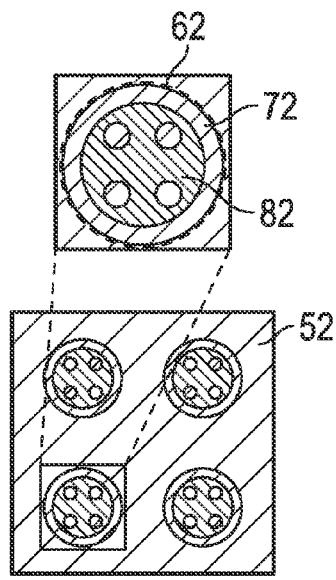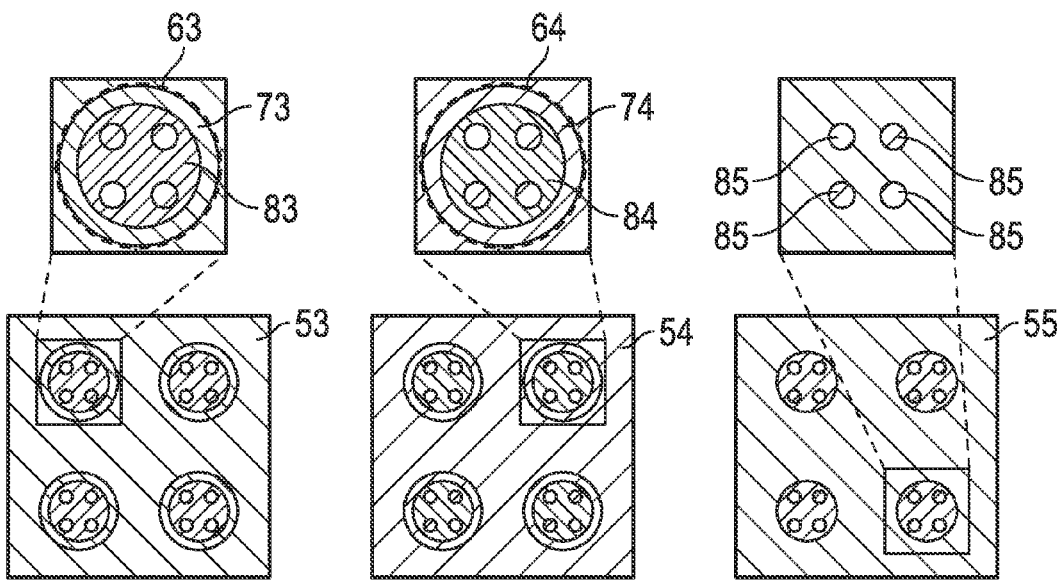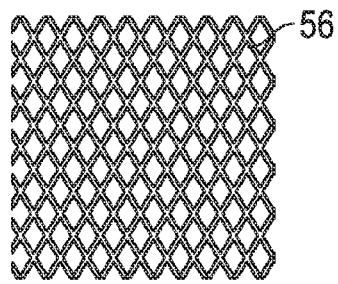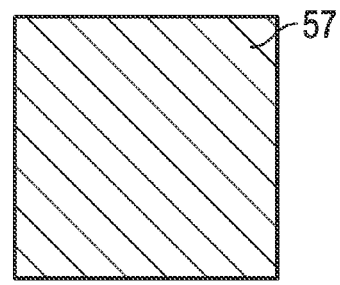
FIG. 35A  FIG. 35B  FIG. 35C  FIG. 35D  FIG. 35E  FIG. 35F  FIG. 35G

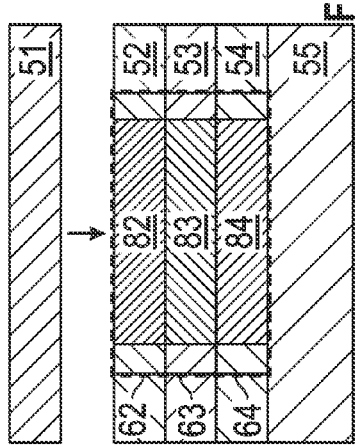

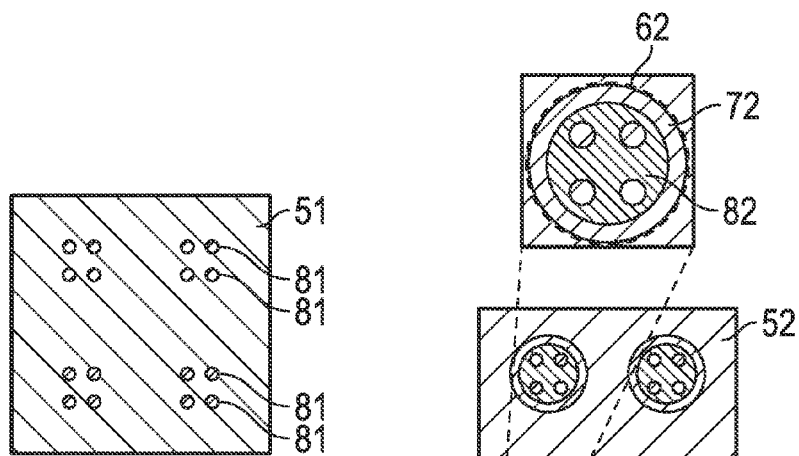
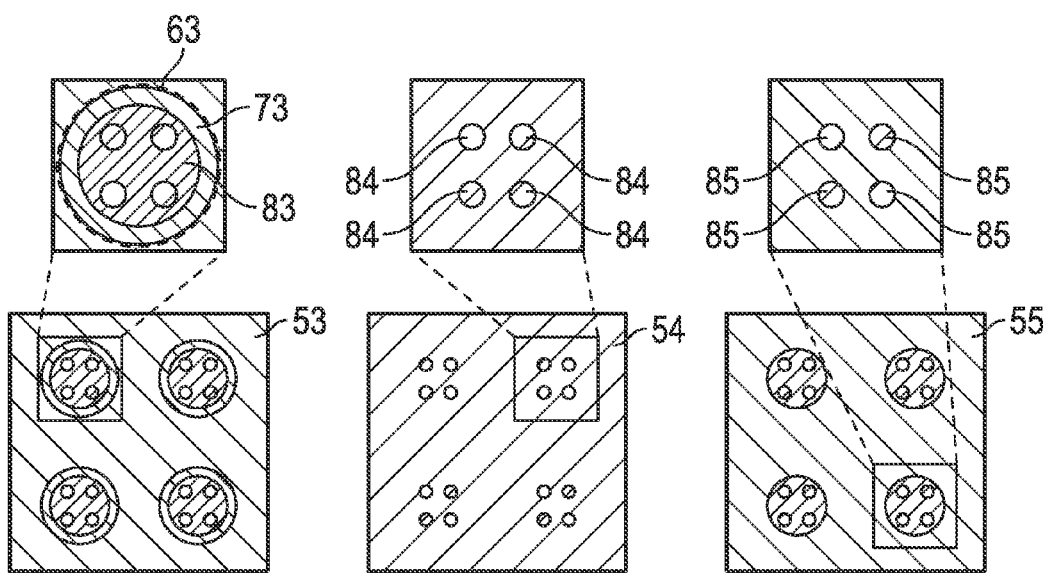
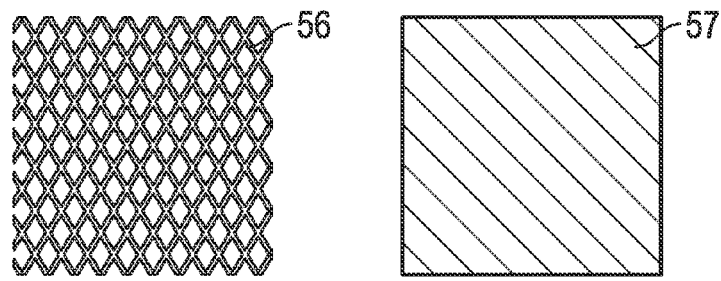
FIG. 36A  FIG. 36B  FIG. 36C  FIG. 36D  FIG. 36E  FIG. 36F  FIG. 36G

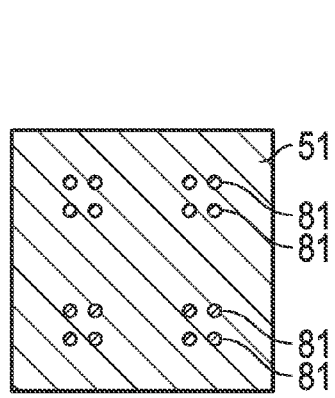
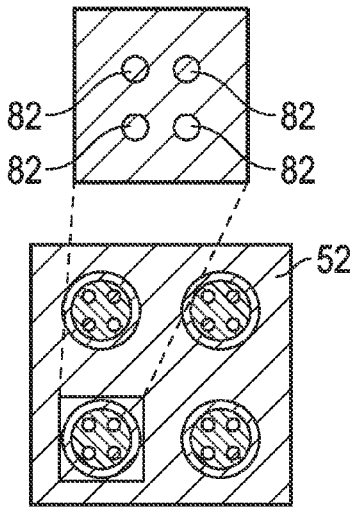
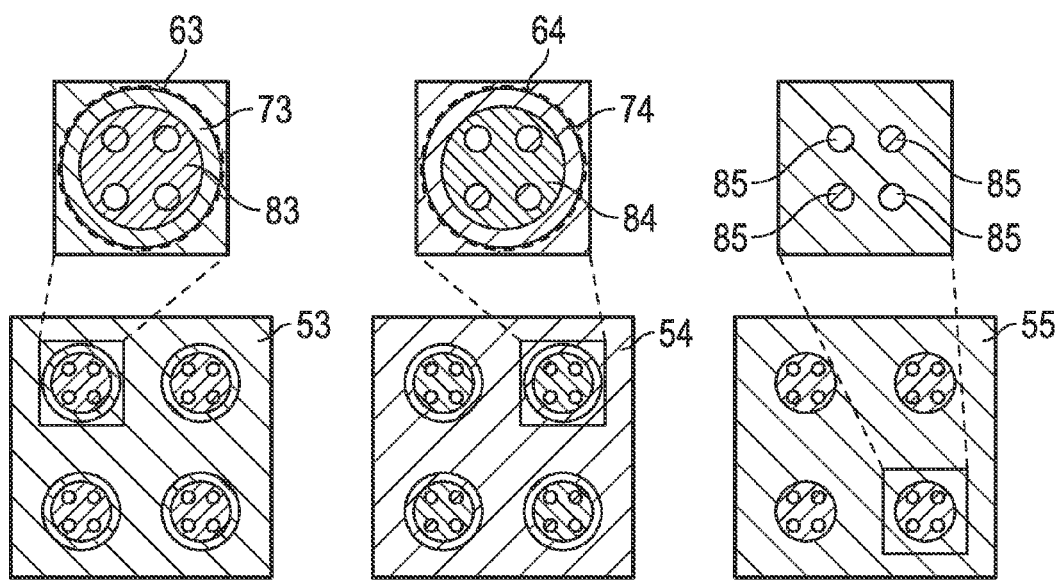
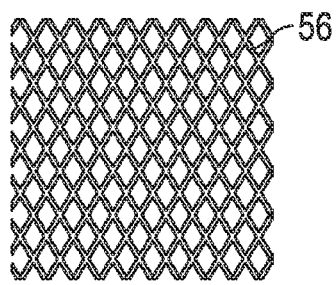
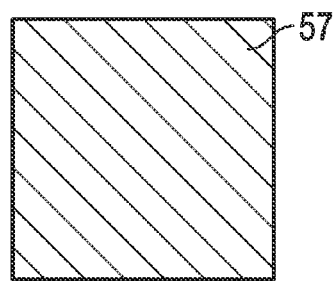
FIG. 37A   FIG. 37B   FIG. 37C   FIG. 37D   FIG. 37E   FIG. 37F   FIG. 37G

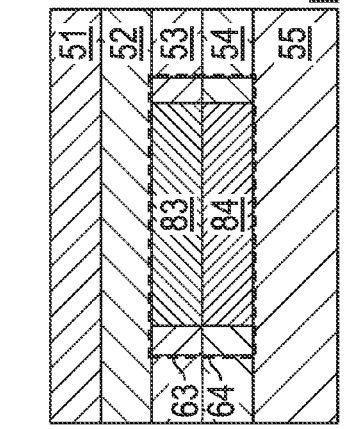
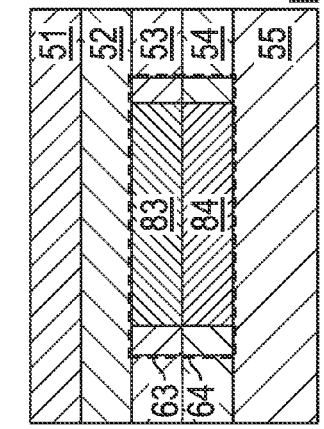
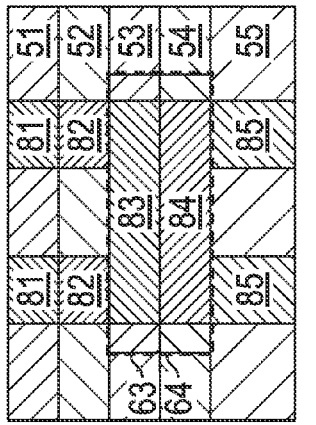
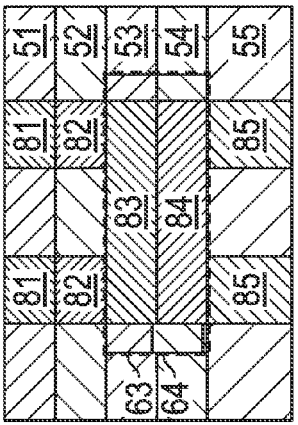
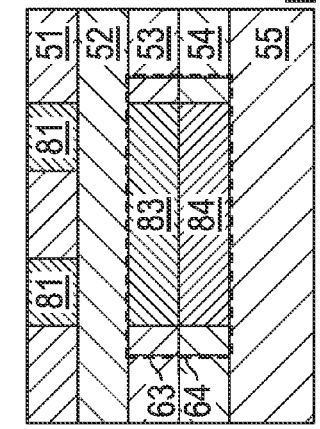

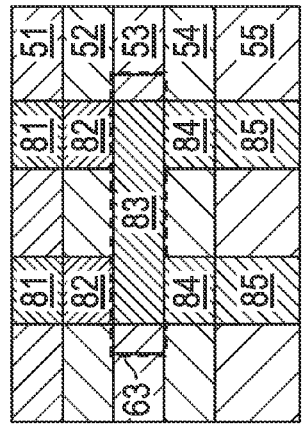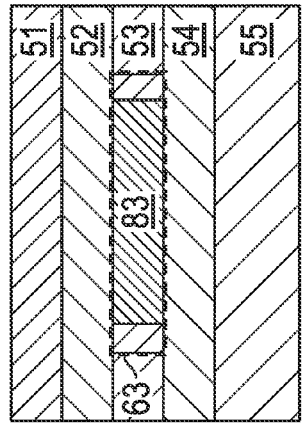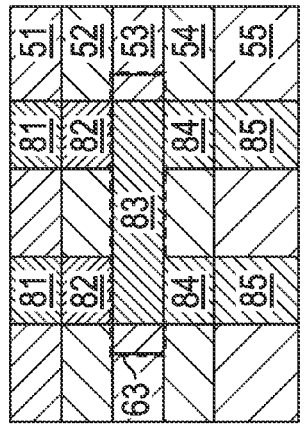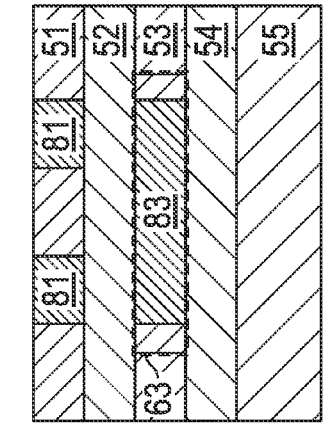

ELECTRIC HEATER FOR INTEGRATION INTO AN AIRCRAFT ACOUSTIC PANEL

RELATED APPLICATION

This application claims priority under 35 USC §119(e) to U.S. Provisional Patent Application No. 61/677,975 filed on Jul. 31, 2012. The entire disclosure of this provisional application is hereby incorporated by reference.

BACKGROUND

An aircraft may have one or more surfaces asked to proffer both sound-reducing and ice-protecting features. For example, an aircraft nacelle houses noise-producing engine parts whereby its inlet lip often dons an acoustic panel. The nacelle inlet lip also usually needs to be equipped with some type of ice protection system to avoid engine-intake-air constriction and/or to prevent large ice chunks from impacting internal engine parts.

SUMMARY

An electrical heater is provided which can be integrated into an aircraft acoustic panel for ice protection purposes. The heater design accommodates close customization of heater output without compromising sound-reduction qualities and also allows optimization of its sound-reducing features without influencing heater output.

DRAWINGS

Figure 1:
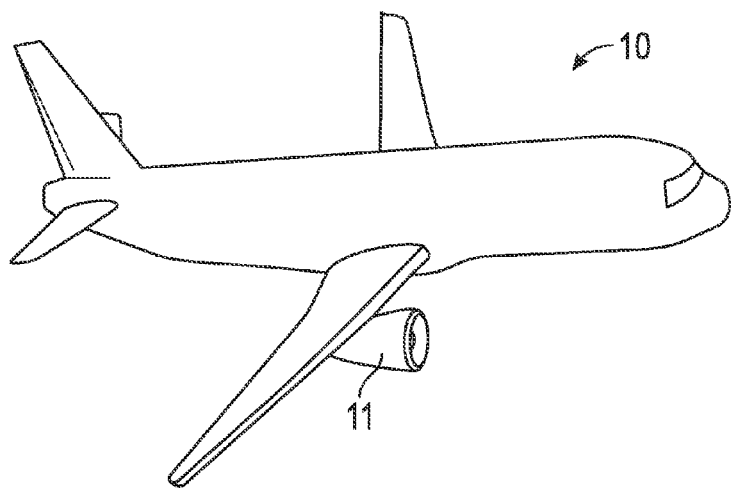
Figure 2:
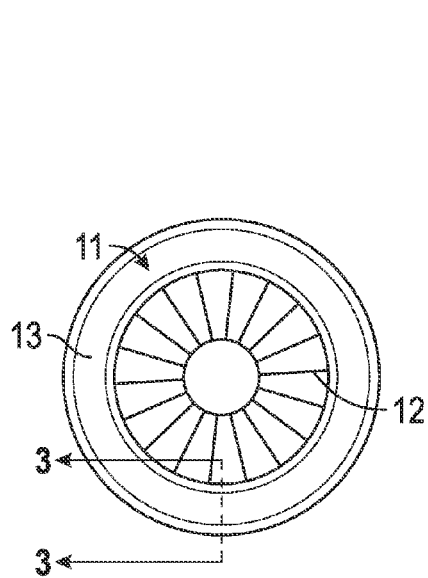
Figure 3:
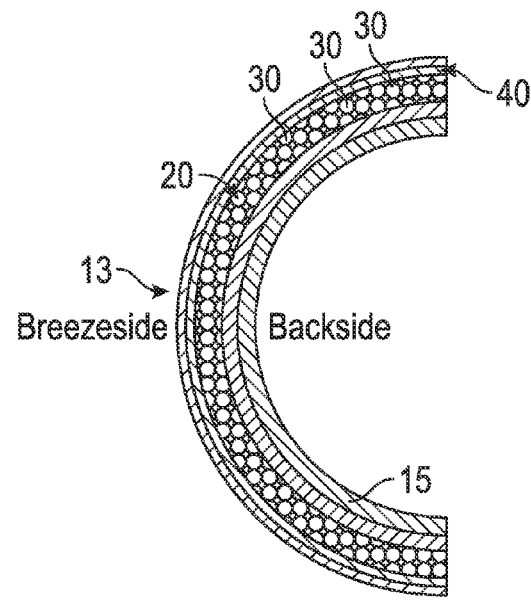

FIGS. 1-3 show an aircraft, an engine nacelle, and an acoustic panel for the inlet lip of the nacelle which integrates a heater.

FIGS. 4-38, and the drawings associated therewith by alphabetic suffixing, show possible embodiments of the acoustic panel, plan views of different panel levels, and method steps for making heaters for these panels. For ease-in-illustration, thicknesses have been greatly exaggerated in these figures for the panels' sheets, layers, and skins and they are not drawn to scale. For the same reason, the panels' levels are depicted as having flat or planar profiles, although they will often resemble curved segments of the sideways-parabola shape such as shown in FIG. 3.

DESCRIPTION

Referring to FIGS. 1-3, an aircraft 10 is shown which has a nacelle 11 housing noise-producing engine parts 12. The inlet lip 13 of the nacelle 11 neighbors a noise-residing region 14 and it is provided with an acoustic panel 20 to attenuate engine noise during flight. The acoustic panel 20 can be separately assembled and then installed onto an existing nacelle structural barrel 15. Alternatively, the panel 20 can be embedded into the inlet lip 13 during manufacture of the nacelle 11.

The acoustic panel 20 has sound-penetrating 30 pores which extend from the noise-residing region 14 in a breezeside-backside direction. When the sound waves caused by engine noise penetrate these pores 30, they are cancelled, mistuned or otherwise acoustically reduced by the panel 20.

The acoustic panel 20 also integrates a heater 40 which is electrically connected to an onboard power source. Should the aircraft 10 encounter icing conditions during flight, the heater 40 can be activated to prevent or remove ice accumulation from the nacelle inlet lip 13.

Figure 4:
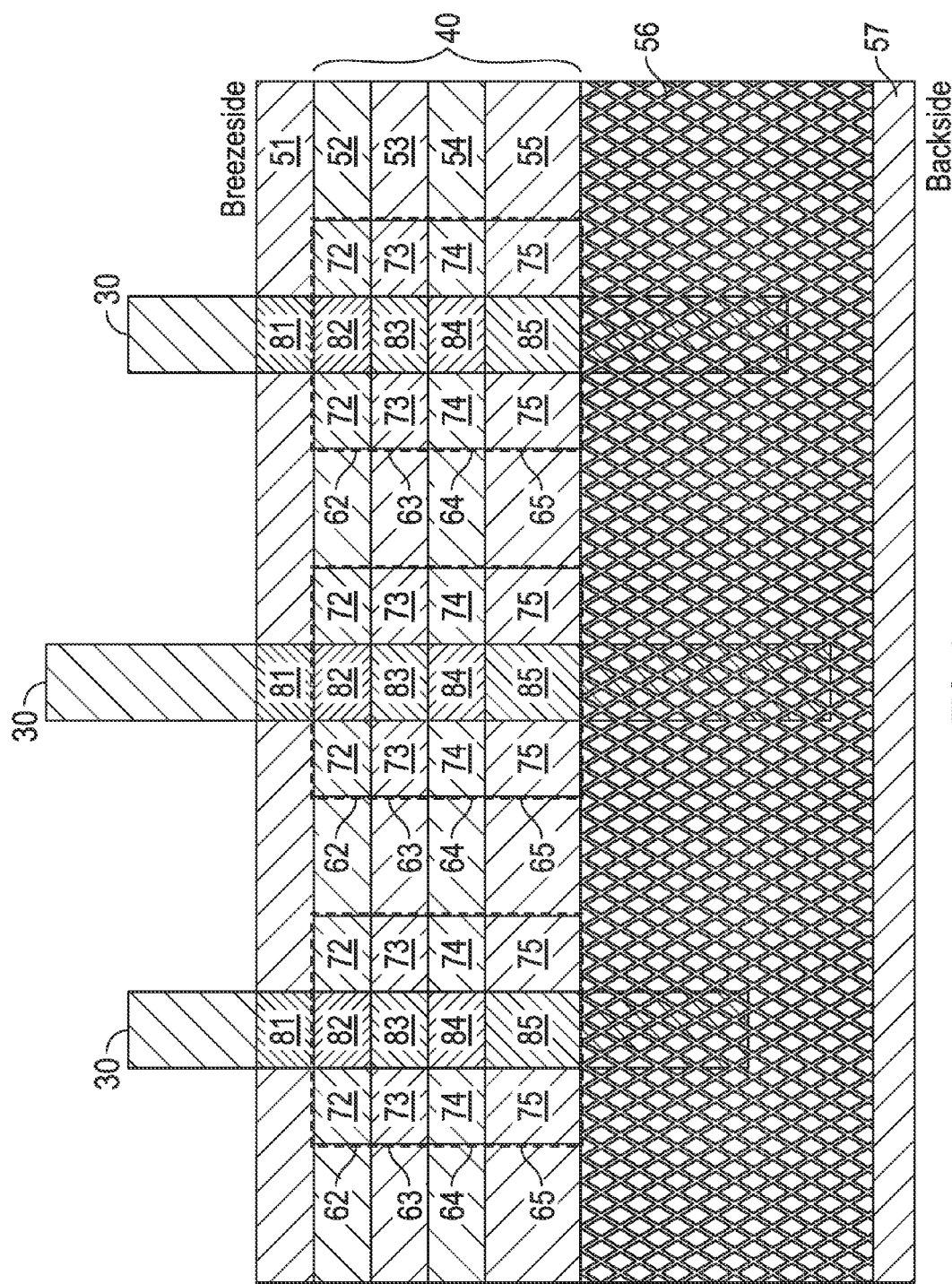
Figure 5:
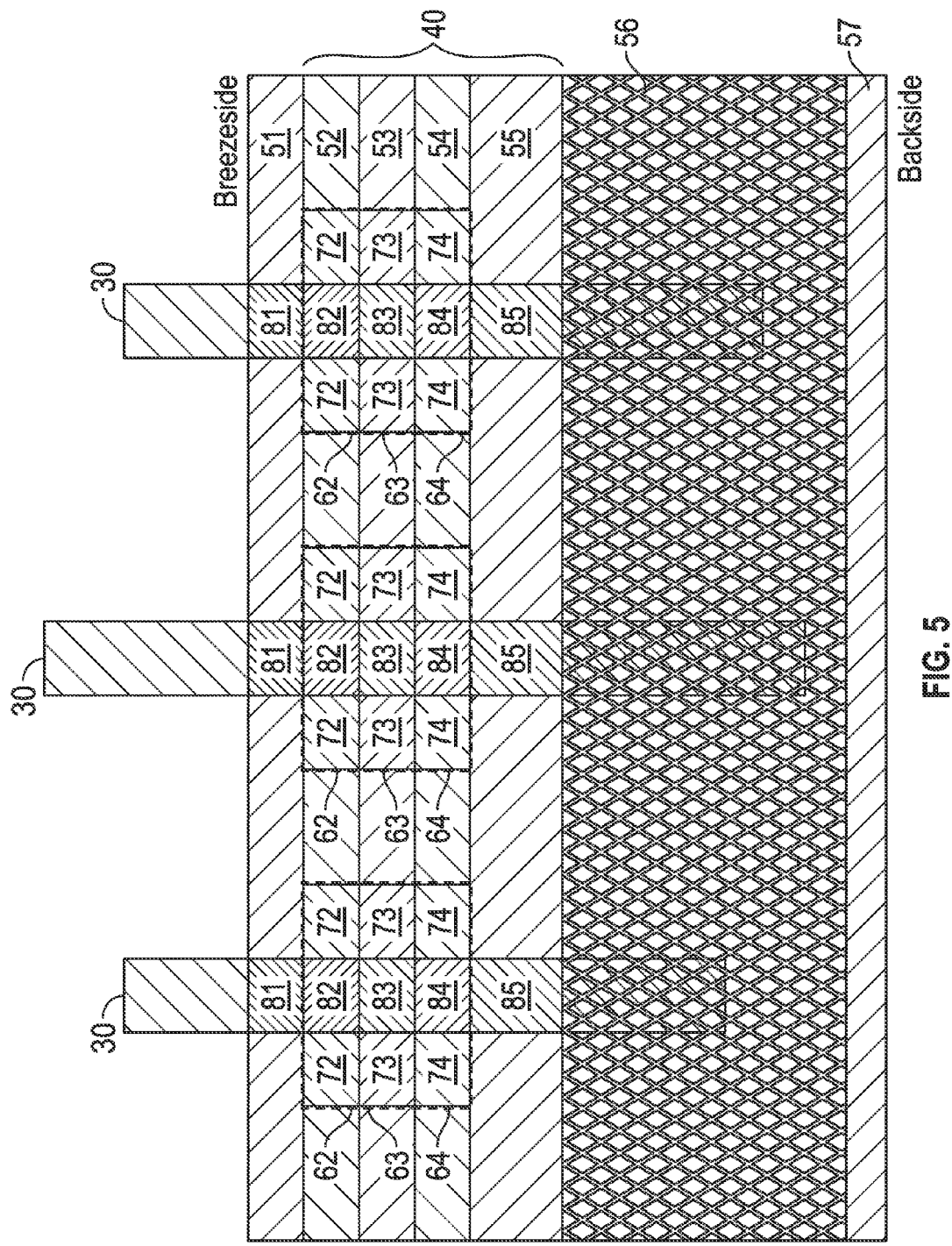
Figure 5A:
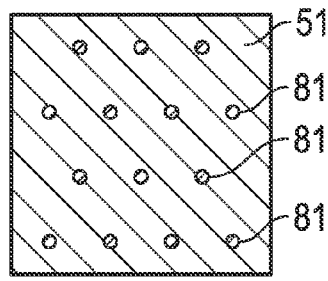
Figure 5B:
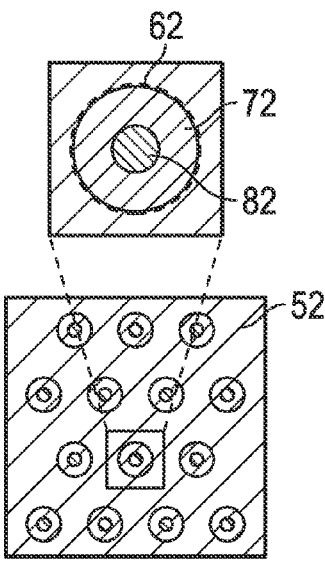
Figure 5C:
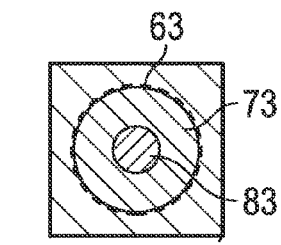
Figure 5C:
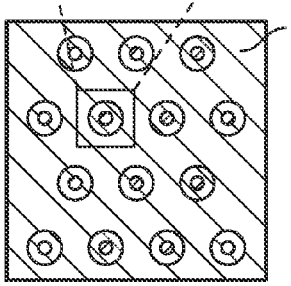
Figure 5D:
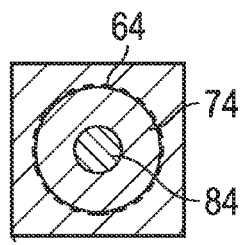
Figure 5D:
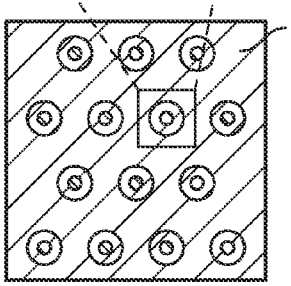
Figure 5E:
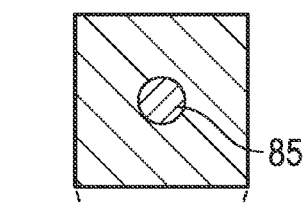
Figure 5E:
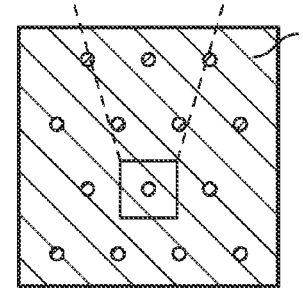
Figure 5F:
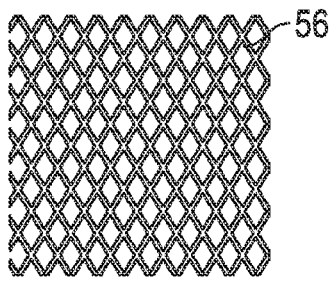
Figure 5G:
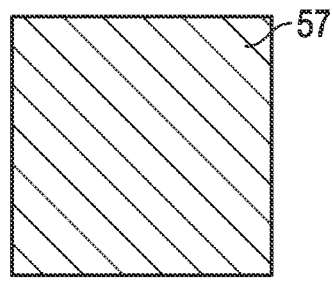
Figure 6:
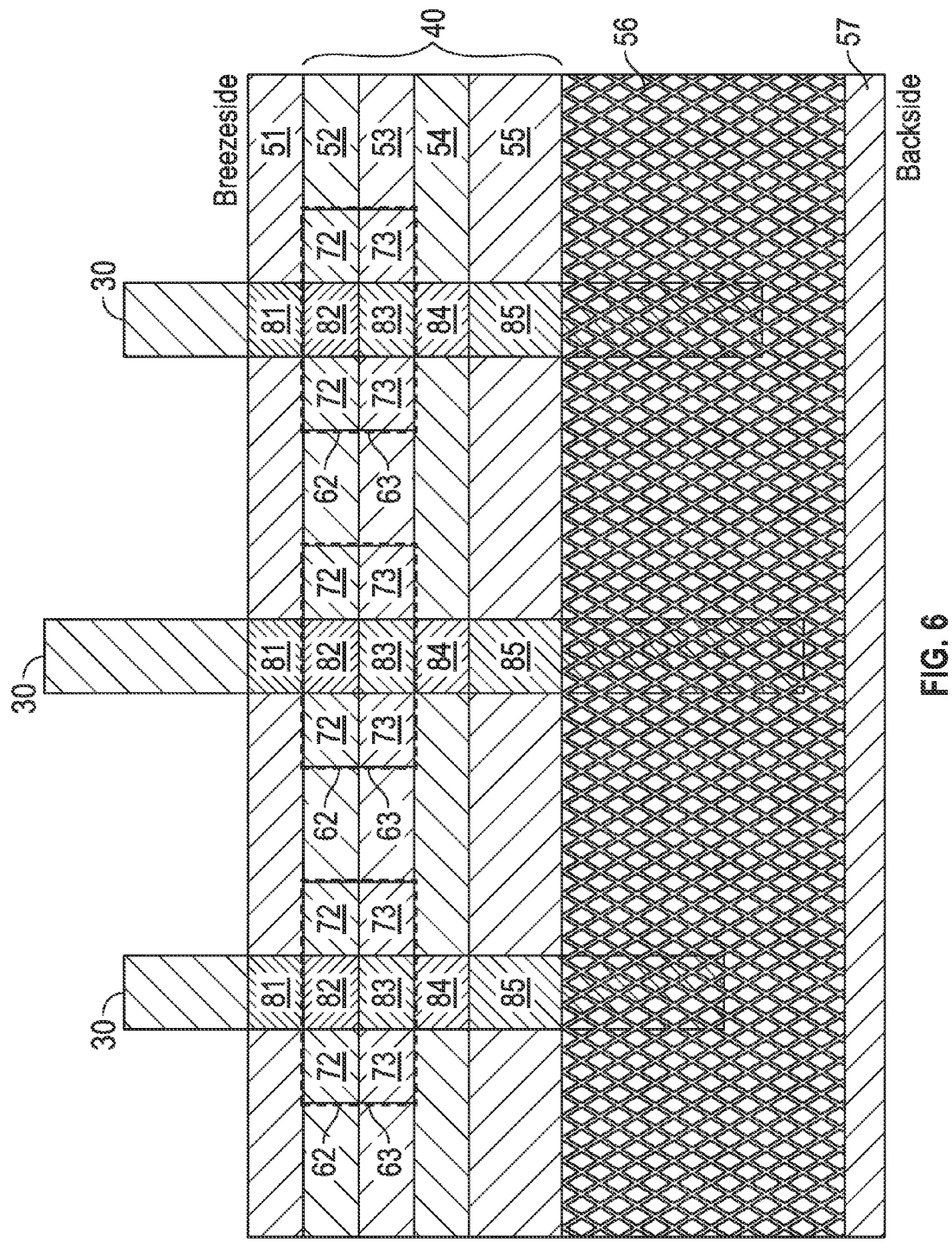
Figure 6A:
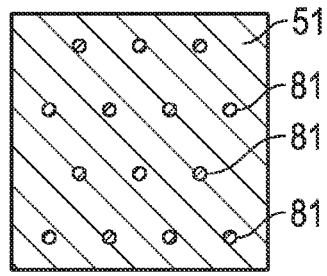
Figure 6B:
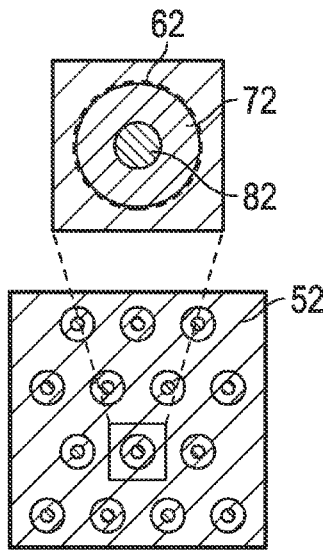
Figure 6C:
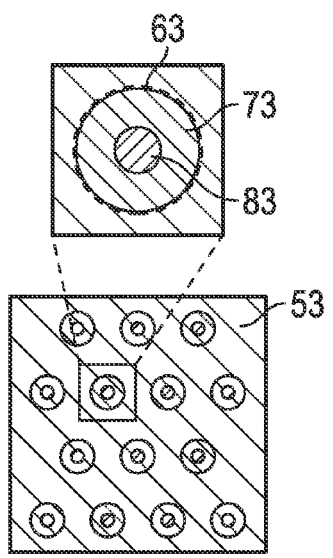
Figure 6D:
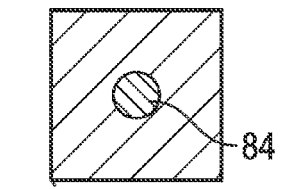
Figure 6E:
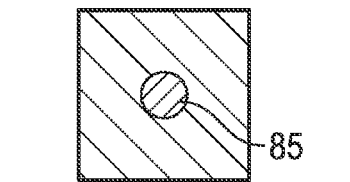
Figure 6F:
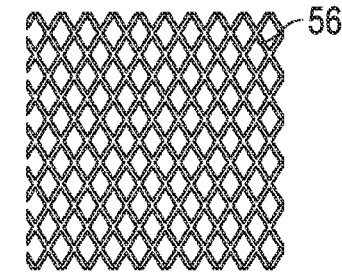
Figure 6G:
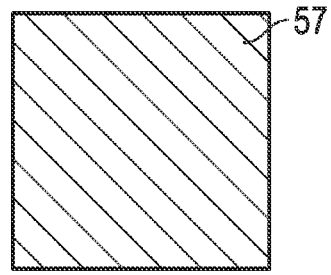
Figure 7:
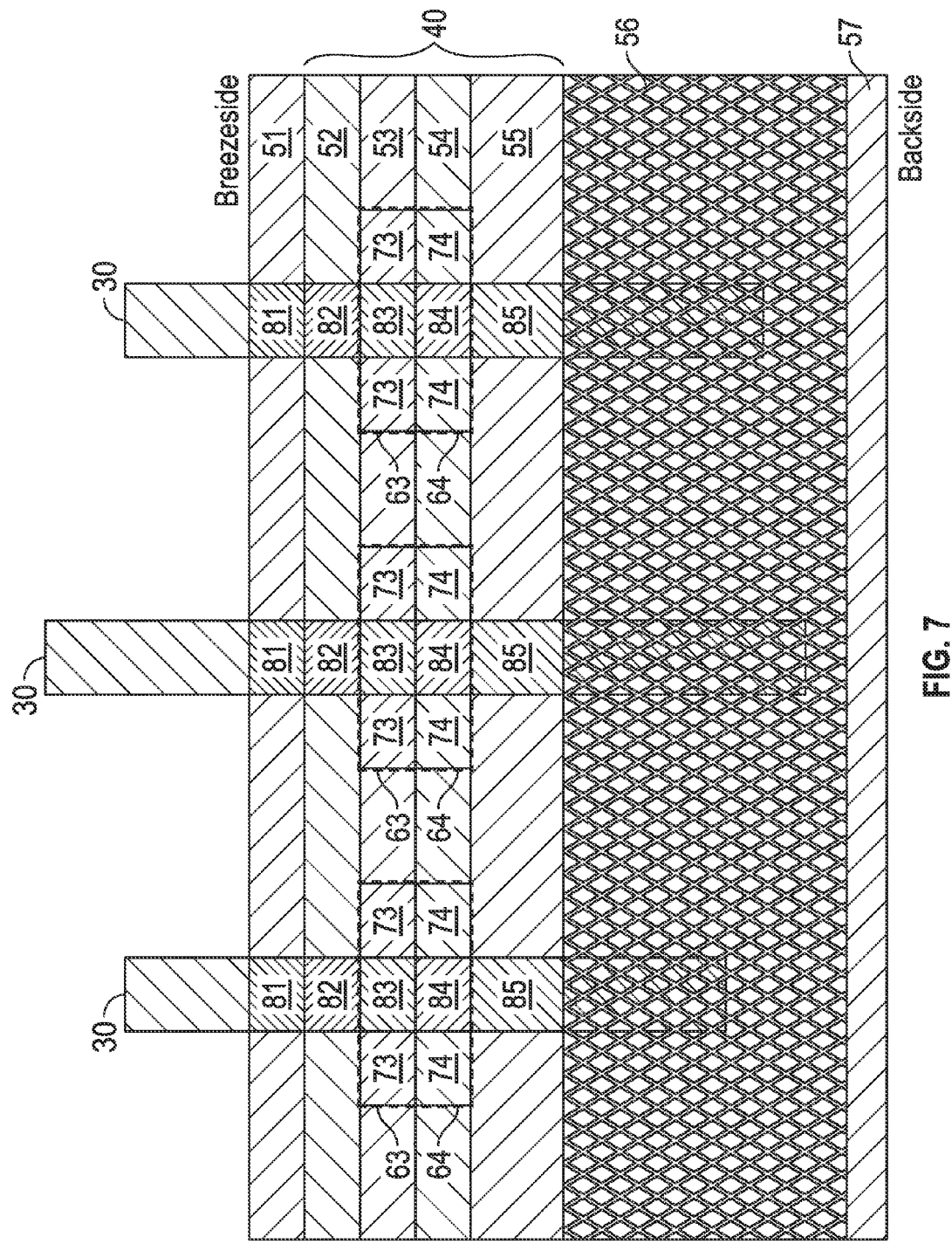
Figure 7A:
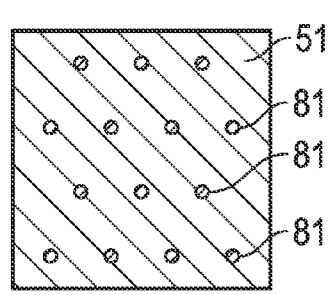
Figure 7B:
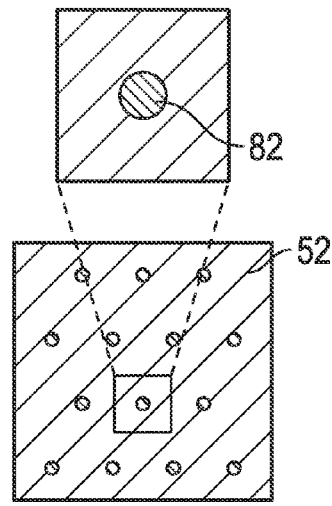
Figure 7C:
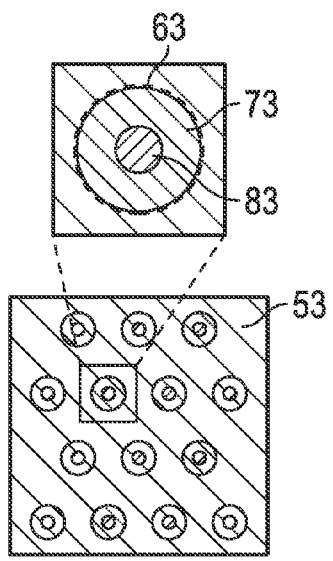
Figure 7D:
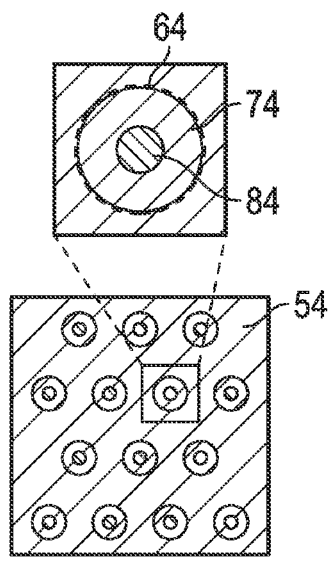
Figure 7E:
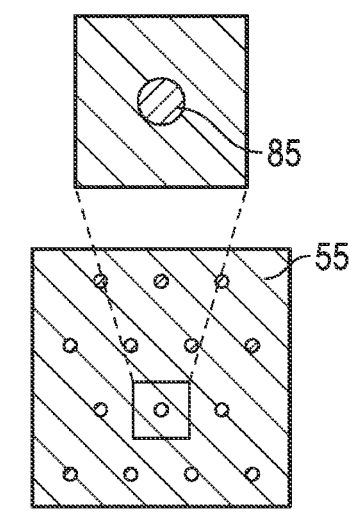
Figure 7F:
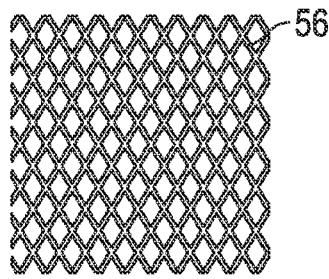
Figure 7G:
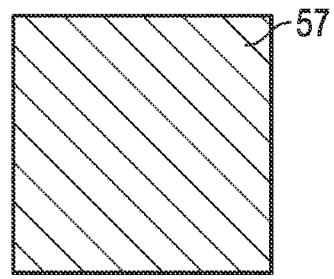

Referring to FIG. 4, the acoustic panel 20 comprises a breezeside sheet 51, heater layers 52-55, a sound-canceling medium 56, and a sound-reflecting backside skin 57. The sound-penetrating pores 30 travel through the breezeside sheet 51, through the heater layers 52-54, and into the sound-canceling medium. Any sound waves pervading the medium 56 are reflected back thereinto by the backside skin 57.

The breezeside sheet 51 (often called an erosion shield) is the exposed stratum in the acoustic panel 20. This sheet 51 is located nearest the noise-residing space 14 and ice accumulates thereon during flight.

The heater layers 52-55 form the heater 40. They can be located just beneath the breezeside sheet 51 so as to effectively and efficiently transfer ice-protecting heat thereto. The heater layer 53 is an electrically conductive layer having an electrical resistance which determines its heating capacity. The layers 52 and 54 are electrically insulative layers located breezeside and backside, respectively, of the electrically conductive layer 53. The layer 55 is a structural layer which forms the rigid base of the heater 40.

The heater layers 52-55 have apertures 62-65 extending completely through their thicknesses (i.e., their dimensions in the breezeside-backside direction). The aperture 62 is filled with sealant 72, the aperture 63 is filled with sealant 73, the aperture 64 is filled with sealant 74, and the aperture 65 is filled with sealant 75. The apertures 62 and 64 in the insulative layers 52 and 54 are aligned with the apertures 63 in the electrically conductive layer 53. The apertures 65 in the structural layer 55 are also aligned with the apertures 63 in the conductive layer 53.

The apertures 63 in the electrically conductive layer 53 set the electrical resistance and thus the heating capacity of the heater 40. The apertures 63 create discontinuities causing electrical current to seek a less direct path through the layer 53, thereby increasing electrical resistance so as to increase the thermal output of the heater 40. Accordingly, as a general rule, the more area collectively occupied by the apertures 63 (i.e., the greater the POA—percentage of open area), the higher the electrical resistance of the layer 53.

The sealant material can be selected to not influence the electrical characteristics of the heater 40. In other words, the electrical resistance of the conductive layer 53 when the apertures 63 are empty can be substantially the same as when they are filled with the sealant 73. The same material can be used to fill the other heater apertures (e.g., sealants 72, 74, 76). And they can all be formed in one piece so as to produce a unitary plug or other mass filling the heater apertures 62-65, with individual levels being indiscernible but for their loft relative to the layers 52-55.

Sound-penetrating openings 81 extend through the breezeside sheet 51 and sound penetrating openings 82-85 also extend through the heater layers 52-55. These openings 81-85 align and coalesce to create the sound-penetrating pores 30 for the acoustic panel 20.

The sound-penetrating opening 83 in the electrically conductive heater layer 53 pass through the sealant 73 and the sealant 73 surrounds each sound-penetrating opening 83. This opening-within-aperture arrangement serves to electrically isolate the conductive layer 53 from the sound-penetrating pores 30. And it also seals the conductive layer 53 against environmental aspects (e.g., moisture) which can creep in through the sound-penetrating pores 30.

The heater 40 shown in FIG. 4 can be made by a method wherein the heater layers 52-55 are compiled (FIG. 4H), the apertures 62-65 are produced (FIG. 4I), and the apertures 62-65 are filled with the sealant 72-75 (FIG. 4J). If the apertures 62-65 are substantially simultaneously filled with the same sealant substance, the sealants 72-75 will be formed in one piece. The breezeside sheet 51 (without any openings 81) can then be assembled to the heater layers 52-55 (FIGS. 4K-4L), and the sound-penetrating openings 81-85 can then be created in the sheet 51 and the layers 52-55 (FIG. 4M). Alternatively, an already perforated breezeside sheet 51 can be assembled on the heater layers 52-55 (FIGS. 4N-4O), and then the sound-penetrating 82-85 created therein (FIG. 4P).

Figure 8:
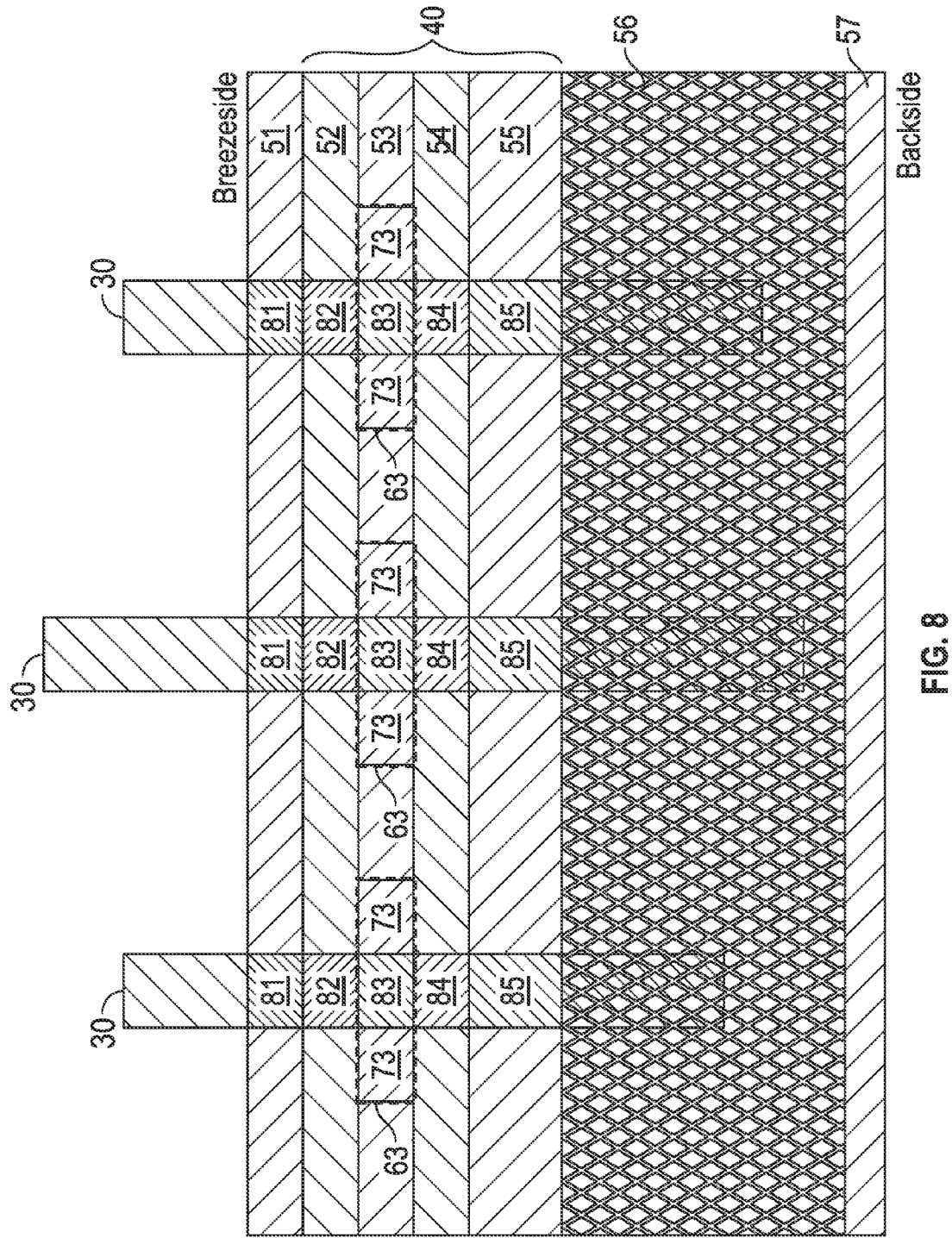

Only the aperture 63 in the conductive layer 53 is necessary for resistance-setting reasons. While production of the other layers' apertures will often facilitate heater fabrication, they should not influence thermal output. Accordingly, the heater 40 can alternatively be constructed with only apertures 62-64 (FIG. 5), with only apertures 63-64 (FIG. 6), with only apertures 62-63 (FIG. 7), or with only aperture 63 (FIG. 8). In the panels 20 shown in FIGS. 4-8, the sealants 72-75 can comprise an insulative material different from that of the insulative layer 52 and/or the insulative layer 54. And the aperture-filling process can comprise a sealant-introducing step.

Alternatively, as shown in FIGS. 9-13, the sealants 72-75 can comprise an insulative material which is the same as the insulative layers 52/54. In this case, a separate sealant-introducing step may not be required, as the sealants 72-75 can be formed during layer lamination when the layer material melts, flows, or otherwise deforms into the open apertures. Additionally or alternatively, the sealant introduced can be the same material as that of the insulative layer 52 and/or the insulative layer 54.

Figure 13:
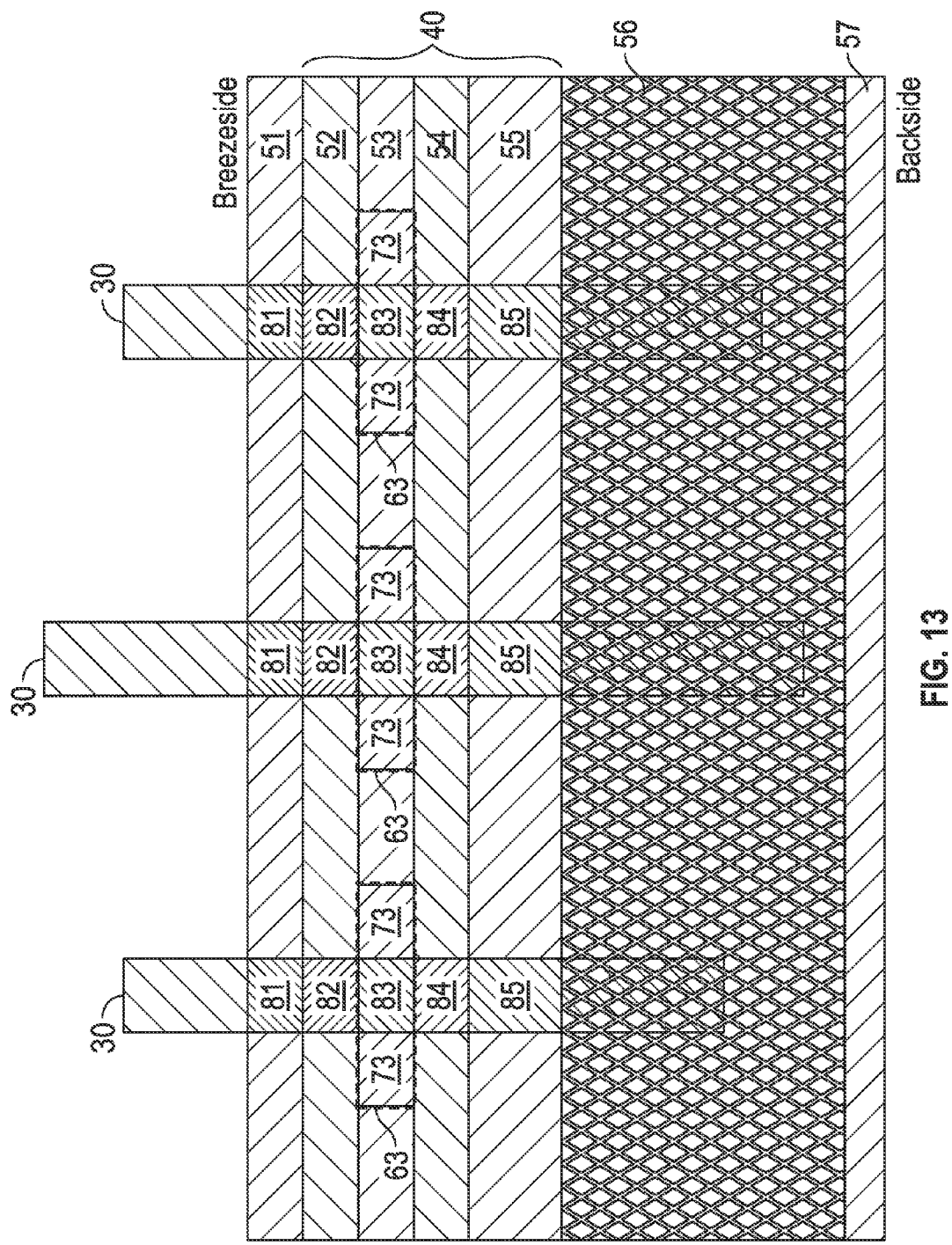
Figure 13A:
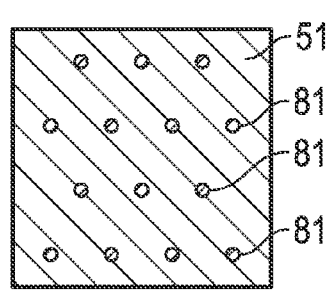
Figure 13B:
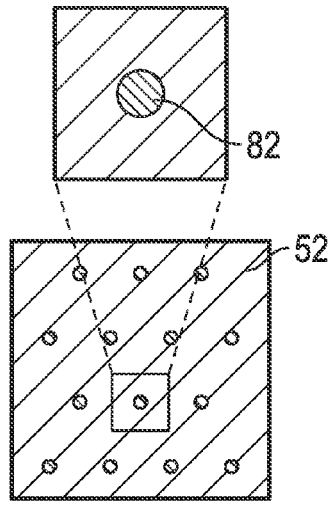
Figure 13C:
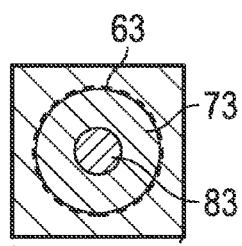
Figure 13C:
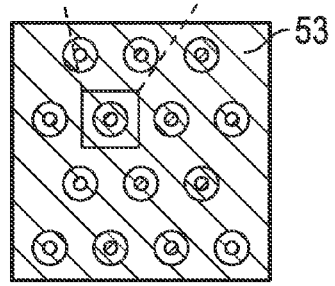
Figure 13D:
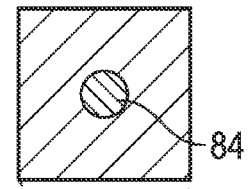
Figure 13D:
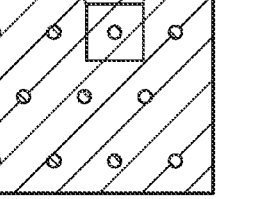
Figure 13E:
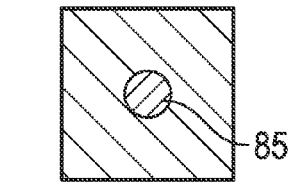
Figure 13E:
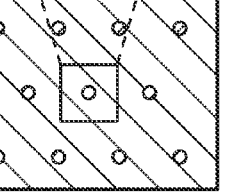
Figure 13F:
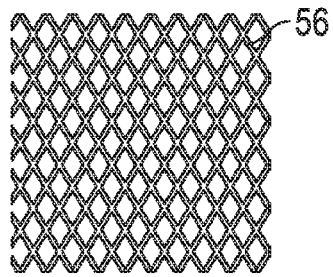
Figure 13G:
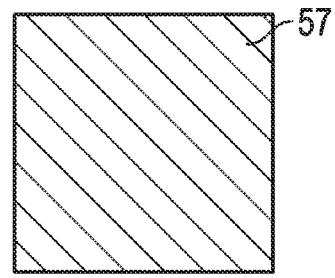

The heaters 40 shown in FIGS. 9-13 can likewise be constructed with apertures 62-65 (FIG. 9), apertures 62-64 (FIG. 10), apertures 63-64 (FIG. 11), with apertures 62-63 (FIG. 12), or with only aperture 63 (FIG. 13).

In the acoustic panels 20 shown in FIGS. 4-13, each sealant-filled aperture 63 has only one sound-penetrating 83 extending therethrough. In the acoustic panels 20 shown in FIGS. 14-23 more than one sound-penetrating opening 83 extends through each sealant filled aperture 63. Depending upon panel design, a few, several, or many openings 83 can occupy each sealant-filled aperture 63.

Figure 18:
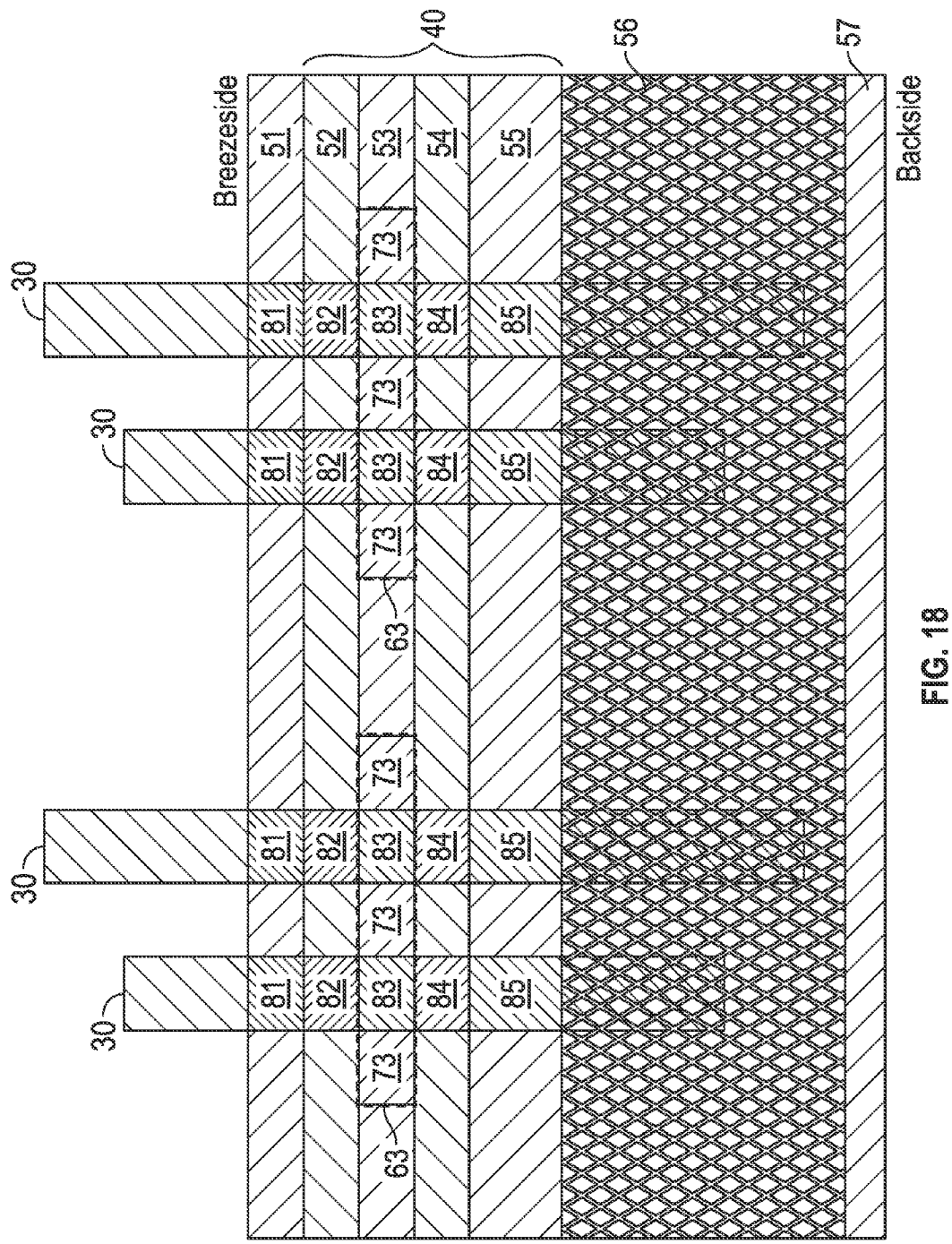
Figure 18A:
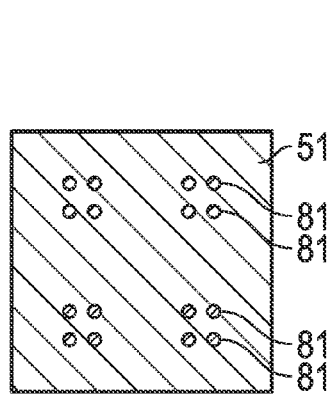
Figure 18B:
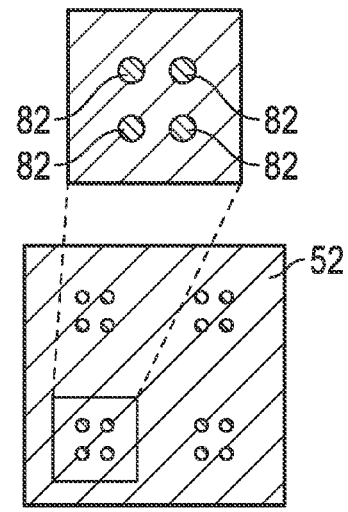
Figure 18C:
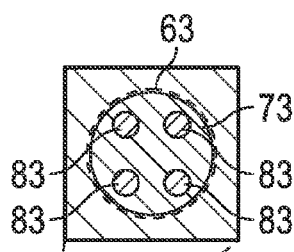
Figure 18C:
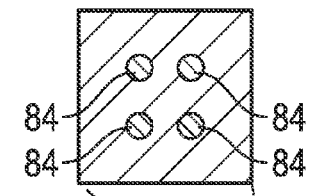
Figure 18C:
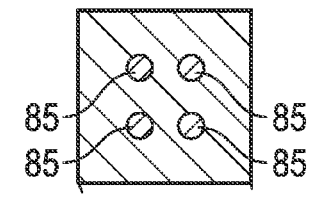
Figure 18C:
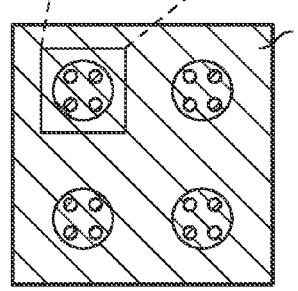
Figure 18D:
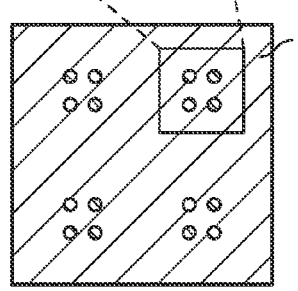
Figure 18E:
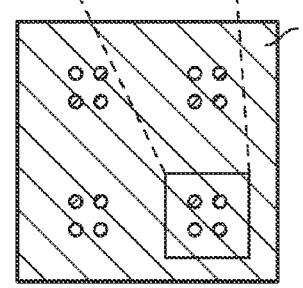
Figure 18F:
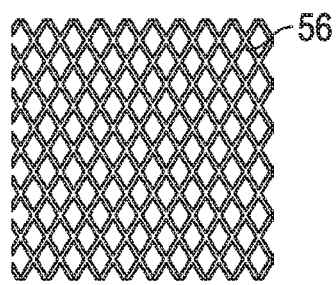
Figure 18G:
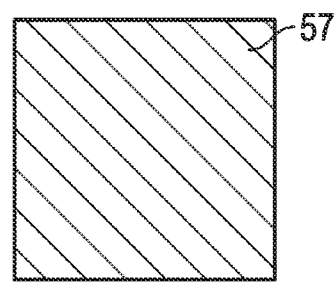
Figure 23:
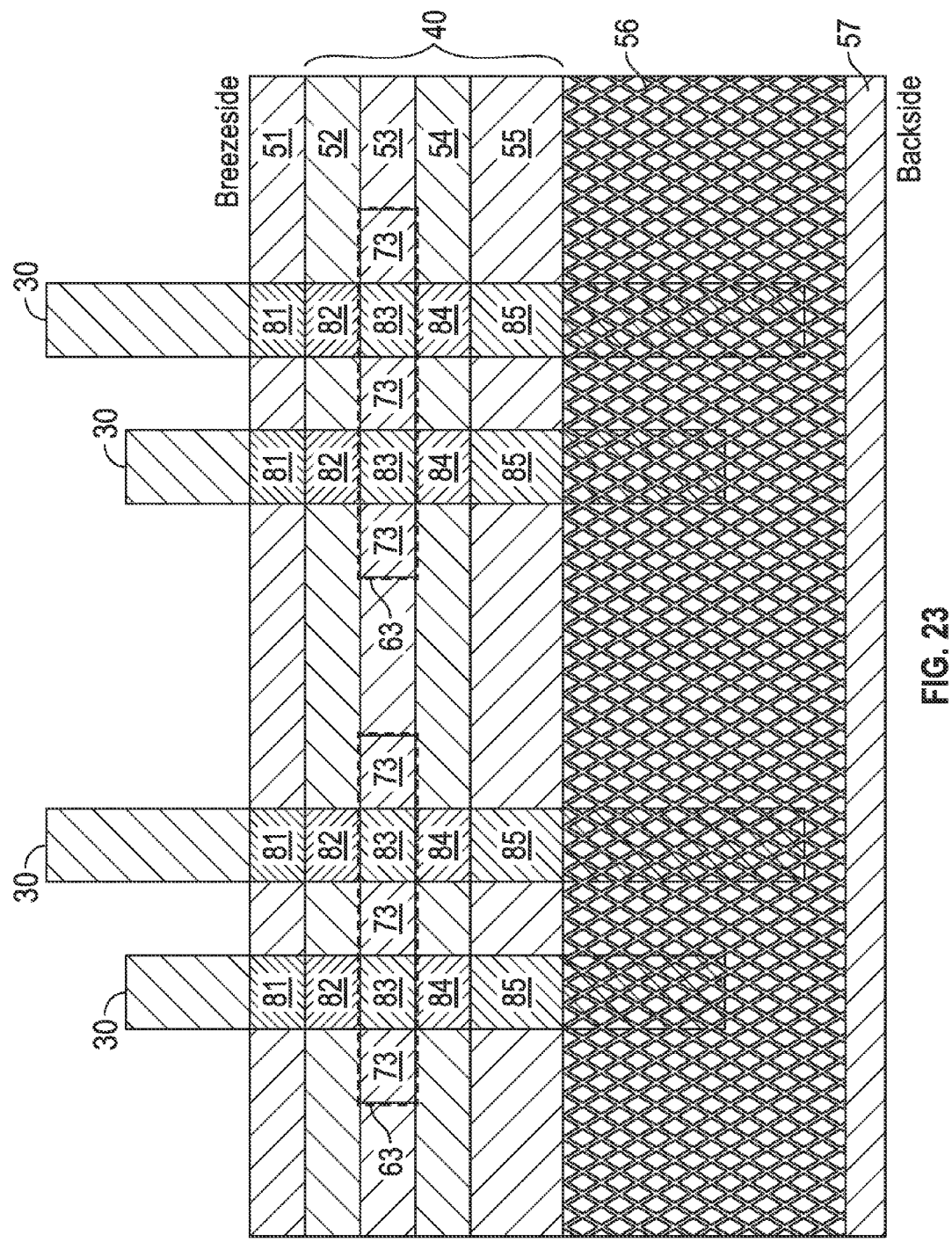

The heaters 40 shown in FIGS. 14-23 can be made in the same manner as those of FIGS. 4-13, expect that plural openings 82-83 are created during the opening-creating steps (compare the J and M drawings in the $4^{th}$ through $13^{th}$ drawing sets with the J and M drawings in the $14^{th}$ through $23^{rd}$ drawing sets). The heaters' sealants 72-75 can comprise addendum material discretely supplied to the layers 52-55 (FIGS. 14-18) or they can comprise material donated from the insulative layers 52/54 during lamination or otherwise (FIGS. 19-23). And the heater 40 can be constructed with apertures 62-65 (FIG. 14, FIG. 19), with apertures 62-64 (FIG. 15, FIG. 20), with apertures 63-64 (FIG. 16, FIG. 21), with apertures 62-63 (FIG. 17, FIG. 22), or with only aperture 63 (FIG. 18, FIG. 23).

In the heaters 40 of the acoustic panels 20 shown in FIGS. 4-23, the apertures 62 and 64 in the insulative layers 52 and 54 have substantially the same lateral dimensions as each other and as the aperture 63 in the conductive layer 53. Likewise, the sealant 72 and the sealant 74 in the insulative layers 52 and 54 have substantially the same lateral dimensions and substantially the same lateral dimensions as the sealant 73 in the conductive layer 53.

Figure 24:
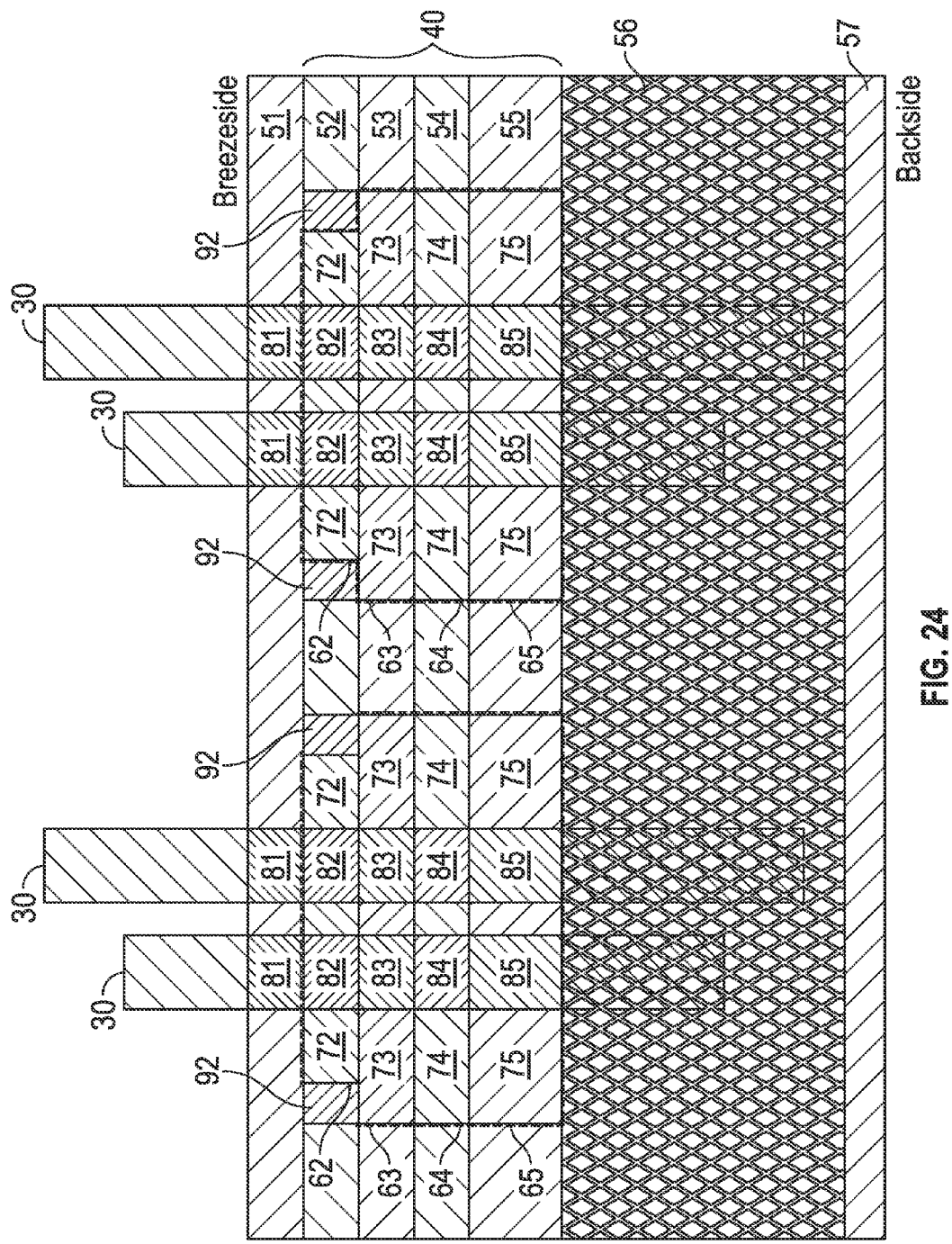
Figure 25:
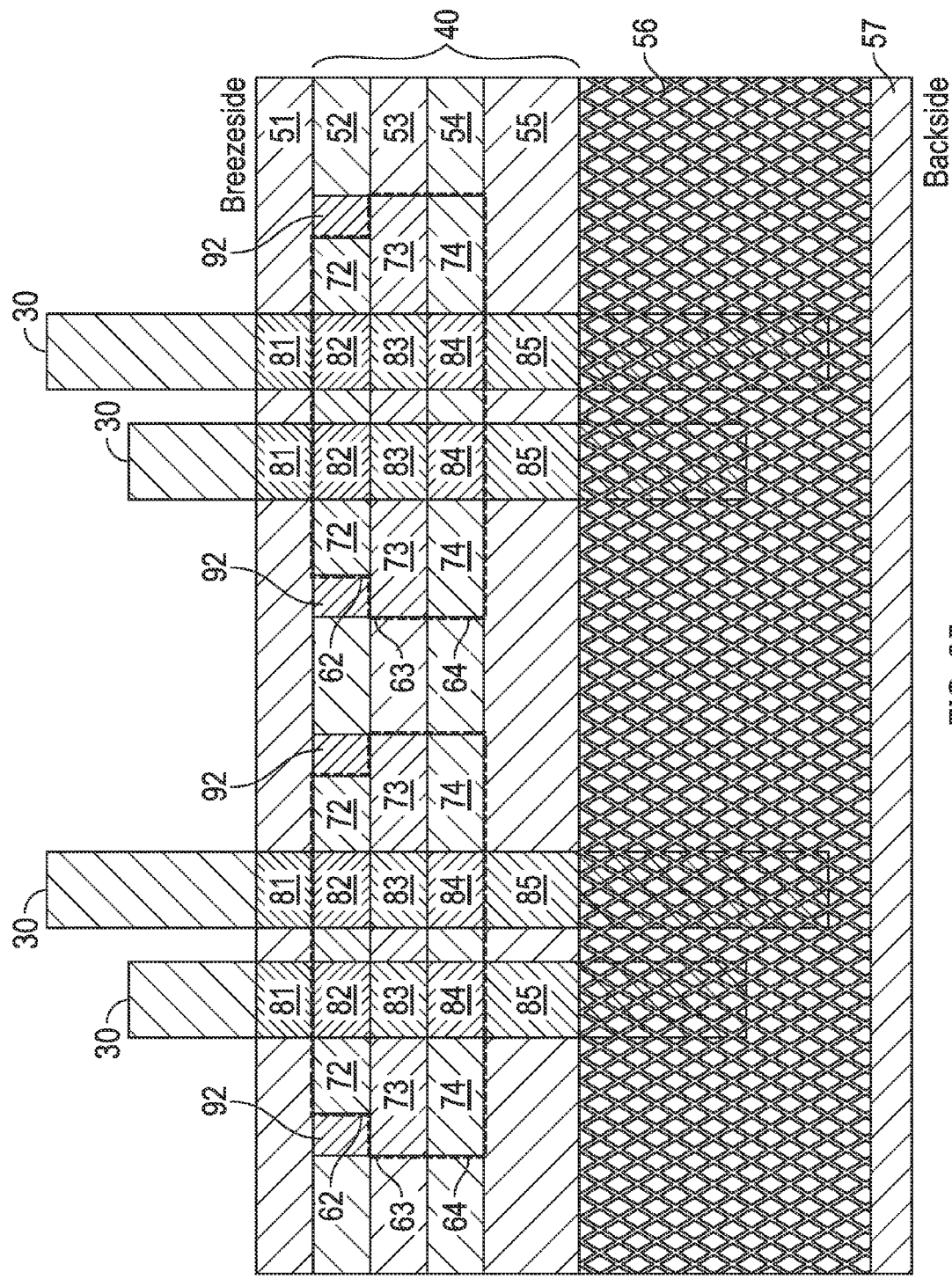
Figure 25A:
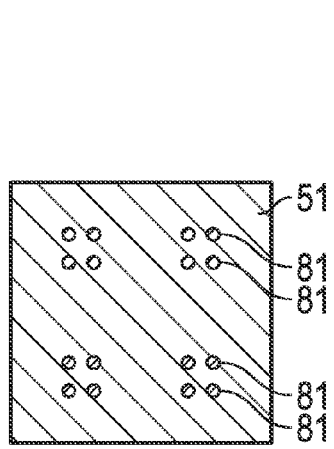
Figure 25B:
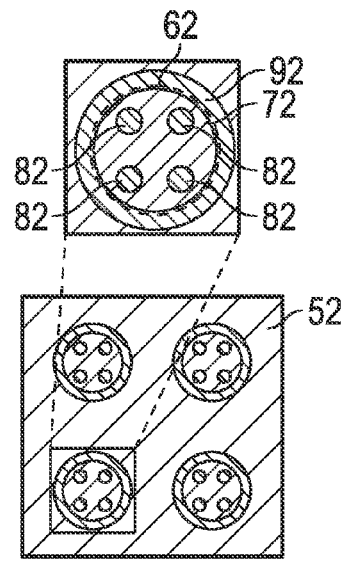
Figure 25C:
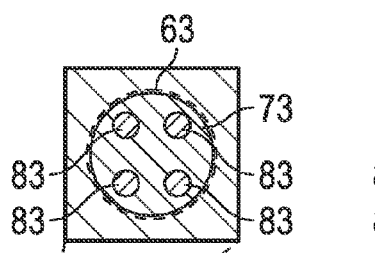
Figure 25D:
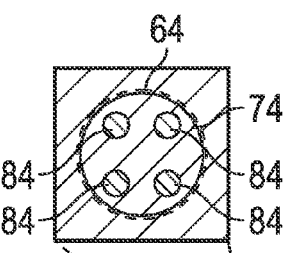
Figure 25E:
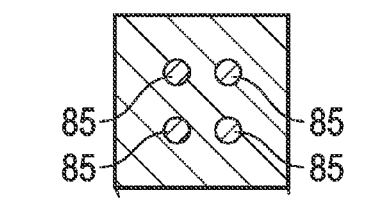
Figure 25F:
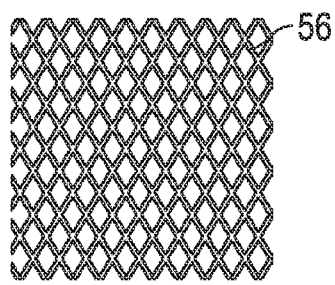
Figure 25G:
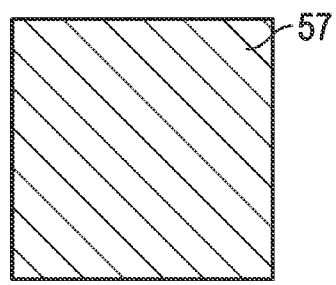
Figure 26:
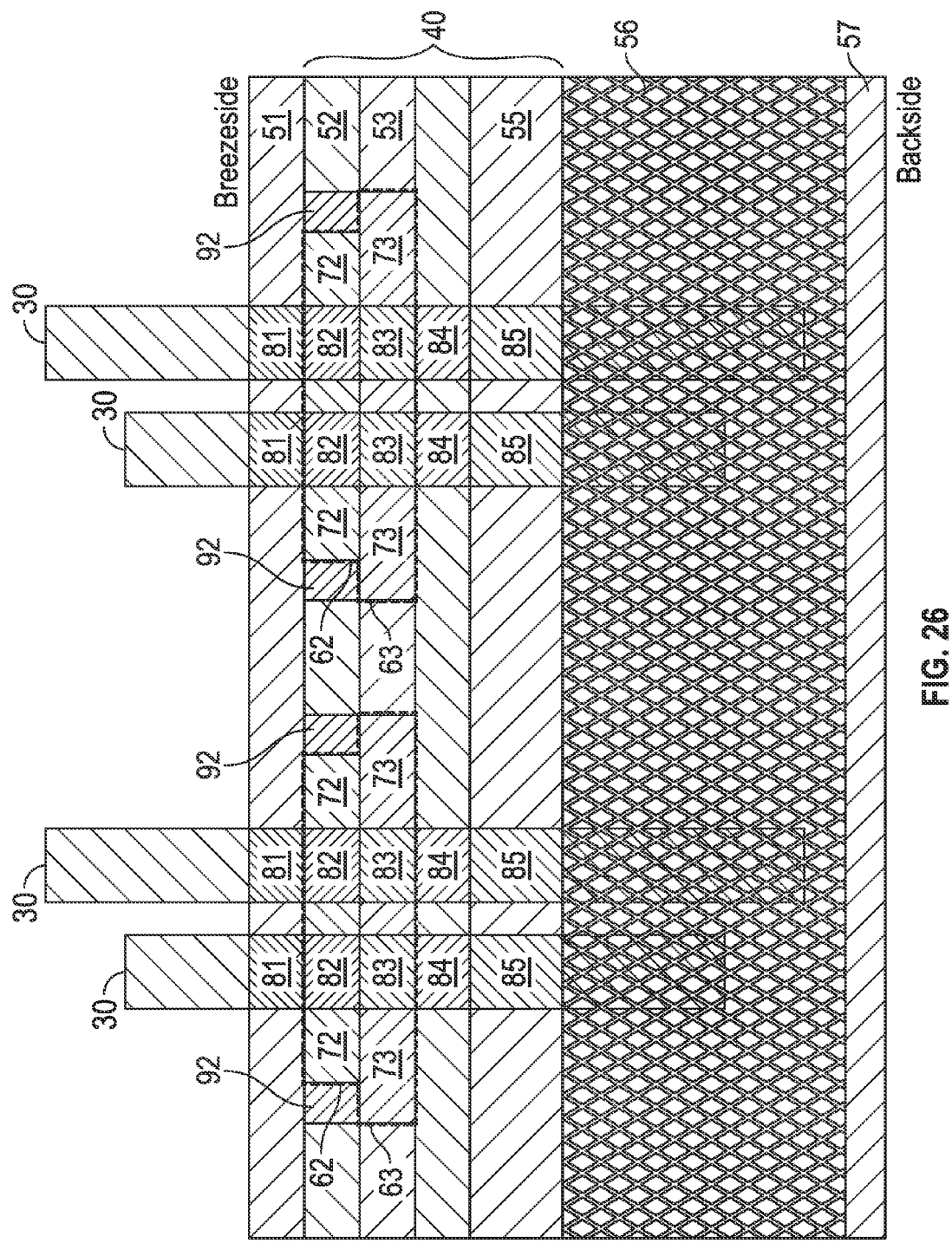
Figure 26A:
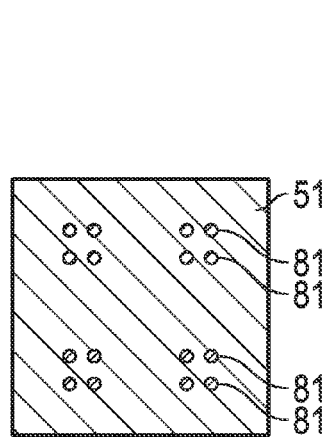
Figure 26B:
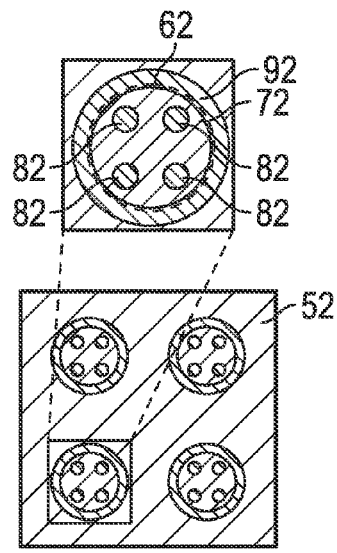
Figure 26C:
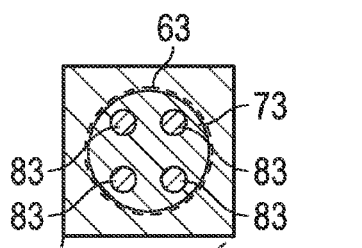
Figure 26D:
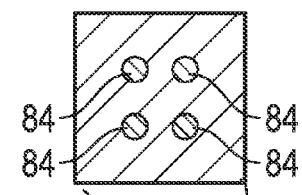
Figure 26E:
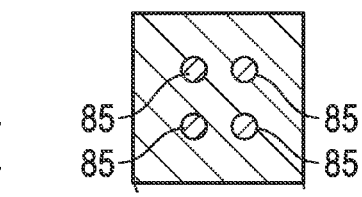
Figure 26F:
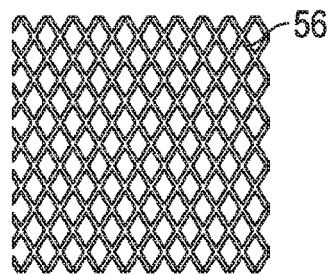
Figure 26G:
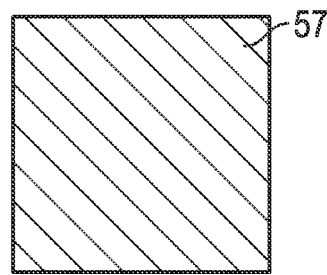

In the heaters 40 of the acoustic panels 20 shown in FIG. 24-26, the aperture 62 of the breezeside insulative layer 52 is purposely sized smaller than the aperture 63 in the conductive layer 53. This relative difference in lateral dimensions, along with a substantially concentric orientation, causes a shelf 92 to be formed in the breezeside layer 52. This shelf 92 canopies over a perimeter rim of the sealant 73 of the electrically conductive layer 53. The shelf 92 can be formed during the aperture-producing method (see e.g., FIG. 24I, FIG. 25I, FIG. 26I). The heaters 40 can comprise apertures 62-65 (FIG. 24), apertures 62-64 (FIG. 25), or apertures 62-63 (FIG. 26).

In the acoustic panels 20 shown in FIG. 24-26, the sound-penetrating openings 82-84 are centered within the sealant-filled apertures 62-64. The sealant 72 surrounds each sound-penetrating opening 82 in the breezeside insulative layer 52, and sealant 74 surrounds each sound-penetrating opening 84 in the backside insulative layer 54. And each sound-penetrating opening 83 in the conductive layer 53 is surrounded by the sealant 73.

With the aperture-opening arrangement shown in FIG. 24-26, the significance of the shelf 92 may be easy to overlook as the sound-penetrating opening 83 is prudently distanced from the aperture-defining edge. Thus, even without the shelf 92, openings 83 would be safely surrounded by the sealant 73 so as to isolate the conductive layer 53 from the sound-penetrating pores 30.

Figure 27:
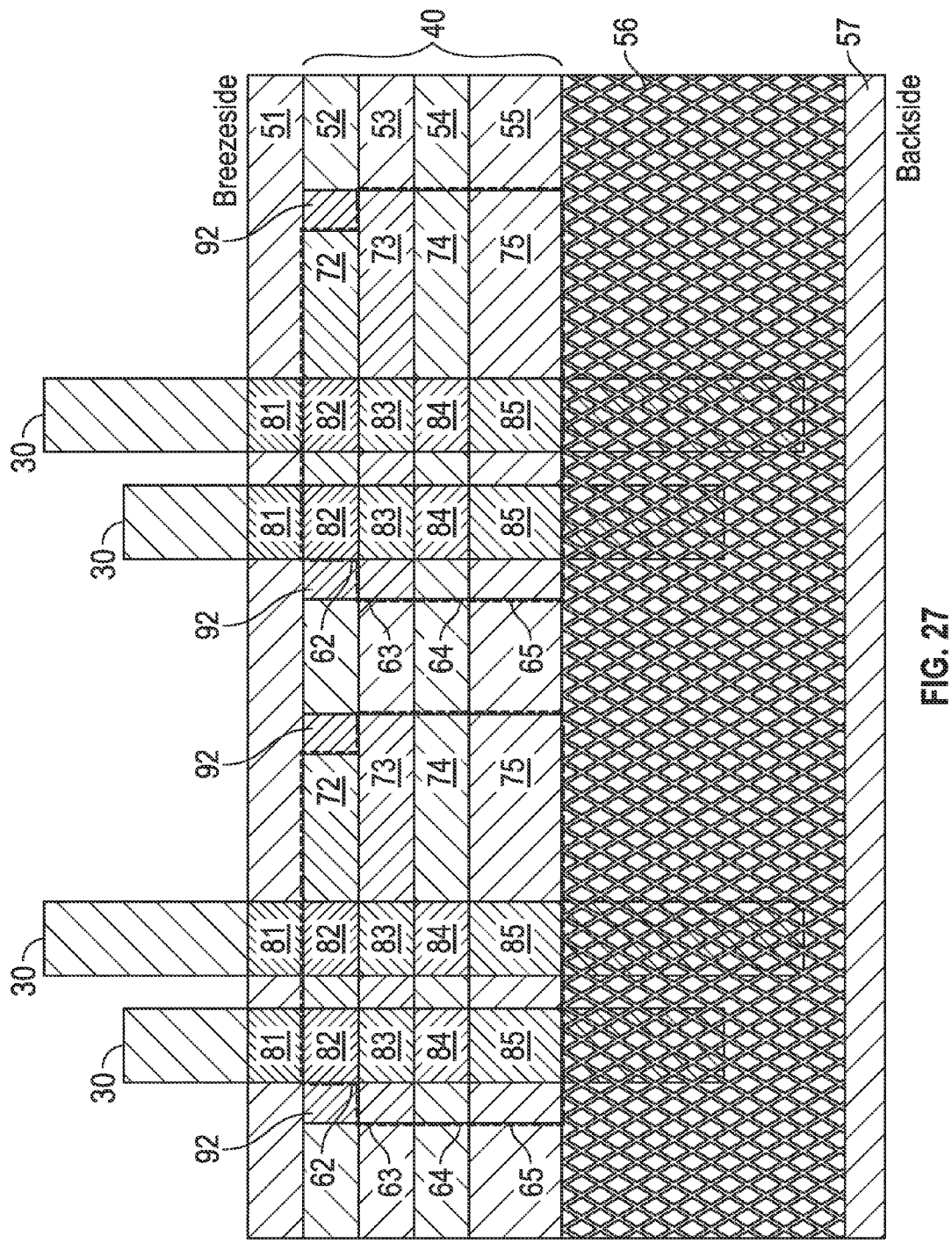
Figure 27A:
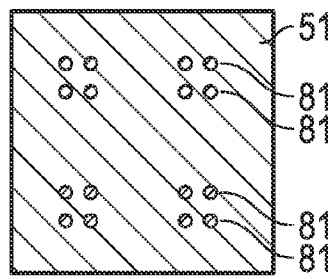
Figure 27B:
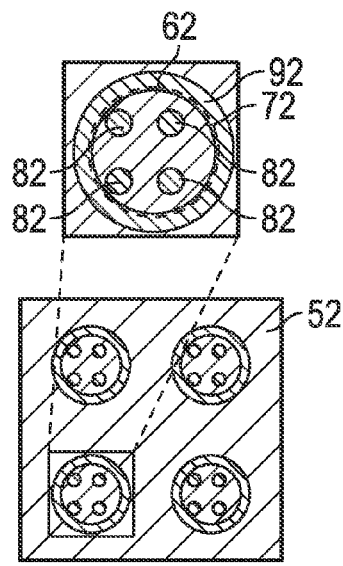
Figure 27C:
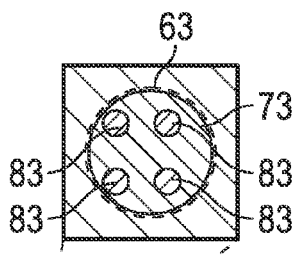
Figure 27D:
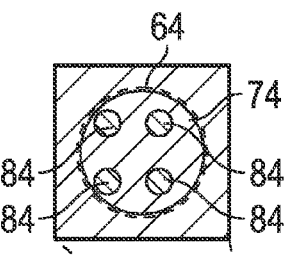
Figure 27E:
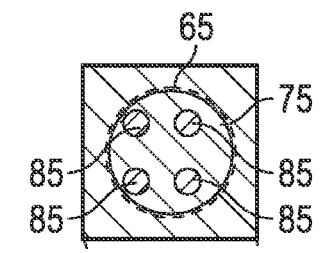
Figure 27F:
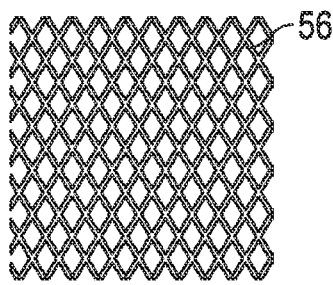
Figure 27G:
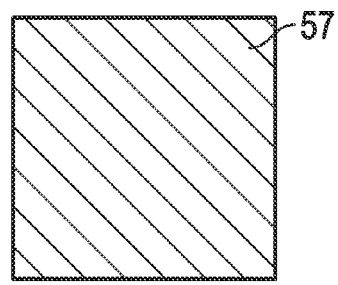
Figure 28:
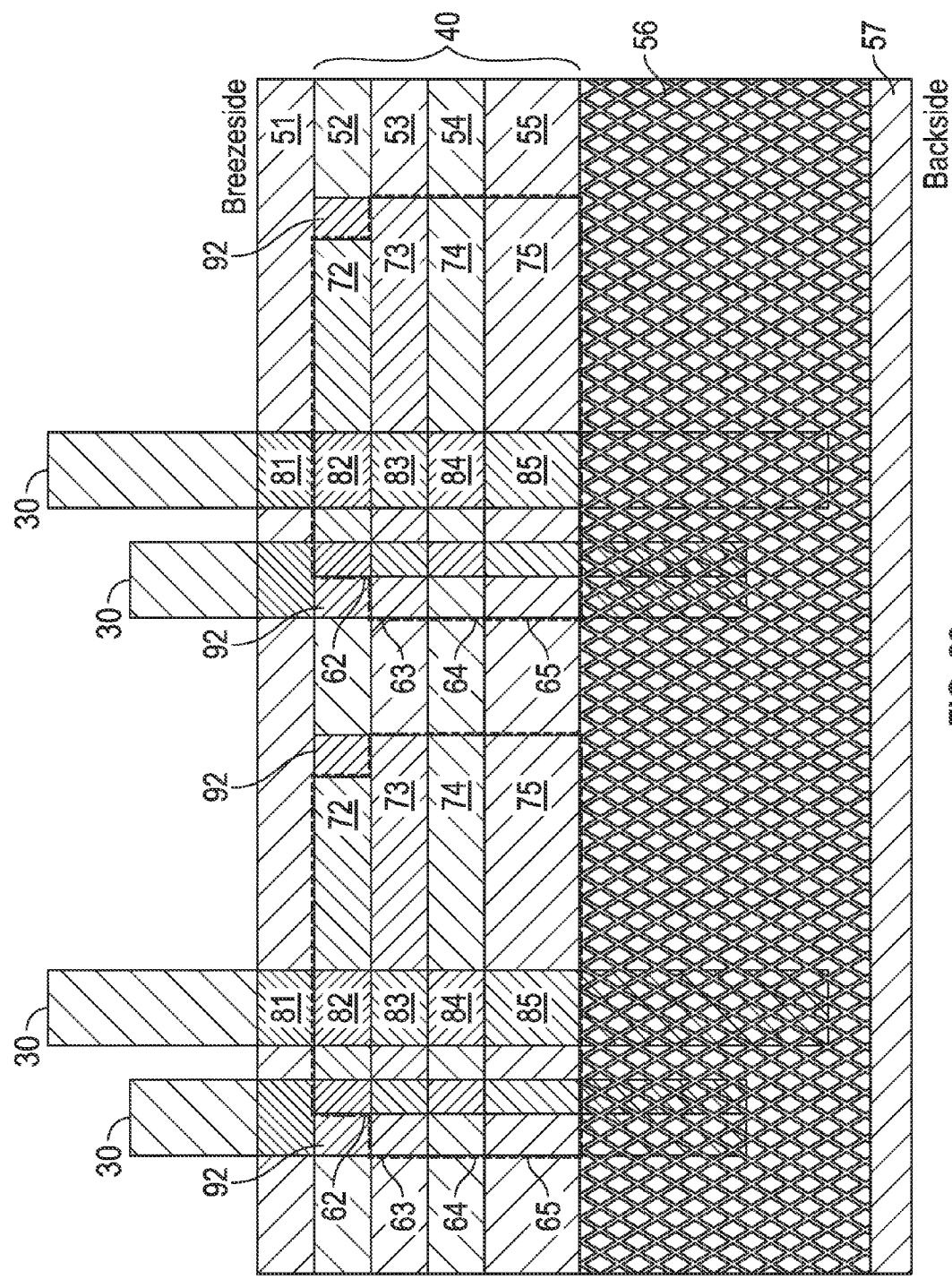
Figure 28A:
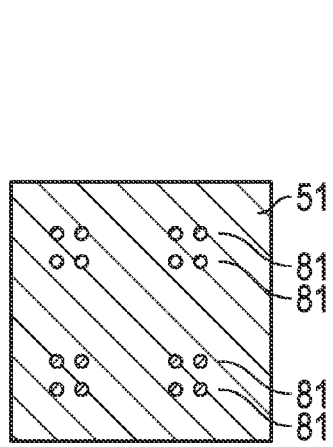
Figure 28B:
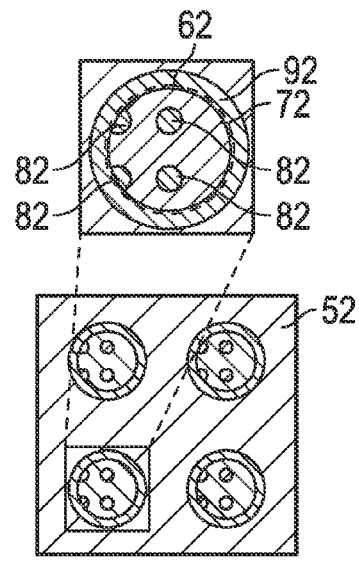
Figure 28C:
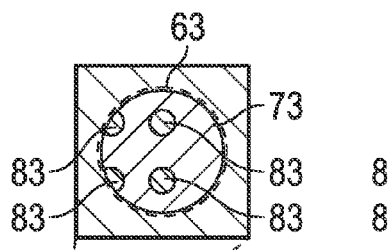
Figure 28D:
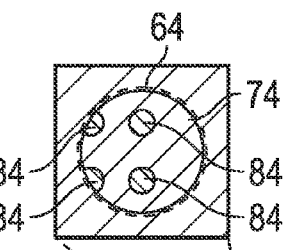
Figure 28E:
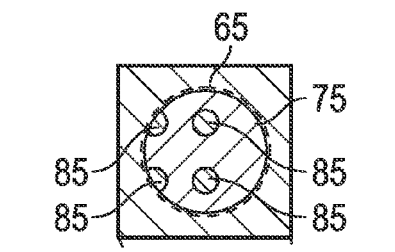
Figure 28F:
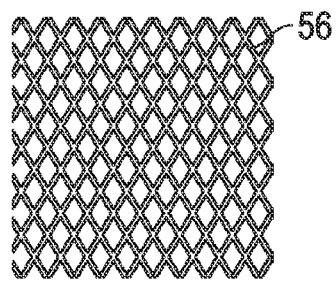
Figure 28G:
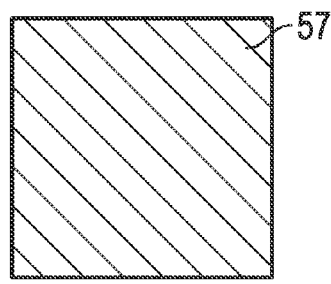
Figure 29:
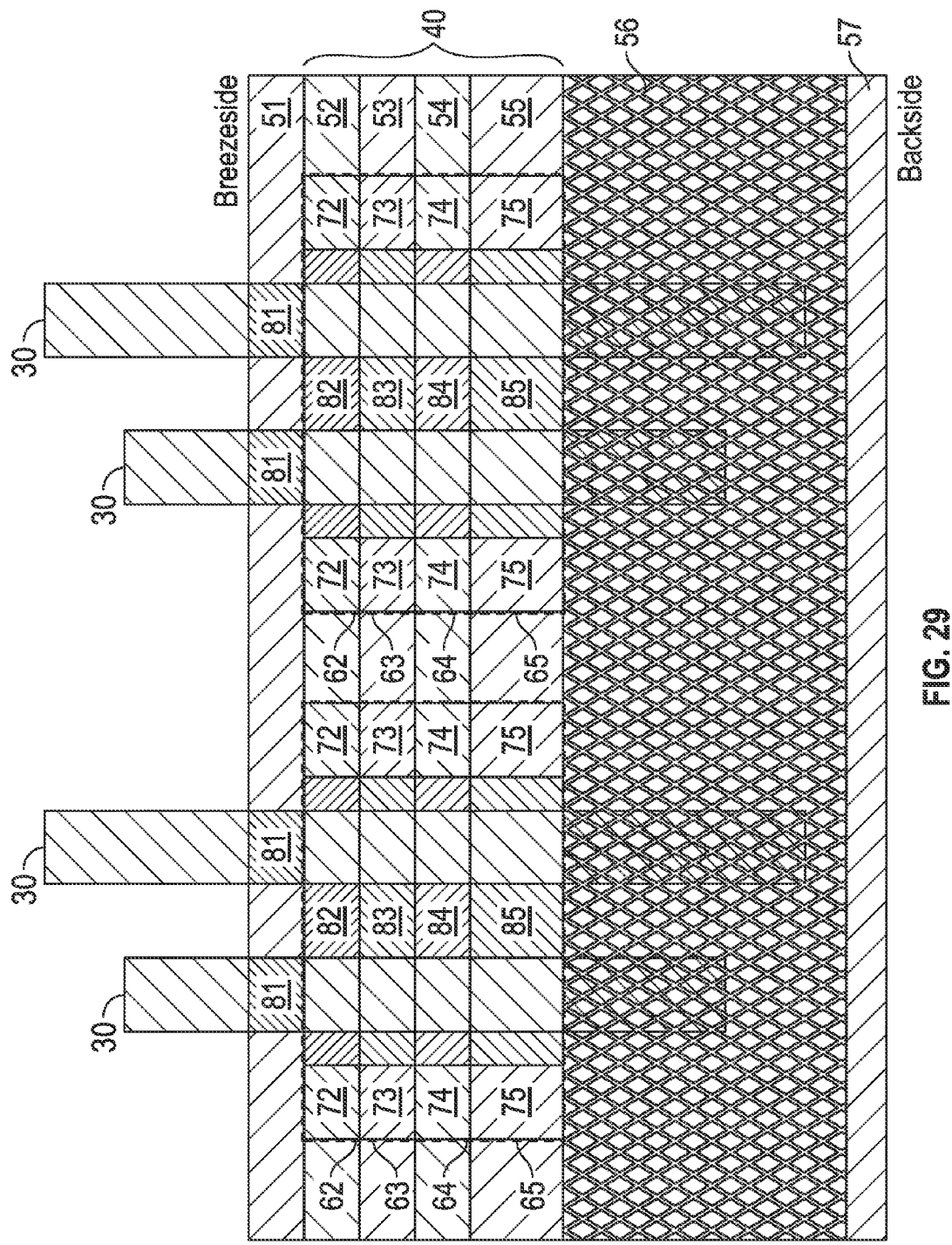
Figure 30:
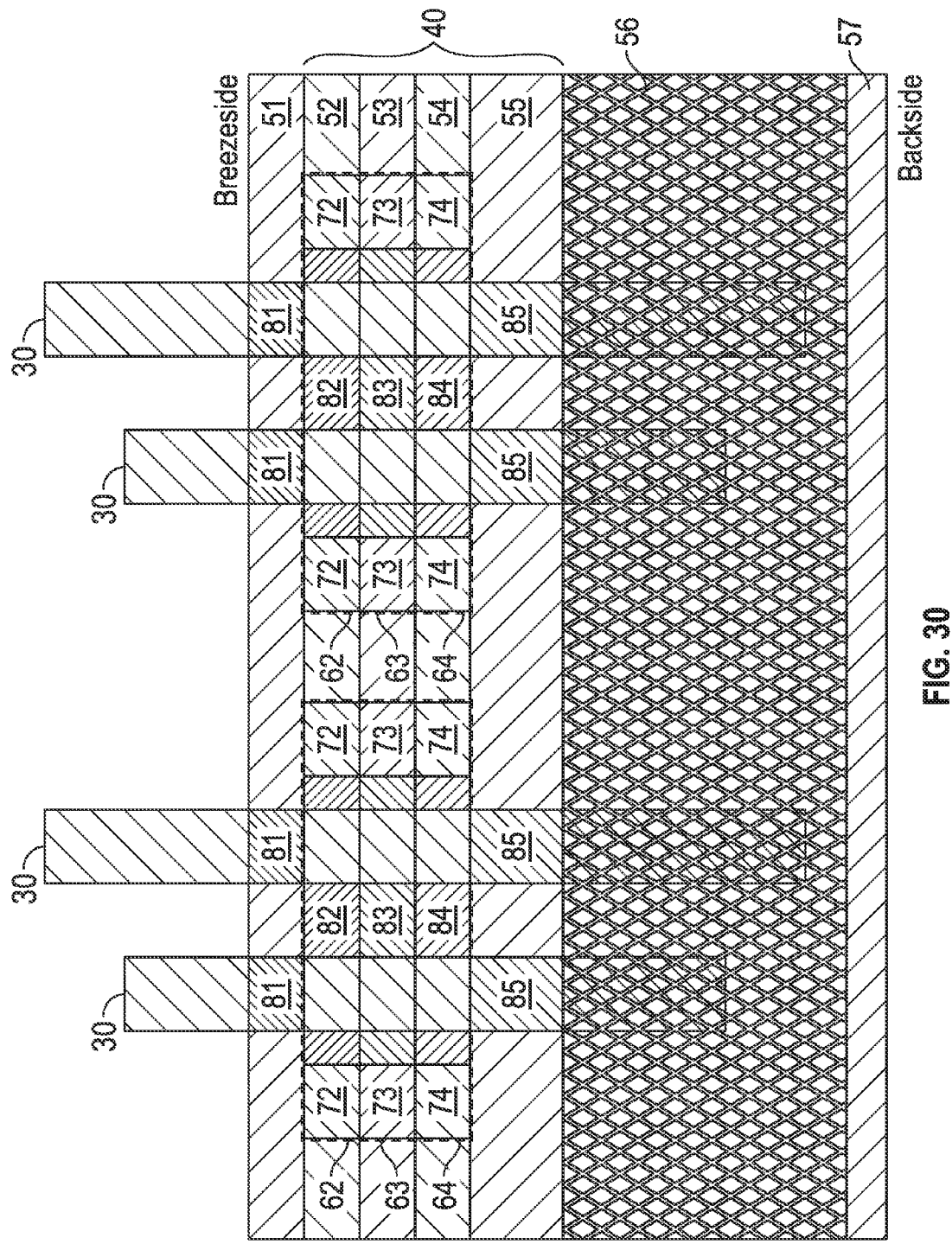
Figure 31:
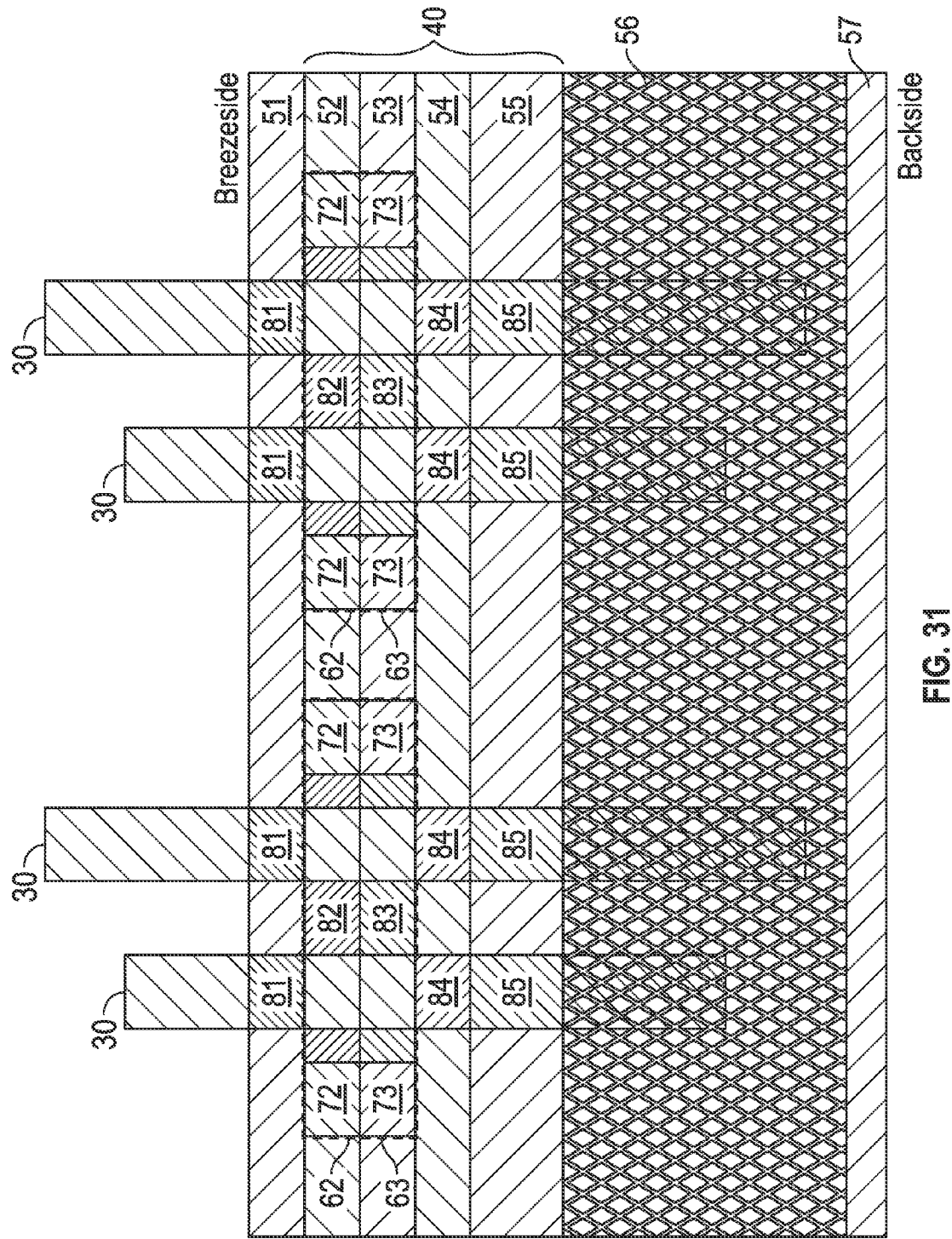
Figure 31I:
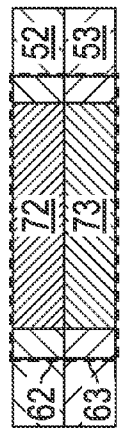
Figure 31H:
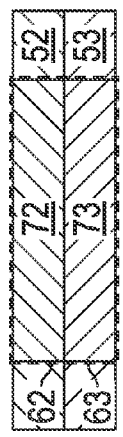
Figure 31K:
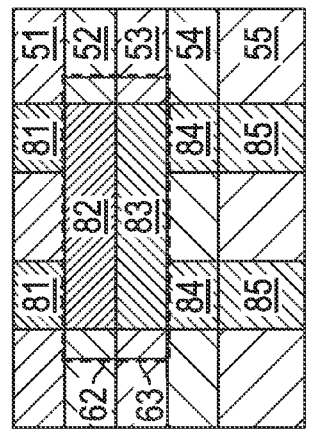
Figure 31L:
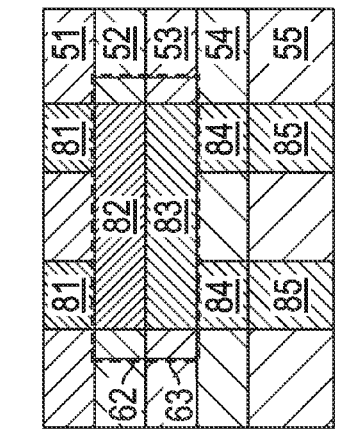
Figure 31K:
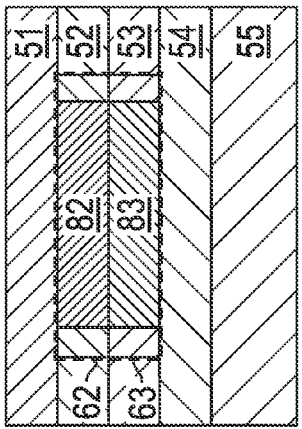
Figure 31N:
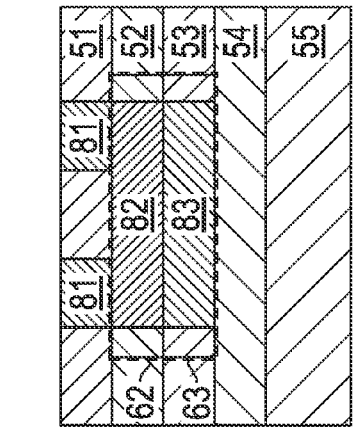
Figure 31J:
Figure 31J:
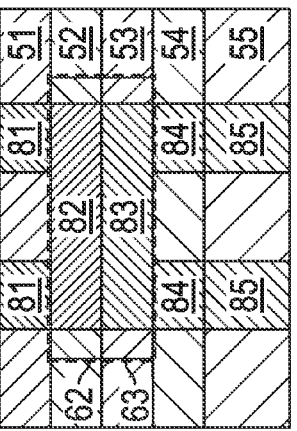
Figure 31M:
Figure 31M:
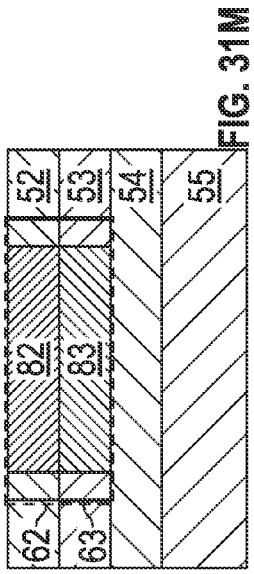
Figure 32:
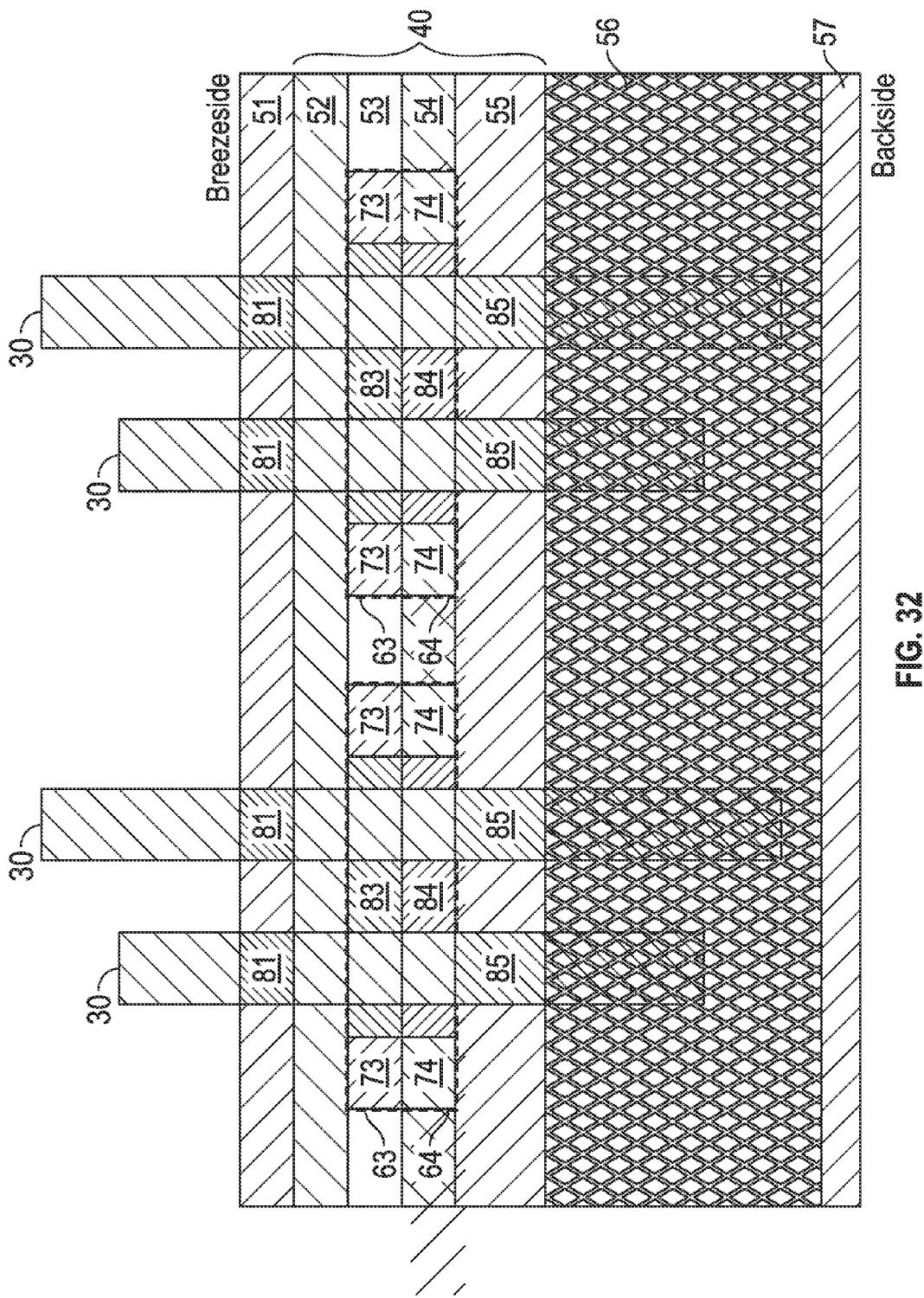
Figure 32A:
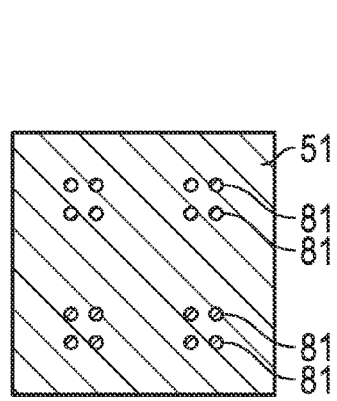
Figure 32B:
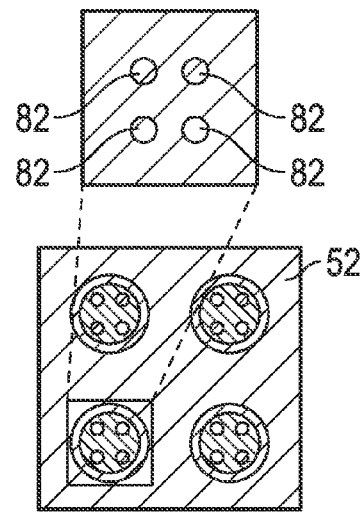
Figure 32C:
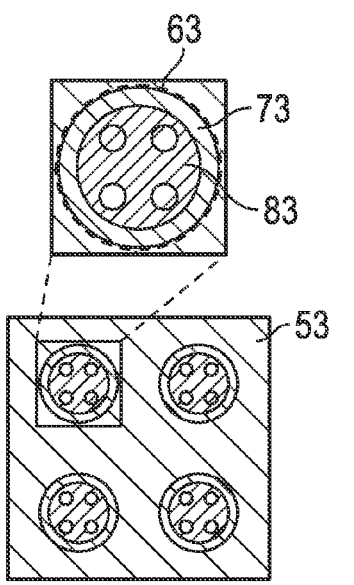
Figure 32D:
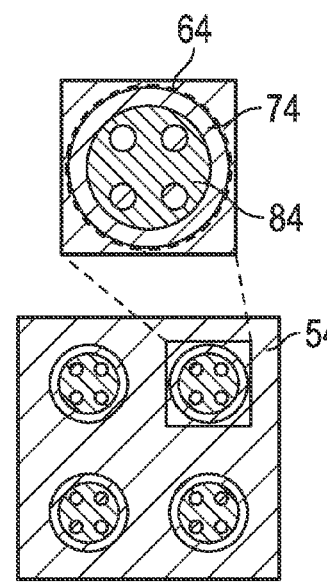
Figure 32E:
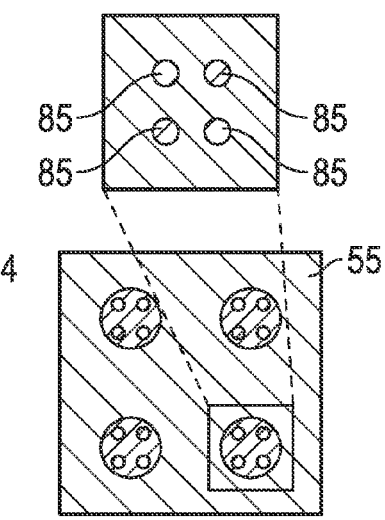
Figure 32F:
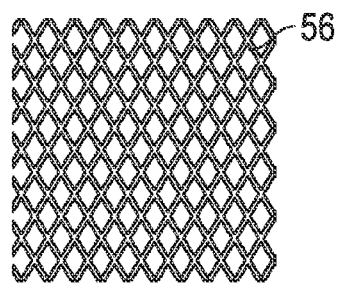
Figure 32G:
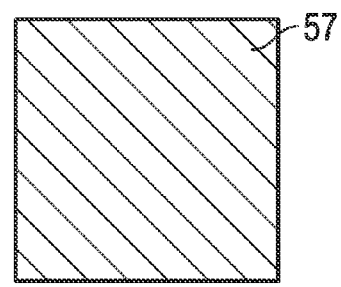

However, as is shown in FIGS. 27-28, the shelf 92 becomes a worthwhile asset with other aperture-opening arrangements. Specifically, the shelf 92 serves to truncate sectors of the profile of the openings 83 which would be "too close" to the boundary of the aperture 63 in the electrically conductive layer 53. This ensures that the interior edge of the conductive material defining the aperture 63 will be always sealed from an adjacent sound-penetrating pore 30, regardless of opening-to-aperture orientations.

Figure 33:
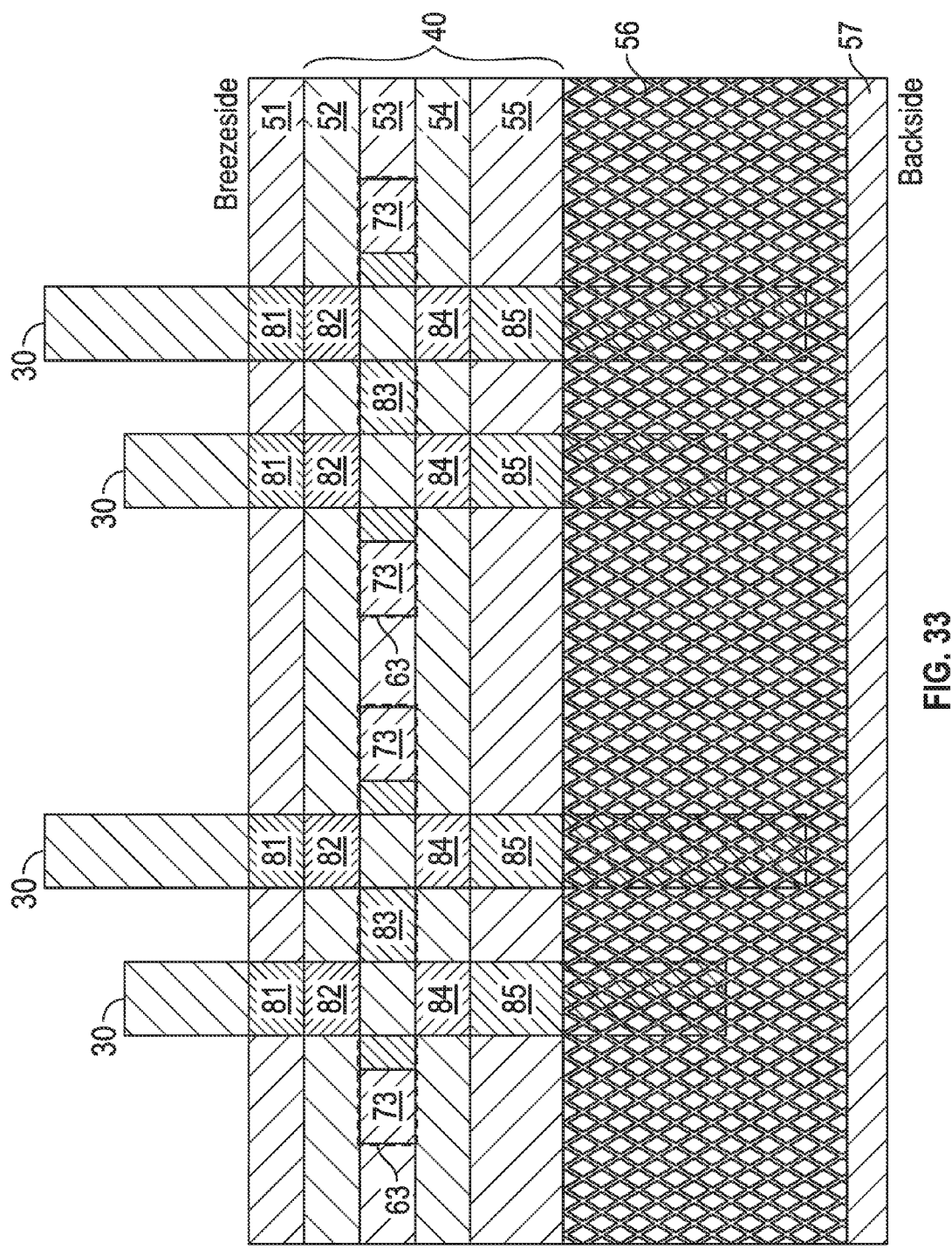
Figure 33A:
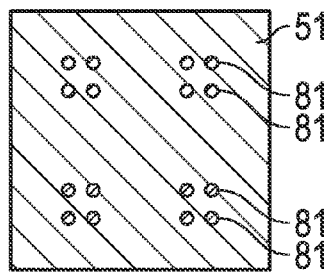
Figure 33B:
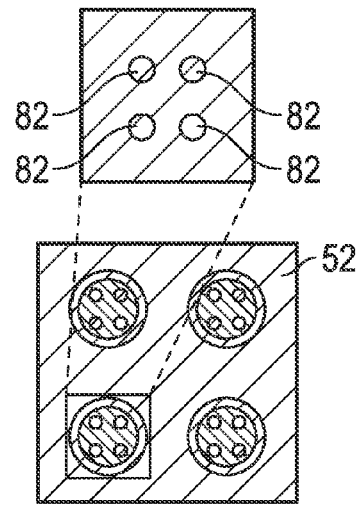
Figure 33C:
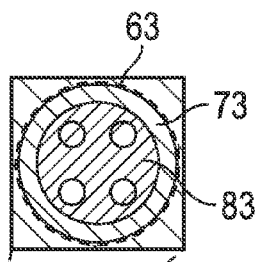
Figure 33D:
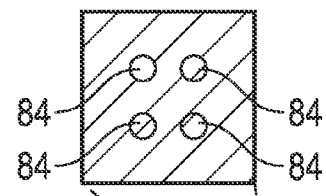
Figure 33E:
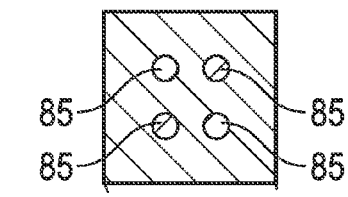
Figure 33F:
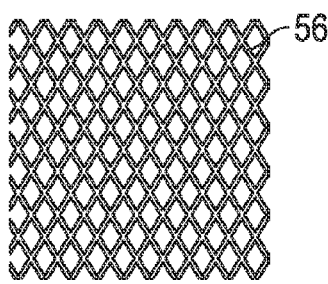
Figure 33G:
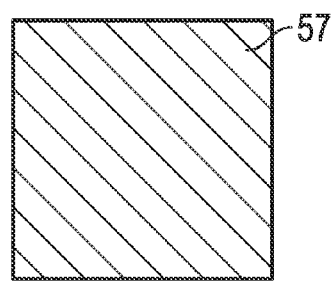
Figure 34:
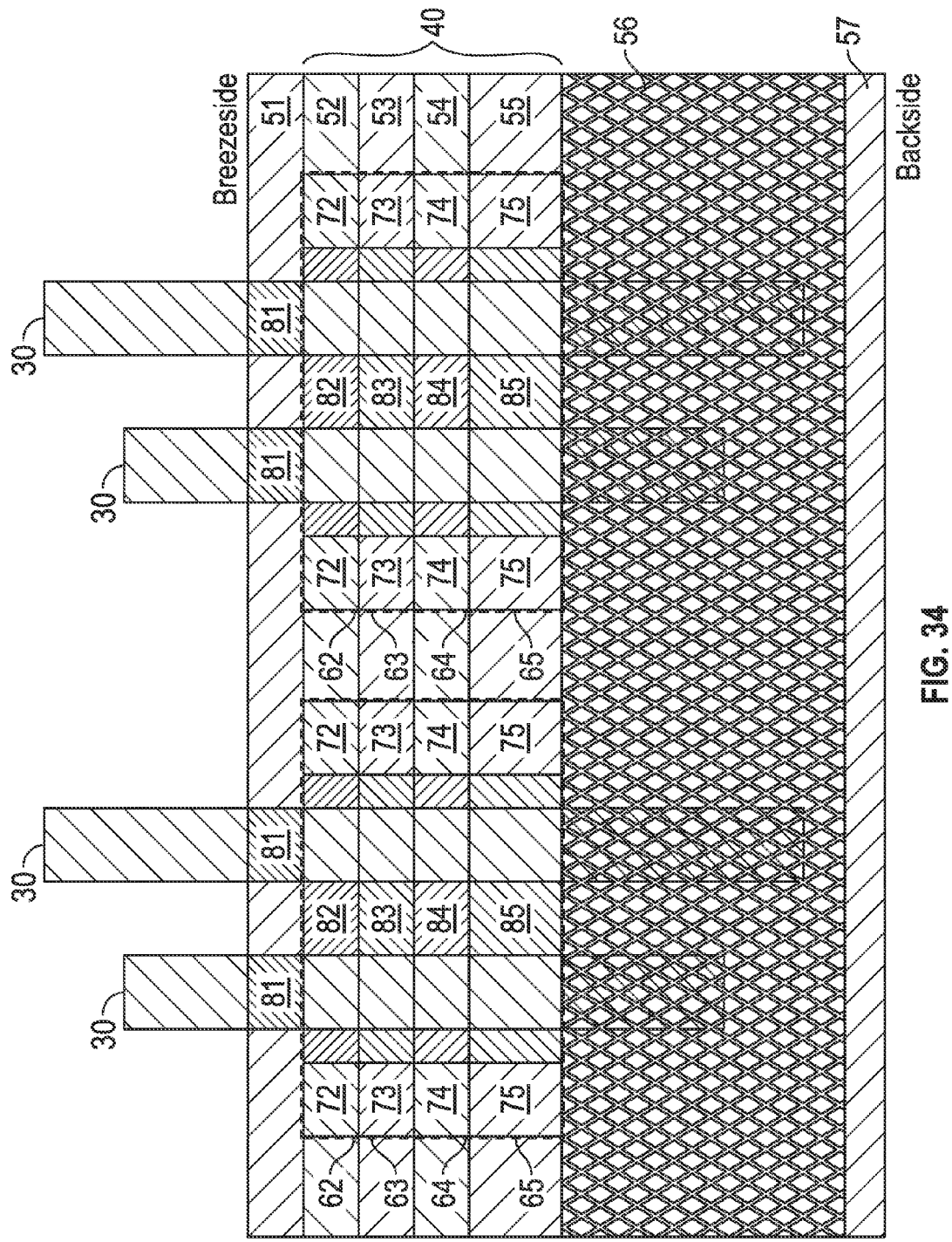
Figure 34A:
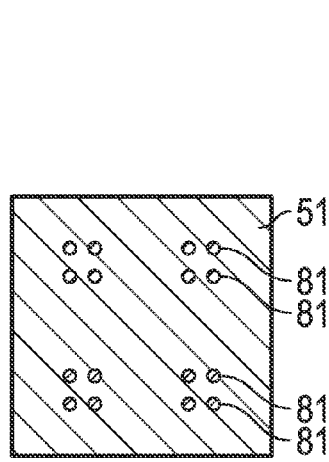
Figure 34B:
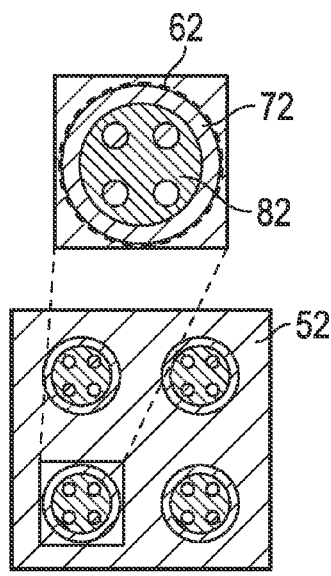
Figure 34C:
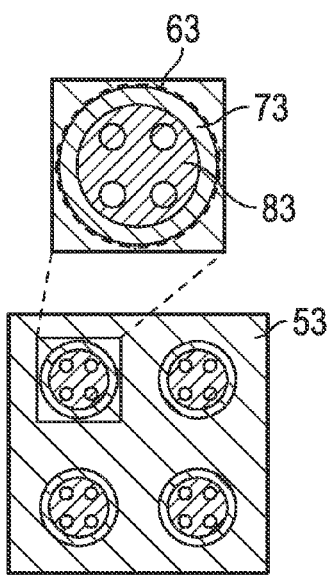
Figure 34D:
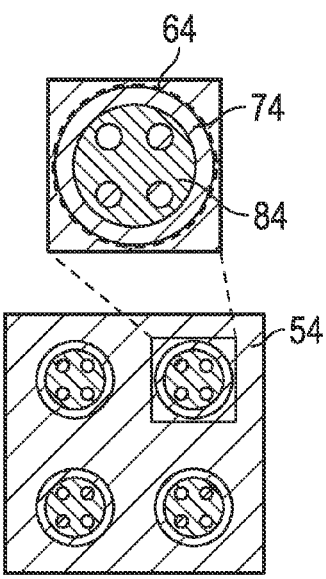
Figure 34E:
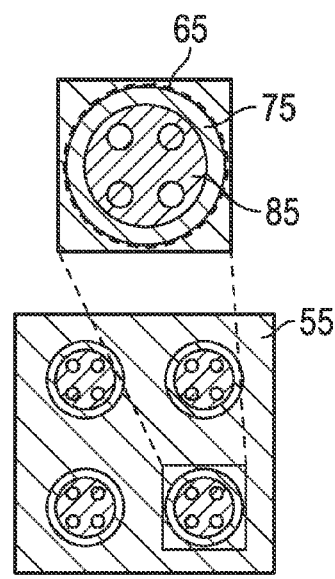
Figure 34F:
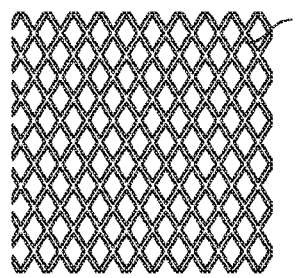
Figure 34G:
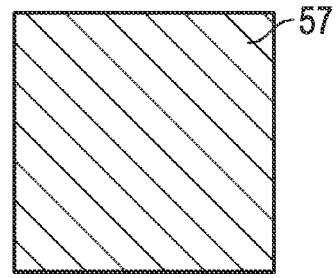
Figure 35:
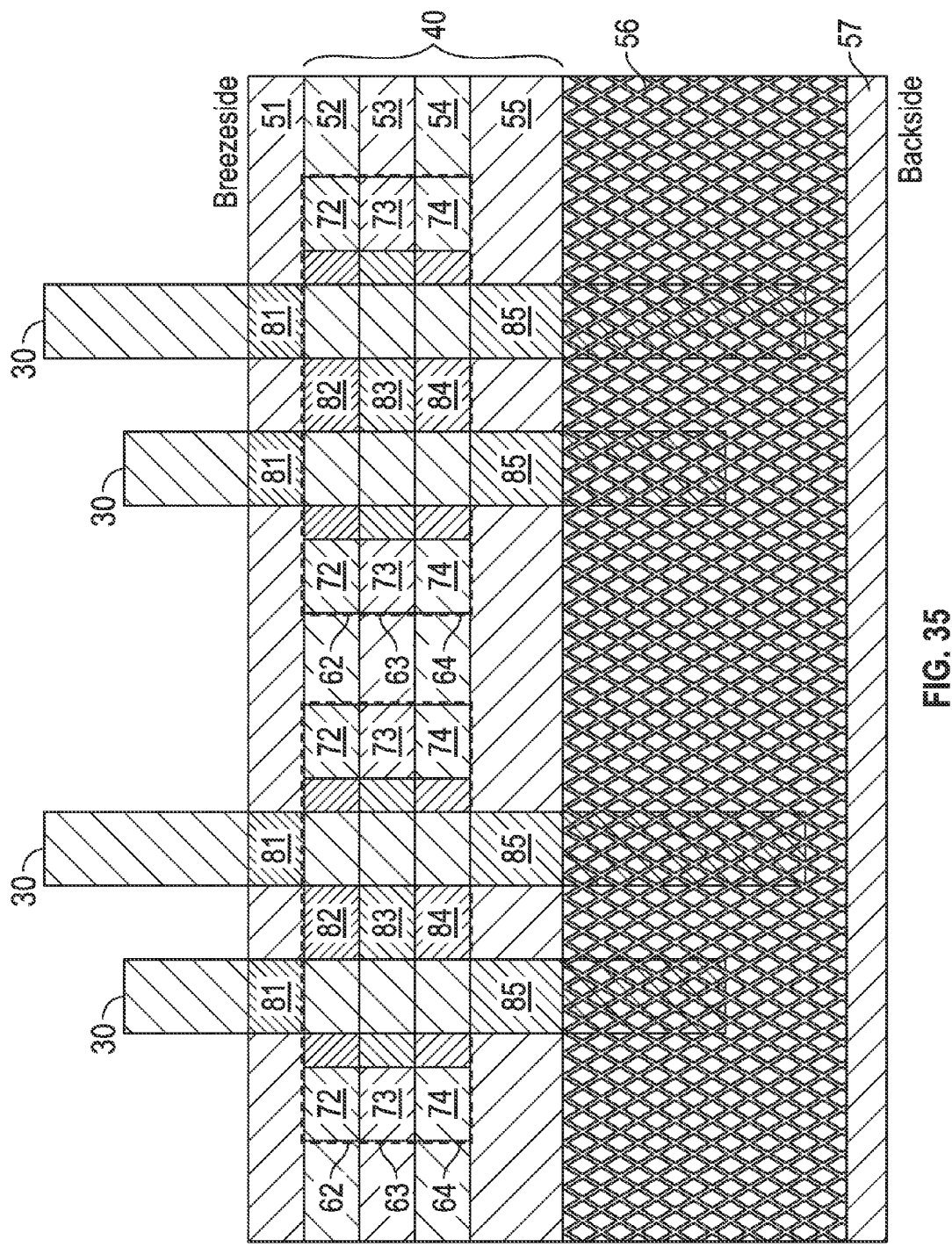
Figure 36:
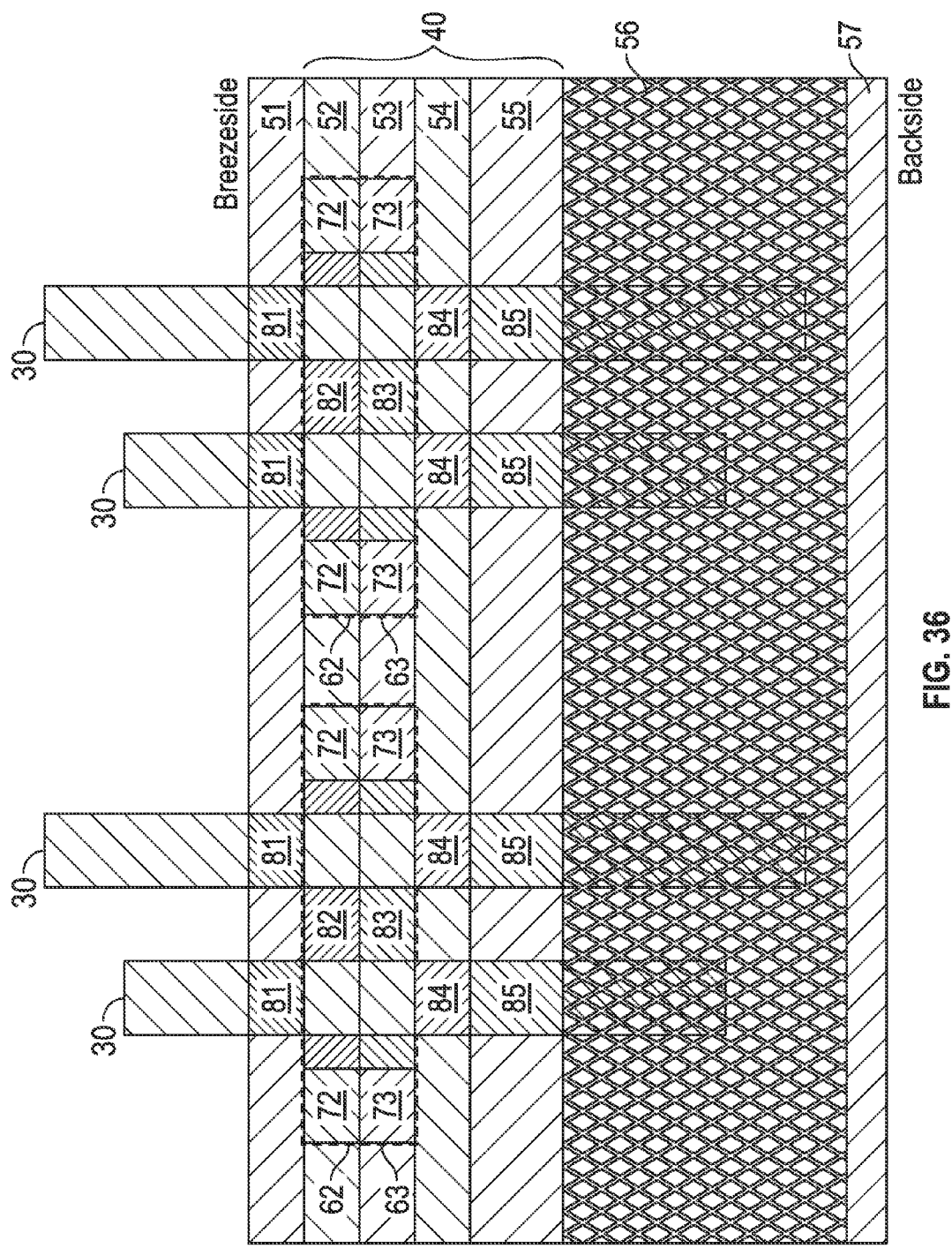
Figure 36H:
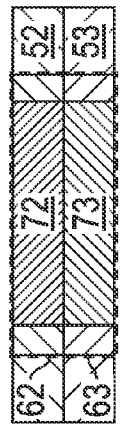
Figure 36I:
Figure 36J:
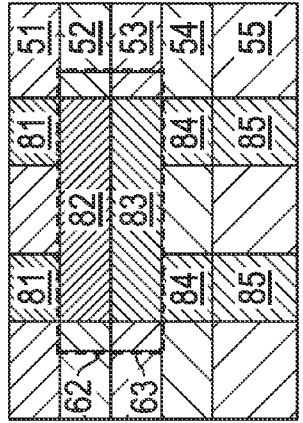
Figure 36K:
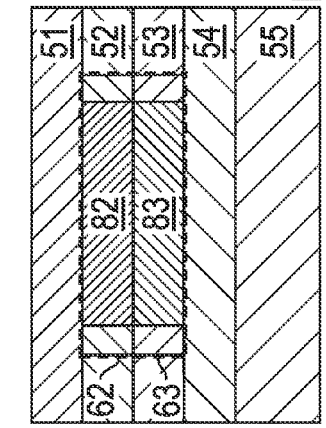
Figure 36L:
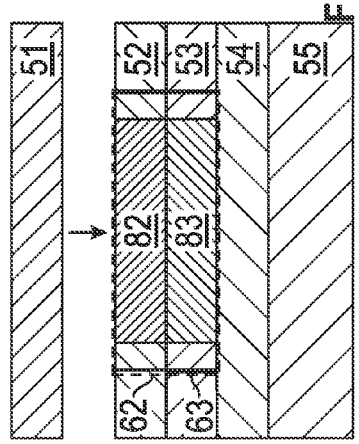
Figure 36M:
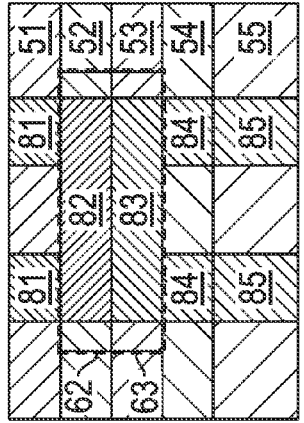
Figure 36N:
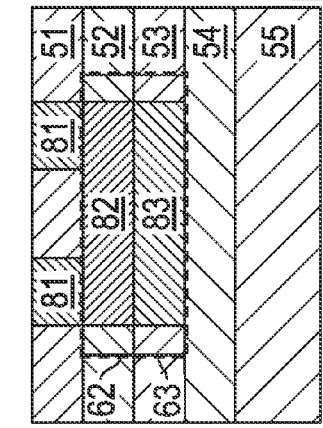
Figure 36O:
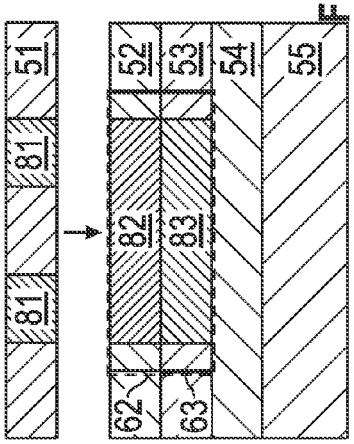
Figure 37:
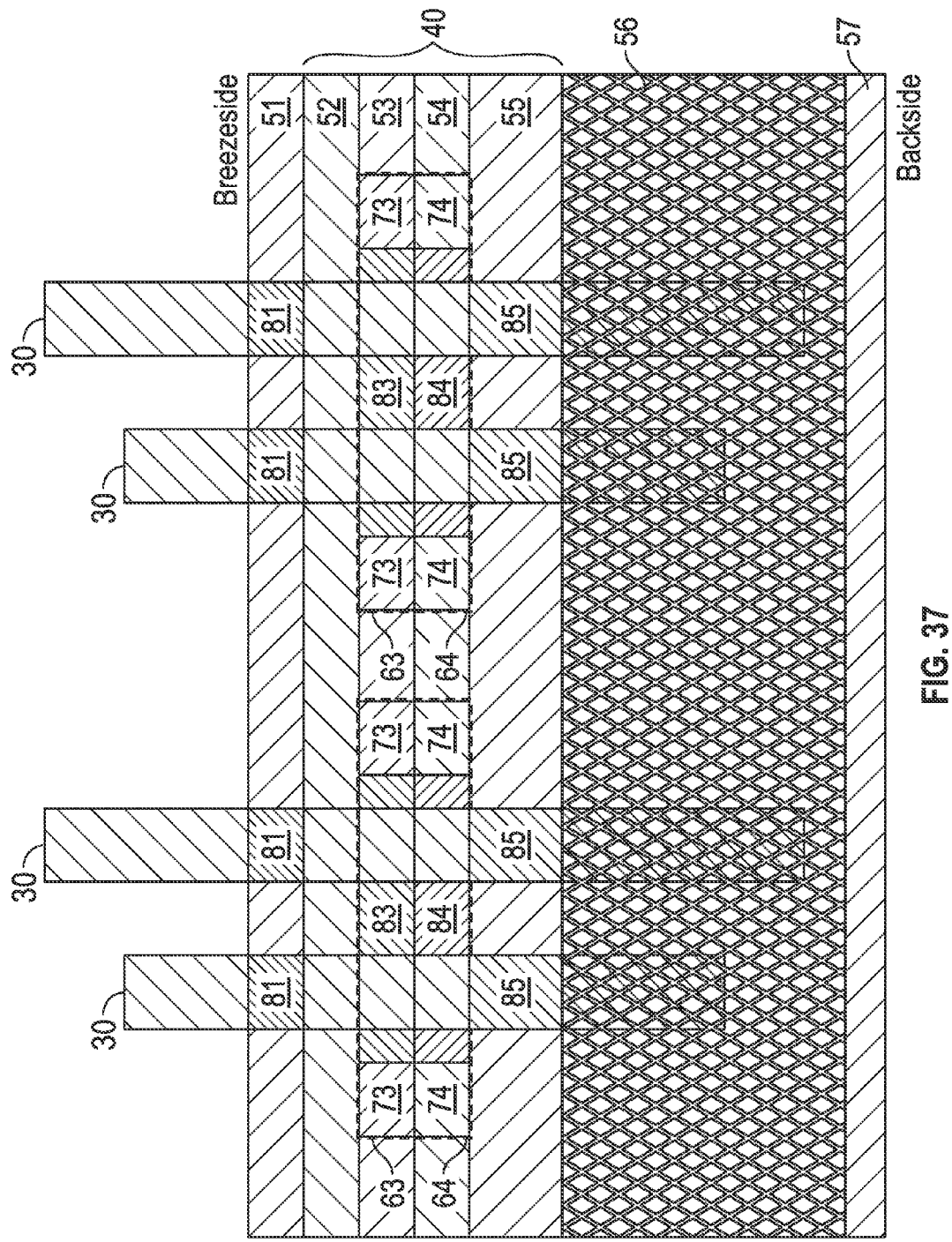
Figure 38:
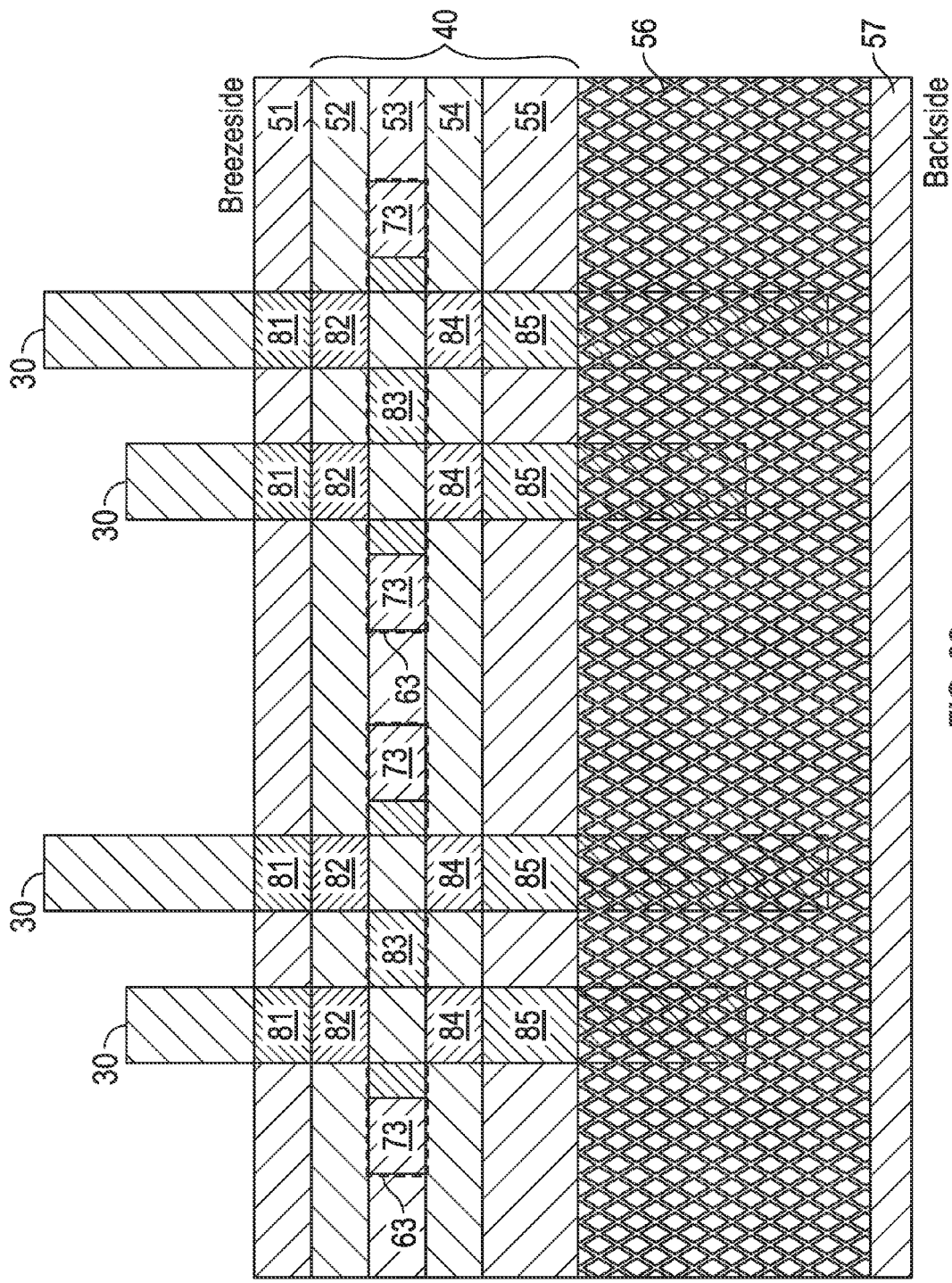
Figure 38A:
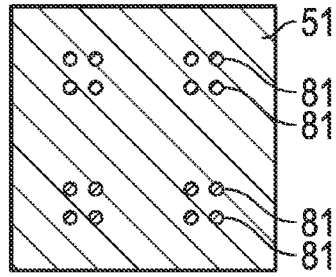
Figure 38B:
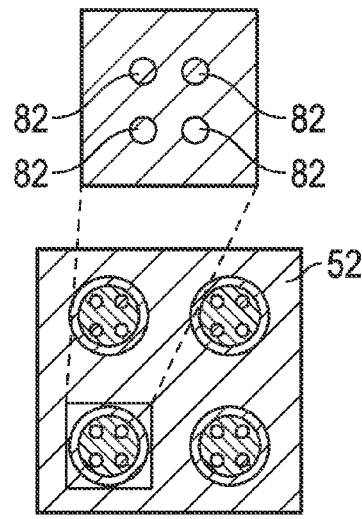
Figures 38C, 38D, 38E:
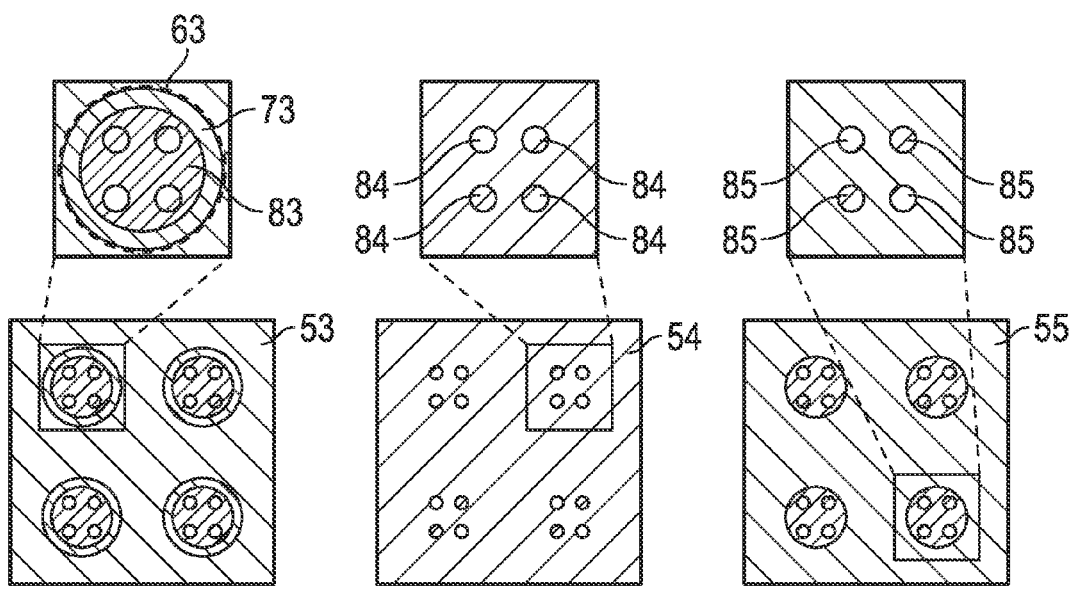
Figure 38F:
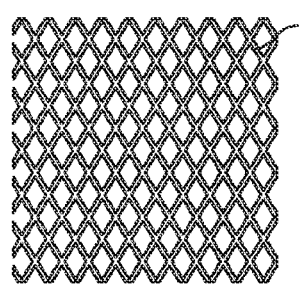
Figure 38G:
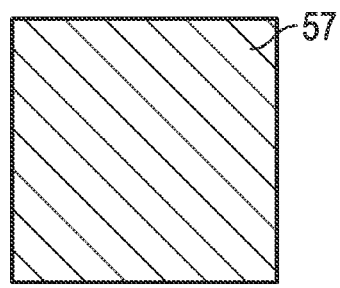

In the acoustic panels 20 shown in FIGS. 4-28, the breezeside sheet 51 has one sound-penetrating opening 81 aligned with each sound-penetrating opening 83 in the heater layer 53. As is shown in FIGS. 29-38, a plurality of sheet openings 81 (e.g., a few, several, or many) can be aligned with each opening 83 in the heater layer 53. The sealants 72-75 can be supplied as a separate substance (FIGS. 29-33) or flow-formed from the insulative layers 52/54 during lamination (FIGS. 34-38). And the heaters 40 can be made with apertures 62-65 (FIG. 29, FIG. 34), apertures 62-64 (FIG. 30, FIG. 35), apertures 63-64 (FIG. 31, FIG. 36), apertures 62-63 (FIG. 32, FIG. 37), or just aperture 63 (FIG. 33, FIG. 38).

The breezeside sheet 51 can be made from any suitable material which shields against erosion; adequately transfers heat from the heater 40; and offers an aerodynamically advantageous smooth surface. The sheet 51 can made from a metal material (e.g., titanium, aluminum, etc.), a nonmetal material (e.g., graphite, polymers, etc.), or a composite material containing both metals and nonmetals.

The heater layer 52 can be constructed of any suitable electrically insulating material which is compatible with the formation of the apertures 62, the filling of the sealant 72, and the formation of the openings 82. For example, the layer 52 can comprise one or more plies of low dielectric glass cloth that are pre-impregnated with a suitable curable resin. Preferably, this layer 52 has a high heat-transfer coefficient to encourage heat flow in the breezeside direction.

The heater layer 53 can comprise a substantially continuous conductive material that is capable of conducting an electric current when subjected to an electric potential and which resistance can be increased by the apertures. The electrically conductive layer 53 can comprise, for example, one or more plies of fabric-like material with carbon-based fibers (e.g., woven and/or unidirectional graphite fabric). This material is often considered especially suited for curved three-dimensional shapes and it is also compatible with using apertures 63 to set resistance.

Other non-fabric materials, such as metal foils through which the apertures 63 can be punched or otherwise produced are possible and plausible for the heater layer 53. Also, dielectric plies having a conductive region etched, coated, printed or otherwise supplied thereon could be used, and the apertures 63 created by removal of certain cites on the conductive region. The conductive layer 53 can be preferably characterized by the absence of separate and spaced resistance-for-heating strips and/or by wire grids or meshes.

With particular reference, for example, to the heater designs including only aperture 63 (FIG. 8, FIG. 13, FIG. 18, FIG. 23, FIG. 33, FIG. 38), material removal is not a necessary step for the production of the apertures 63. A conductive layer 53 with already-formed and/or already-filled apertures 63 is certainly an option. In these situations, layer material would never occupy the aperture site rather than having to be removed therefrom. This could be accomplished, for example, by weaving, intertwining, or otherwise amalgamating fabric around aperture sites, by molding a conductive thermoplastic or thermoset with aperture-site spacers, and/or by printing a conductive pattern containing the aperture sites.

The insulative heater layer 54 can be constructed of any suitable electrically insulating material (e.g., low dielectric glass cloth). This heater layer preferably has a low thermal-transfer coefficient so as to discourage heat flow in the backside direction.

Regarding the heater embodiments including the shelf 92 (e.g., FIGS. 7-9), fabrication techniques may require that the insulative heater layer 52 and the insulative heater layer 54 have respective properties which lend themselves to shelf creation. For example, with a chemical removal process, the heater layer 52 could be selected to be less vulnerable than the heater layer 54 (and also the conductive heater layer 53), whereby the shelf 92 remains only in this layer.

The heater's structural layer 55 can comprise any suitable material bestowing the desired scaffolding, reinforcing, or shape-preserving properties. The layer 55 could comprise, for example, one or more plies of pre-impregnated glass/epoxy fabric. As alignment and orientation will usually be essential in the manufacturing process, the structural layer 55 may prove to be a perfect place for positioning holes for insertion of posts, pins and/or other posing features during layup.

In the illustrated embodiments, the heater's structural layer 55 forms part of the finished product and can participate in the overall rigidness and sturdiness of the panel 20. In some circumstances, the structural layer 55 may be necessary during fabrication of the heater 20, but not in the final panel 20 whereby it can be eliminated prior to assembly. And it is possible that the structural layer 55 may not even be required during fabrication.

The heater-layer compilation steps can comprise, for example, stacking the layers 52-55 and then curing them into a laminate. Further heater layers, for reinforcement, bonding, releasing or other reasons, can be included in the laminate. If the panel 20 has a curved shape, such as is shown in FIG. 3, the lamination can adopt such a shape. The heater laminate can include bus strips or other means for supplying and returning power to the onboard aircraft source. Other heater hardware can also be incorporated into such the laminate.

The sound-canceling medium 56 can comprise a honeycomb core with an array of open cells having, for example, hexagonal shapes. The core can include levels, septums, inter-cell sound paths, degrees of freedom, or other characteristics enhancing its noise-canceling qualities. Such a sound-canceling medium will also provide structural rigidity to the surface on which the panel 20 is installed. And it can be constructed to have the flexibility necessary to accommodate curved shapes, such as found on a nacelle inlet lip.

The sound-reflecting skin 57 can be made from a lightweight and/or nonperforated metal, such as titanium or aluminum. The skin 57 can be made from any suitable material which affords sound-reflecting features. The skin 57 can be made, for example, of metal, nonmetal, and/or composites thereof. The apertures 62-65 are roughly sized to at least accommodate the future residence of openings 82-85 and then precisely sized to provide the layer 52 with the desired resistance. Circular-shaped apertures 62-65 may often be preferred if for no other reason than familiarity. But other geometries (e.g., polygonal, irregular, complex, etc.) are feasible and foreseeable. The apertures 62-65 will typically have lateral dimensions greater than 1 mm and/or less than 20 cm.

The apertures 62-65 can be produced in the heater layers 52-55 after they have been laminated. The aperture-producing steps can engage any suitable material-removal means (e.g., erosion blasting, mechanical drilling, laser cutting, electron beam boring, chemical etching, etc.). They can involve a temporary or permanent substrate having a façade or other indicator which maps, distinguishes, or otherwise identifies removal or nonremoval sites.

A practical aperture-producing procedure will often involve first forming the apertures 62-65 on the small side to purposely undershoot the desired resistance. Thereafter, the apertures 62-65 can be carefully trimmed and tailored towards required shape. It may be noted that such fine-tuning could be much more difficult to accomplish with, for example, separate and spaced resistance-for-heating strips and/or with wire grids or meshes.

And as was alluded to above, a conductive layer 53 with already-formed apertures 63 could instead be used, thereby eliminating the need for a distinct aperture-producing step.

The sealants 72-75 preferably comprise an electrically insulating material whereby filling of the apertures 63 does not affect the resistance, and thus the thermal output, of the conductive heater layer 53. The sealant material can be selected to encourage heat flow to the openings 82-85 to prevent freezing of moisture therein (e.g., it can have a coefficient of heat transfer comparable to that of the breezeside insulative layer 52). Or the sealant material can be selected to discourage heat flow to the openings 82-85 and thereby encourage flow in the breezeside direction (e.g., it can have a coefficient of heat transfer akin to that of the backside insulative layer 54). A sealant material having a coefficient of heat transfer intermediate that of the insulative layers 52 and 54 could also be a proper prospect in some situations.

When the aperture-filling steps involve the introduction of supplementary sealant material (FIGS. 4-8, FIGS. 14-18, FIGS. 24-28, FIGS. 29-33), the sealant material can comprise an electrically insulating material which is the same or different from that used in the insulative layers 52/54. The sealant material can comprise, for example, an elastomeric material with dielectric properties and which is resilient and resistant to moisture (e.g., rubber, synthetic rubber, silicone, etc). The sealant-introduction step can comprise pouring, injecting, or otherwise conveying a flowable sealant material into the apertures 62-65 and then either allowing it, inducing, it, or causing it to solidify. This step can be performed prior to lamination of the heater layers 52-55, depending upon the material and technique employed.

While the drawings may seem to depict sealant-introduction steps done after compilation of the heater layers 52-55 and/or assembly of the breezeside layer 51, this need not be the case. For example, in the heater embodiments wherein the insulative layer 52 and/or the insulative layer 54 are not apertured (FIGS. 6-8, FIGS. 16-18, FIG. 26, FIGS. 31-33), the sealant-introduction step could be carried out after layer compilation by inoculation through a non-apertured layer. And when the construction of the heater 40 involves an already perforated breezeside sheet 51 (FIGS. 4N-4P, FIGS. 5N-5P, FIGS. 6N-6P, etc.), the sealant material could be introduced through the sheet's openings 81 after it is assembled to the heater layers 52-55.

The sealant-introduction steps can additionally or alternatively involve the placement of a properly-sized plug into the aligned apertures 62-65. Such a plug could be sealed to the interior aperture-defining edges by an adhesive and/or an ancillary edge sealant, or it can be molded in place during lamination of the heater layers 52-55. A further option is to print the sealant 53 if, for example, if the conductive layer 53 has a printed or etched heater element.

When the aperture-filling steps involve material flow from the insulative layers 52/54 (FIGS. 9-13, FIGS. 19-23, FIGS. 34-38), the lamination layup and/or the lamination setup can be modified to promote this material flow. For example, the layup can include flow-promoting additives and/or the setup can include pressure-increasing pedestals in the aperture-site surrounding regions. In any event, the sealant 73 need only occupy spaces between the aperture-defining edge and the openings 83. So with particular reference to FIGS. 34-38, for example, the material flow need only fill a perimeter region of the aperture.

Aperture-filling steps which comprise both the introduction of a supplemental sealant and material flow from the insulative layers 52/54 are also possible and plausible. For example, in the plug technique discussed above, an ancillary edge sealant could be provided by material flow from the insulative layers 52/54 during lamination.

Furthermore, as was indicated above, the relevant heater layers 52-55 can be formed around the corresponding sealants 72-75, thus eliminating the need for aperture-producing and aperture-filling steps when making the heater 40.

The sound-penetrating openings 81-85 contribute to the sound-penetrating pores 30 so that, usually, they will collectively consume greater than 1% and/or less than 30% of the total area of the relevant surface. The openings 81-84 can have the same general geometry as the apertures 62-65 (e.g., circular) or they can adopt a different shape.

Typically, the sound-penetrating openings 81-85 will have lateral dimensions greater than 1 mm and/or less than 10 mm (e.g., in the 2 mm to 4 mm range) and they will be separated by a distance greater than 2 mm and/or less than 20 mm (e.g., 3 mm to 5 mm). The overall opening pattern is often that of an array having lattice-like or staggered rows, but other topologies are feasible and foreseeable.

The sound-penetrating openings 81-85 can be created in any appropriate way (e.g., erosion blasting, mechanical drilling, laser cutting, electron beam boring, chemical etching, etc.). Certain opening-creating techniques may require a substrate with a façade corresponding to material-removal sites or material-nonremoval sites. Such a substrate can be used only during heater fabrication and removed prior to panel integration. With particular reference to heater embodiments where a pre-perforated breezeside sheet 52 is assembled to the heater layers 52-55 (the last three figures in each of the $4^{th}$-$25^{th}$ and $28^{th}$-$33^{rd}$ drawing sets); the openings 81 in this sheet 51 can function as the pattern-providing substrate.

Some or all of the sound-penetrating openings 82-85 in the heater layers 52-55 can instead be created during the sealant-supplying steps. For example, temporary posts can be placed in the relevant apertures 52-55 and the sealant formed therearound. These posts can be removed prior to assembly of the breezeside sheet 51, or used for alignment purposes therewith. Another option is to print the sealant material on the insulative layer 52 and/or the insulative layer 54 (or any other appropriate layer) with interior voids corresponding to the openings 82-85.

The conductive heater layer 53 may include apertures 63 which are for resistance-setting reasons only, and are not occupied by sound-penetrating openings 83. Depending upon heater design, the other layers could similarly include apertures aligned with the resistance-setting-only apertures. Resistance-setting-only apertures in the conductive layer 53, and/or apertures aligned therewith in the other layers, could be filled with sealant 72-75, but they need not be. Additionally or alternatively, the breezeside sheet 51 may include openings 81 which are not aligned with openings 82-85 in the heater layers 52-55.

Preferably, however, each of the sound-penetrating openings 83 in the conductive heater layer 53 is aligned with at least one sound-penetrating opening 81 in the breezeside sheet 51 and/or it is laterally surrounded by the sealant 63.

Other sheets, skins, layers, or stratums may be interposed between those mentioned above to enhance sound-reducing, heat-transferring, structural reinforcing, erosion resisting, and/or other advantageous properties. Adhesive coatings, patches, or foams can be additionally or alternatively be employed to bond the sheet 51 to the heater 40, the heater 40 to the medium 56, the medium 56 to the skin 57, and/or the skin 57 to the barrel 15.

One may now appreciate that an ice-protecting heater 40 is provided which can be assimilated into an acoustic panel 20 having sound-penetrating pores 30. Although the aircraft 10, the panel 20, the pores 30, the heater 40, the stratums 51-57, the apertures 62-64, the sealants 72-74, the openings 81-84, and/or the shelf 92 have been shown and described with respect to certain embodiments, equivalent alterations and modifications will occur to others skilled in the art upon the reading and understanding of this specification and the annexed drawings.

The invention claimed is:

1. An electric heater for integration into an acoustic panel having sound-penetrating pores; said electric heater comprising:
   an electrically conductive layer,
   resistance-setting apertures extending through the conductive layer,
   sealant filling at least some of the resistance-setting apertures, and
   sound-penetrating openings extending through at least some of the sealant-filled apertures;
   wherein sealant laterally surrounds each sound-conveying opening.

2. An electric heater as set forth in claim 1, wherein the sealant-filled apertures have just one sound-conveying opening extending therethrough.

3. An electric heater as set forth in claim 1, wherein the sealant-filled apertures have a plurality of sound-conveying opening extending therethrough.

4. An electric heater as set forth in claim 1, comprising:
   a breezeside insulative layer located breezeside of the conductive layer, and
   sound-penetrating openings extending through the breezeside insulative layer.

5. An electric heater as set forth in claim 4, comprising:
   apertures in the breezeside insulative layer which are aligned with the resistance-setting apertures in the conductive layer, and sealant in the apertures which are aligned with the sealant-filled apertures of the conductive layer;
wherein the sound-penetrating openings in the breezeside insulative layer extend through its sealant-filled apertures.

6. An electric heater as set forth in claim 5, wherein the sealant in the apertures of the breezeside insulative layer laterally surrounds each of its sound-penetrating openings.

7. An electric heater as set forth in claim 5, wherein the apertures in the breezeside insulative layer have lateral dimensions which are substantially the same as those of the aligned apertures in the conductive layer.

8. An electric heater as set forth in claim 5, wherein the sealant in the breezeside insulative layer laterally surrounds only some of its sound-penetrating openings.

9. An electric heater as set forth in claim 5, wherein the apertures in the breezeside insulative layer have lateral dimensions which are less than those of the aligned apertures in the conductive layer.

10. An electric heater as set forth in claim 9, wherein the breezeside insulative layer has a shelf on each of its aperture-defining interior edges, each shelf canopying a rim of the aligned aperture in the conductive layer.

11. An electric heater as set forth in claim 1, comprising:
a backside insulative layer located backside of the conducting layer, and
sound-penetrating openings extending through the breezeside insulative layer.

12. An electric heater as set forth in claim 11, comprising:
apertures in the backside insulative layer aligned with the resistance-setting apertures in the conductive layer, and
sealant in the apertures of the backside insulative layer which are aligned with the sealant-filled apertures of the conductive layer;
wherein the sound-penetrating openings in the backside insulative layer extend through its sealant-filled apertures.

13. An electric heater as set forth in claim 1, comprising:
a breezeside insulative layer located breezeside of the conductive layer, a backside insulative layer located backside of the conductive layer, apertures extending through the insulative layers and aligned with the resistance-setting apertures in the conductive layer, sealant filling the apertures in the insulative layers and aligned with the sealant in the conductive layer,
sound-penetrating openings, which contribute to the sound-conveying pores, extending through the sealant-filled apertures of the insulative layers.

14. An electric heater as set forth in claim 13, wherein the sealants in the insulative layers are formed in one piece with the aligned sealants in the conductive layer.

15. A method of making the electric heater set forth in claim 1, comprising the steps of:
filling the aperture in the conductive layer with the sealant; and
creating at least one sound-penetrating opening in the sealant-filled aperture.

16. A method as set forth in claim 15, wherein said aperture-filling step comprises introducing a supplemental sealant material.

17. A method as set forth in claim 15, wherein said aperture-filling step comprises material flowing from other heater layers into aperture in the conductive layer.

18. An acoustic panel having sound-penetrating pores reaching in the breezeside-backside direction, said panel comprising:
an electric heater as set forth in claim 1, wherein the sound-penetrating openings in the conductive layer contribute to the sound-penetrating pores;
a breezeside sheet located breezeside of the heater and having sound-penetrating openings extending therethrough, wherein at least some of these sound-penetrating openings are aligned with the sound-penetrating openings in the conductive layer of the heater and contribute to the sound-penetrating pores; and
a sound-canceling medium located backside of the heater.

19. An acoustic panel as set forth in claim 18, wherein the breezeside sheet has just one sound-penetrating opening aligned with each sound-penetrating opening in the conductive layer of the heater.

20. An acoustic panel as set forth in claim 18, wherein the breezeside sheet has a plurality of sound-penetrating openings aligned with each sound-penetrating opening in the conductive layer of the heater.

* * * * *